US012561748B2

(12) United States Patent　　　　　(10) Patent No.:　US 12,561,748 B2
Englehart et al.　　　　　　　　　　(45) Date of Patent:　Feb. 24, 2026

(54) ONLINE HOME AFFORDABILITY TOOL

(71) Applicant: The PNC Financial Services Group, Inc., Pittsburgh, PA (US)

(72) Inventors: Matthew Englehart, Holland, MI (US); Michael Nordbusch, Strongsville, OH (US)

(73) Assignee: THE PNC FINANCIAL SERVICES GROUP, INC., Pittsburgh, PA (US)

( * ) Notice: Subject to any disclaimer, the term of this patent is extended or adjusted under 35 U.S.C. 154(b) by 0 days.

(21) Appl. No.: 15/957,517

(22) Filed: Apr. 19, 2018

(65) Prior Publication Data

US 2018/0308177 A1　　Oct. 25, 2018

Related U.S. Application Data

(60) Provisional application No. 62/487,715, filed on Apr. 20, 2017.

(51) Int. Cl.
　*G06Q 40/12*　　　(2023.01)
　*G06F 16/904*　　　(2019.01)
　*G06F 16/9535*　　　(2019.01)

(52) U.S. Cl.
　CPC ........... *G06Q 40/12* (2013.12); *G06F 16/904* (2019.01); *G06F 16/9535* (2019.01)

(58) Field of Classification Search
　CPC ...... G06Q 50/16; G06Q 40/12; G06F 16/904; G06F 16/9535
　See application file for complete search history.

(56) References Cited

U.S. PATENT DOCUMENTS 6,728,689 B1 *　4/2004　Drissi ................. G06K 9/6253
　　　　　　　　　　　　　　　　706/14
8,433,650 B1 *　4/2013　Thomas ................ G06Q 10/06
　　　　　　　　　　　　　　　　705/38
9,292,405 B2 *　3/2016　Wankawala ........ G06F 11/3457
　　　　　　　　　　　　(Continued)

OTHER PUBLICATIONS

Schwab, "How to Figure Out What Your Monthly Payment Will Be on a House", Nov. 2016, https://www.redfin.com/blog/how-to-figure-out-what-your-monthly-payment-will-be-on-a-house/ (Year: 2016).*

(Continued)

*Primary Examiner* — Allen C Chein
(74) *Attorney, Agent, or Firm* — Buchanan Ingersoll & Rooney PC

(57)　　　　　ABSTRACT

A system is provided to generate an affordability tool. The system may include various system components acting in a coordinated and concerted manner to provide a user with a detailed, yet filtered understanding of his/her financial restrictions and opportunities related to purchasing a home. The system can include a user interface with an affordability module and at least one other module. The affordability module can be configured as the hub of the affordability tool, driving the other modules and coordinating activities between the system components. The system can collect and/or display real-time data and provide dynamic assessments about affordability. The system can use sophisticated and/or accurate calculations to generate an affordability assessment due to the coordinated and/or concerted actions of each component part and the manipulation of data.

12 Claims, 49 Drawing Sheets

(56) References Cited

U.S. PATENT DOCUMENTS

| | | | | |
|---|---|---|---|---|
| 2002/0138485 A1* | 9/2002 | Faudman | ......... | G06Q 10/06311 |
| | | | | 707/999.009 |
| 2004/0073508 A1* | 4/2004 | Foster | .............. | G06Q 10/06375 |
| | | | | 705/38 |
| 2004/0143450 A1* | 7/2004 | Vidali | .................... | G06Q 40/02 |
| | | | | 705/38 |
| 2006/0271463 A1* | 11/2006 | Young | .................... | G06Q 40/00 |
| | | | | 705/35 |
| 2009/0024540 A1* | 1/2009 | Ryder | .................... | G06Q 40/00 |
| | | | | 705/36 R |
| 2011/0289161 A1* | 11/2011 | Rankin, Jr. | .......... | H04L 51/216 |
| | | | | 709/206 |
| 2013/0297390 A1* | 11/2013 | Jaquez | .................... | G06Q 20/36 |
| | | | | 705/14.23 |
| 2015/0262249 A1* | 9/2015 | Wical | ................. | G06Q 30/0269 |
| | | | | 705/14.55 |
| 2015/0332355 A1* | 11/2015 | Kost | .................. | G06Q 30/0283 |
| | | | | 705/35 |

OTHER PUBLICATIONS

Hurwitz, "The Role of Traditional ETL in Big Data", 2016, https://www.dummies.com/article/technology/information-technology/data-science/big-data/the-role-of-traditional-etl-in-big-data-166946/ (Year: 2016).*

"Windows batch file file download from a URL", 2017, https://stackoverflow.com/questions/4619088/windows-batch-file-file-download-from-a-url (Year: 2017).*

O'Quinn, John, "Three lessons from the Federal Circuit's recent 101 reversal in XY v Trans Ova Genetics", Aug. 2020, https://www.iam-media.com/article/three-lessons-the-federal-circuits-recent-101-reversal-in-xy-v-trans-ova-genetics). (Year: 2020).*

Perrin, "Location, Location, Location!", May 2013, https://www.zillow.com/tech/location-location-location/ (Year: 2013).*

"Change location on Google", Dec. 10, 2017, https://web.archive.org/web/20171210030419/https://support.google.com/websearch/answer/179386, (Year: 2017).*

* cited by examiner

134

Type of Income

- Primary employment – based earnings, bonuses, commissions, overtime
- Secondary employment – part time, seasonal
- Nontaxable income – alimony / child support, maintenance income, social security, disability, workers compensation, public assistance
- Military pay – flight, hazard, rations, clothing allowance, quarters allowance, proficiency pay, reserve pay
- Retirement income
- Notes receivable
- Interest and dividends
- Mortgage differential payments
- Trust income
- Capital gains
- Royalty payments
- VA benefits
- Unemployment benefits
- Auto allowance
- Foster care income
- Boarder income
- Non-occupying co-borrower income
- Rental income
- Mortgage credit certificates
- Trailing secondary wage earners anticipated income
- Self employment income

View Regions by State

| Region | States Included |
|---|---|
| Northeast | Connecticut, Maine, Massachusetts, New Hampshire, New Jersey, New York, Pennsylvania, Rhode Island, Vermont |
| Midwest | Alabama, Arkansas, Delaware, District of Columbia, Florida, Georgia, Kentucky, Louisiana, Maryland, Mississippi, North Carolina, Oklahoma, South Carolina, Tennessee, Texas, Virginia, West Virginia |
| South | Illinois, Indiana, Iowa, Kansas, Michigan, Minnesota, Missouri, Nebraska, North Dakota, Ohio, South Dakota, Wisconsin |
| West | Alaska, Arizona, California, Colorado, Hawaii, Idaho, Montana, Nevada, New Mexico, Oregon, Utah, Washington, Wyoming |

Figure 15B:
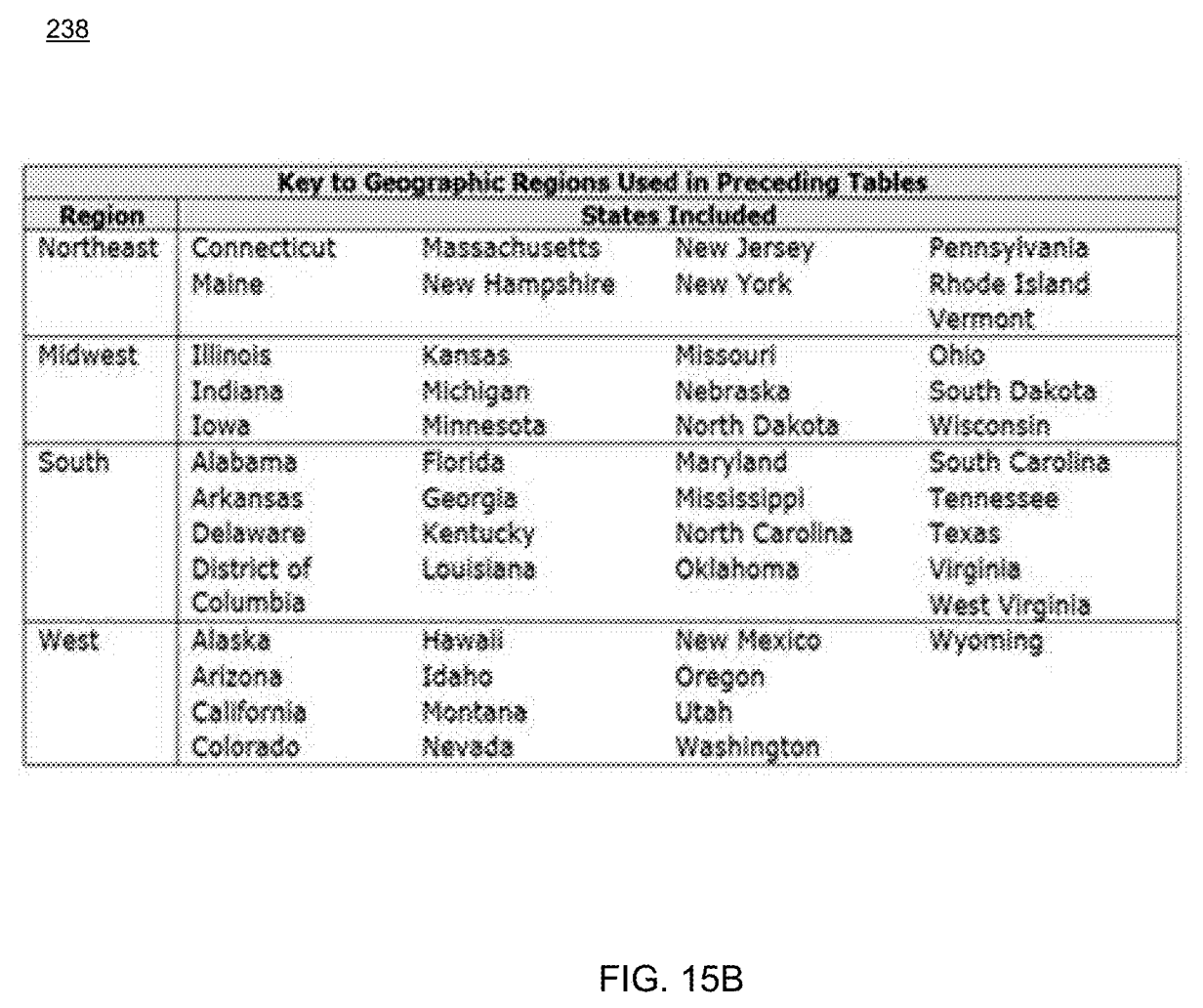

| Key to Geographic Regions Used in Preceding Tables | | | |
| --- | --- | --- | --- |
| Region | States Included | | |
| Northeast | Connecticut<br>Maine | Massachusetts<br>New Hampshire | New Jersey<br>New York | Pennsylvania<br>Rhode Island<br>Vermont |
| Midwest | Illinois<br>Indiana<br>Iowa | Kansas<br>Michigan<br>Minnesota | Missouri<br>Nebraska<br>North Dakota | Ohio<br>South Dakota<br>Wisconsin |
| South | Alabama<br>Arkansas<br>Delaware<br>District of<br>Columbia | Florida<br>Georgia<br>Kentucky<br>Louisiana | Maryland<br>Mississippi<br>North Carolina<br>Oklahoma | South Carolina<br>Tennessee<br>Texas<br>Virginia<br>West Virginia |
| West | Alaska<br>Arizona<br>California<br>Colorado | Hawaii<br>Idaho<br>Montana<br>Nevada | New Mexico<br>Oregon<br>Utah<br>Washington | Wyoming |

Figure 19:
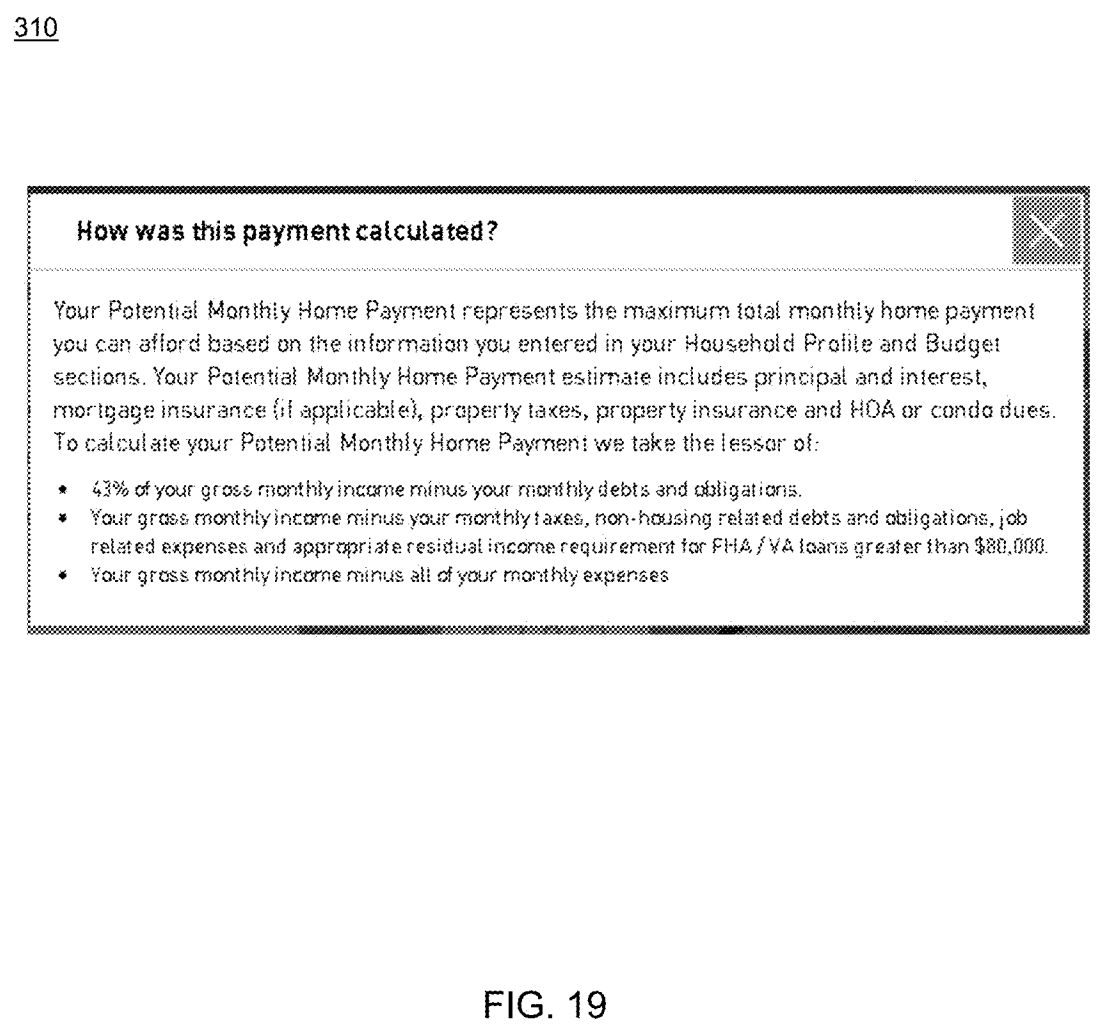

How was this payment calculated?

Your Potential Monthly Home Payment represents the maximum total monthly home payment you can afford based on the information you entered in your Household Profile and Budget sections. Your Potential Monthly Home Payment estimate includes principal and interest, mortgage insurance (if applicable), property taxes, property insurance and HOA or condo dues. To calculate your Potential Monthly Home Payment we take the lessor of:

* 43% of your gross monthly income minus your monthly debts and obligations.
* Your gross monthly income minus your monthly taxes, non-housing related debts and obligations, job related expenses and appropriate residual income requirement for FHA / VA loans greater than $80,000.
* Your gross monthly income minus all of your monthly expenses

Please confirm that you have no monthly living expenses costs.

Cancel

CONTINUE

130

440

156

152

130

550

552

502

554

536

ONLINE HOME AFFORDABILITY TOOL

CROSS-REFERENCE TO RELATED APPLICATIONS

This non-provisional application is related to and claims the benefit of priority of U.S. Provisional Application No. 62/487,715 titled "Online Home Affordability Tool" filed on Apr. 20, 2017, the entire contents of which is incorporated by reference herein.

FIELD OF THE INVENTION

Embodiments can relate to a system and method for generating an affordability tool to provide distilled information pulled from and various system components acting in a coordinated and concert manner. The affordability tool may be used to provide a dynamic assessment related to the purchasing an asset (e.g., a home) based on a user's financial situation and current economic conditions.

BACKGROUND OF THE INVENTION

Purchasing a home can be a complex process involving many parties, each generating and relying on information and assessments provided by one another. During the initial stages of purchasing a home, a home buyer can be limited to relying on generalized information and broad assessments that may not deliver accurate enough information and/or to allow the buyer to formulate an informed decision. Some existing methods have attempted to provide affordability calculators by which a user can input data into a computing device to generate an affordability assessment. With conventional systems, the computing device may be able to perform affordability calculations faster than that of a human but it is still limited to generalized information and provides broad assessments based on general algorithms.

The present invention is directed toward overcoming one or more of the above-identified problems.

BRIEF SUMMARY OF THE INVENTION

Embodiments can include a system configured to provide an affordability tool. The system may include various system components acting in a coordinated and concerted manner to provide a user with a detailed, yet filtered understanding of his/her financial restrictions and opportunities related to purchasing a home. The information can be collected and presented via user interfaces of the affordability tool. For example, the system can include a user interface with a household profile module, a budget builder module, a home search module, an agent contact module, and an affordability module. Each module can be used by the affordability tool to receive and/or transmit certain information from certain system components. The affordability module may be configured as the hub of the tool, driving the other modules and coordinating activities between the system components.

In some embodiments, the system can receive and/or transmit information from resource computers. Resource computers can include computers or computer systems related to loan pricing engines, home search engines, realtor service providers, web-based mapping service providers, etc. This may be done to collect and/or display real-time data and/or dynamic assessments about affordability. In addition, the affordability module can use more sophisticated and/or accurate calculations to generate the affordability assessment. For example, current home affordability calculators may generate affordability recommendations based merely on debt-to-income ratios. The inventive system and method, however, can factor in residual income, real-time rate quotes, and/or actual for-sale homes. This can improve on the system by allowing it to make quicker and more accurate assessments. Other system improvements can include the coordination and concerted action of various computers and computer systems that typically operate in a non-synchronized manner in conventional systems. These improvements can further lead to a system that can provide more sophisticated dynamic interaction of component parts, allowing the affordability tool to generate assessments based on real-time information and real-time decision inputs by a user.

In some embodiments, the system can be used to help prospective home buyers understand home affordability prior to buying a home. The system can provide users with a way to learn more about home affordability in a simple, straightforward, and/or actionable way prior to talking to a loan officer or real estate agent. Educating borrowers about home affordability earlier in the home buying process can further help them make better home buying decisions.

The above-referenced improvements provided by the system stem from the affordability module being configured as a hub of the tool, allowing it to drive the other modules and coordinate activities between the system components. As noted above, conventional systems are limited to only using simple debt-to-income ratios when generating a financial assessment. However, the affordability module, being the hub of the tool, provides a means to utilize more sophisticated and more accurate calculations based on real-time data when generating the affordability assessment. This can allow the system to dynamically build an affordability assessment based on real-time information. In one embodiment, the affordability module operates in the background, allowing for continuous updates of real time data to be processed by affordability module, which is then used to drive the other modules.

The affordability module, being the hub of the tool, also provides a means to coordinate concerted action of various computers and other components of the system that would otherwise operate in a non-synchronized manner. For example, the system can include a user server associated with a user computer, a planner server associated with a planner computer, and/or a resource server associated with a resource computer. Any one or combination of the user server, planner server, and/or resource server can be part of a single server. Such a system configuration may generate efficiencies and result in faster processing times.

With this and other flexibility in system architecture, the affordability module can be used to set parameters related to the display of information, how information is collected, and to which degree a system component is acted upon. In one embodiment, the system can search for homes within certain parameters of a user's affordability assessment, whereby concerted and coordinated action of the user computer, the planner computer, and/or the resource computer supplies and/or acquisitions data necessary to generate a listing of homes that fall within certain parameters of the affordability assessment. This can include a listing of homes within a predetermined variance of the parameters of the affordability assessment.

With these improvements, the system can generate a comprehensive assessment of complex and variable parameters associated with purchasing a home, as well as provide coordinated communications with brokers and other agents regarding the same. As a result, a user can search for a home by geographic location with improved accuracy, quicker results, and with a more comprehensive understanding of the financial commitments involved.

In an exemplary embodiment, an affordability tool can include a first computer device in operative communication with and at least one second computer device to form a system. The system can further include an affordability module programmed to cause the first computer device and the at least one second computer device to receive, transmit, and display user data and resource data, user data comprising data entered into the system via the first computer device, resource data comprising data acquisitioned from the at least one second computer device. In some embodiments, the affordability module can cause the system to acquisition resource data based on user data. In some embodiments, the affordability module can calculate a potential monthly home payment (PMHP) based on the user data and the resource data. In some embodiments, the affordability module can cause the first computer device to request additional user data when the PMHP is calculated to be below a predetermine value.

The system may further include a home profile module, the home profile module programmed to cause the first computer device to request the user data, the user data comprising a user's income. The system may further include a builder budget module, the builder budget module programmed to cause the first computer device to request the user data, the user data comprising a user's income and payroll taxes. The system may further include a home search module, the home search module programmed to cause the first computer device to request the user data, the user data comprising a home selected to be saved to a saved-home catalog. The system may further include an agent contact module, the agent contact module programmed to cause the first computer device to request the user data, the user data comprising comments related to contacting an agent. The system may further include a report comprising at least one home within the saved-home catalog. In some embodiments, the resource data can include a current home listing, a current home sale price, and a current loan rate. In some embodiments, the current loan rate can be determined for each home.

In some embodiments, the PMHP can be calculated by a plurality of PMHP formulas. In some embodiments, a lowest calculated PMHP from the plurality of PMHP formulas may be used as the PMHP.

In some embodiments, the affordability module can be further programmed to generate an affordability assessment, the affordability assessment comprising at least one affordability parameter. The affordability module may be further programmed to cause the second computer device to transmit home data to the first computer device. The home search module can be further programmed to cause the first computer device to display the home data.

In some embodiments, the affordability module can be further programmed to indicate how the home displayed compares to the at least one affordability parameter. In some embodiments, the at least one affordability parameter can include at least one of PMPH, Estimated Monthly Home Payment (EMHP), Estimated Total Home Expenses (ETHE), and Maximum Total Monthly Home Expenses (MTMHE).

In another exemplary embodiment, an affordability tool can include a first computer device, a second computer device, and a third computer device, each in operative communication with each other to form a system. The system may include an affordability module programmed to cause the second computer device to receive, transmit, and display user data and resource data, user data comprising data entered into the system via the first computer device, resource data comprising data acquisitioned from the third computer device. In some embodiments, the affordability module can cause the system to acquisition resource data based on user data. In some embodiments, the affordability module can calculate a potential monthly home payment (PMHP) based on the user data and the resource data. In some embodiments, the affordability module can cause the first computer device to request additional user data when the PMHP is calculated to be below a predetermine value.

The system may further include a home profile module, the home profile module programmed to cause the first computer device to request the user data, the user data comprising a user's income. The system may further include a builder budget module, the builder budget module programmed to cause the first computer device to request the user data, the user data comprising a user's income and payroll taxes. The system may further include a home search module. The home search module can be programmed to cause the first computer device to request the user data, the user data comprising a home selected to be saved to a saved-home catalog. The affordability module can cause the third computer device to acquisition the resource data comprising a current home listing, a current home sale price, and a current loan rate. The system can further include an agent contact module, the agent contact module programmed to cause the first computer device to request the user data, the user data comprising comments related to contacting an agent. In some embodiments, the PMHP can be calculated by a plurality of PMHP formulas.

In another exemplary embodiment, a method for generating an affordability assessment can include causing a first computer device, a second computer device, and a third computer device to be in operative communication with each other to form a system. The method can further include generating an affordability module programmed to cause the second computer device to receive, transmit, and display user data and resource data, user data comprising data entered into the system via the first computer device, resource data comprising data acquisitioned from the third computer device. The affordability module can cause the system to acquisition resource data based on user data. The affordability module can calculate a potential monthly home payment (PMHP) based on the user data and the resource data. The affordability module can cause the first computer device to request additional user data when the PMHP is calculated to be below a predetermine value.

The method can further include generating a home profile module, the home profile module programmed to cause the first computer device to request the user data, the user data comprising a user's income. The method can further include generating a builder budget module, the builder budget module programmed to cause the first computer device to request the user data, the user data comprising a user's income and payroll taxes. The method can further include generating a home search module. The home search module can be programmed to cause the first computer device to request the user data, the user data comprising a home selected to be saved to a saved-home catalog. The affordability module can cause the third computer device to acquisition the resource data comprising a current home listing, a current home sale price, and a current loan rate. The method can further include generating an agent contact module, the agent contact module programmed to cause the first computer device to request the user data, the user data comprising comments related to contacting an agent. In some embodiments, the PMHP can be calculated by a plurality of PMHP formulas.

Further features, aspects, objects, advantages, and possible applications of the present invention will become apparent from a study of the exemplary embodiments and examples described below, in combination with the Figures, and the appended claims.

BRIEF DESCRIPTION OF THE FIGURES

The above and other objects, aspects, features, advantages and possible applications of the present invention will be more apparent from the following more particular description thereof, presented in conjunction with the following drawings, in which:

FIG. 8 is an exemplary help screen that may be displayed with an embodiment of the system.

FIGS. 15A-15B show exemplary location/region tables that may be used with the location/region panel.

FIG. 19 is an exemplary how was my payment calculated screen that may be displayed with an embodiment of the system.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
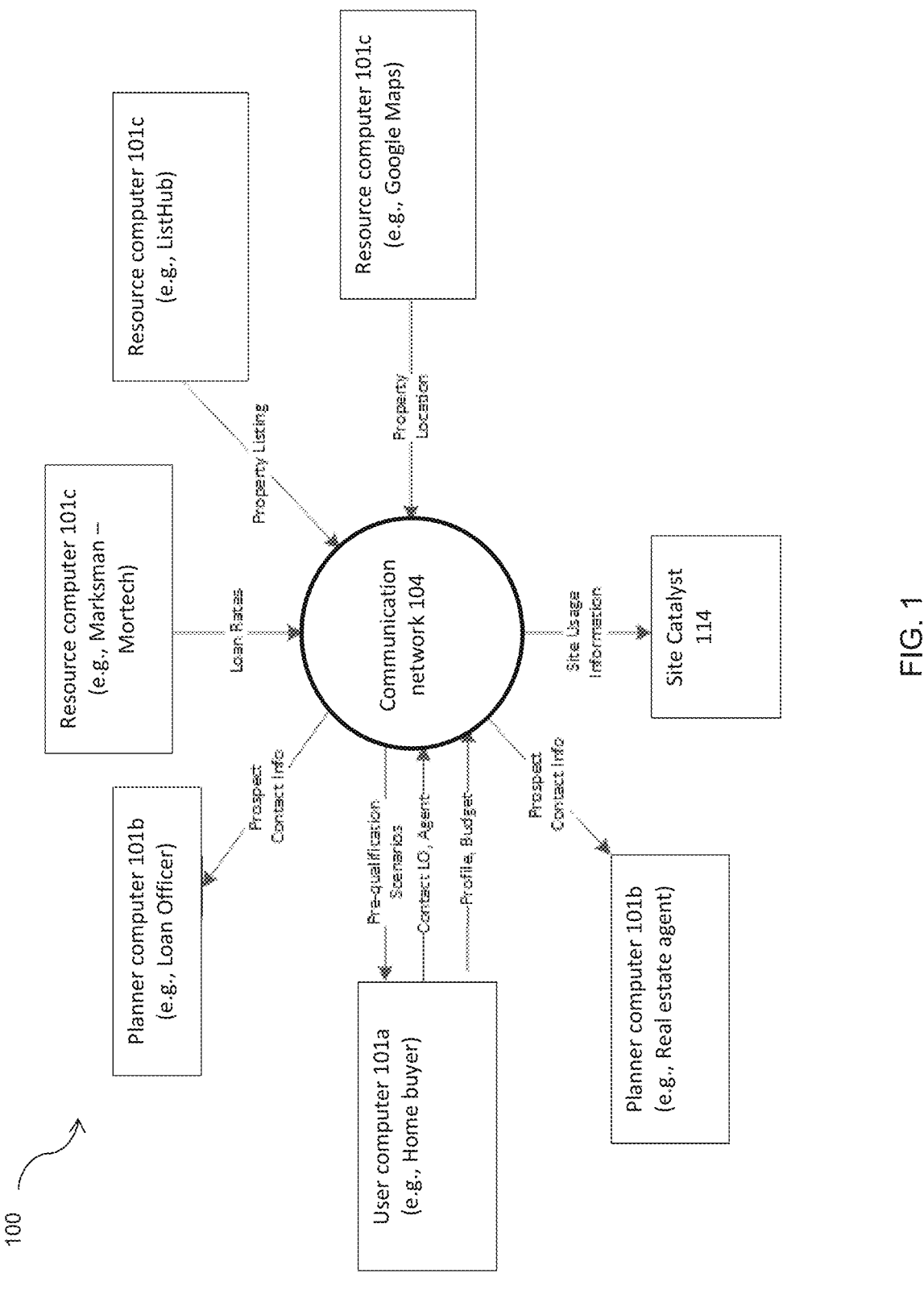
FIG. 1 is an exemplary system configuration that may be used for an embodiment of the affordability tool.

Referring to FIG. 1, embodiments can include a system 100 that may provide distilled information pulled from and various system components acting in a coordinated and concerted manner. Coordination between system components can be used to effectively and efficiently collect, configure, and/or transfer data to cause a system component to perform in a specific way. For example, a user can input data into a system component to cause the system 100 to trigger an operation in at least one other system component, the operation being one that is dependent on the data entered. Each component operating in a specific way can generate specific data and cause another component to perform specific operations. In some embodiments, the combined and coordinated operations of each component can be used to provide a user with a detailed, yet filtered understanding of his/her financial restrictions and opportunities related to purchasing an asset. The asset may be property that can be leveraged. For example, the asset may be a home. In some embodiments, the system 100 can provide a user with an affordability assessment by which a user can make an informed decision regarding purchasing the home. The system 100 can further use the affordability assessment to generate at least one user interface that can allow a user to generate a household profile, generate a budget, search for homes, generate a saved-home catalog, modify content, and/or use the information to contact an agent (e.g., real estate and/or financing professional).

Figure 2:
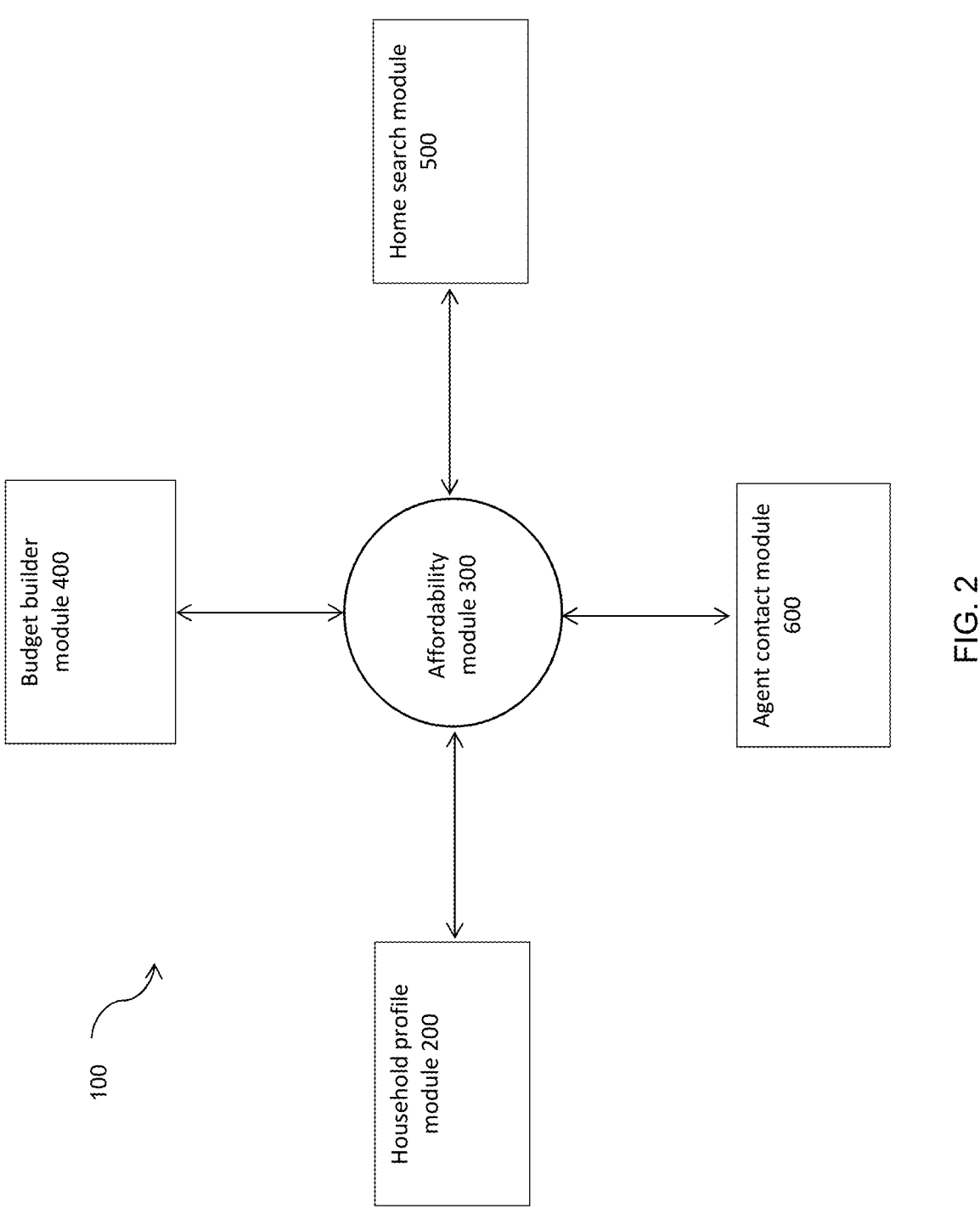
FIG. 2 shows a block diagram of the affordability module configured as a hub for an embodiment of the affordability tool.

The ability of the system 100 to coordinate activities between system components can facilitate generating results in a dynamic fashion. For example, the user interface can generate a household profile module 200, a budget builder module 400, a home search module 500, an affordability module 300, an agent contact module 600, etc. In some embodiments, the affordability module 300 can be configured as the hub of the system 100. (See FIG. 2). For example, the affordability module 300 can be programmed to drive the other modules 200, 400, 500, 600 and coordinate activities between the system components. Entering data in one module can cause the system 100 to act on system components via another module. In addition, the system 100 itself can acquisition data from a module, which again can cause the system 100 to act on system components via another module. The affordability module 300 can be used to set parameters related to the display of information, how information is collected, and which and to what degree a system component is acted upon.

Figure 3:
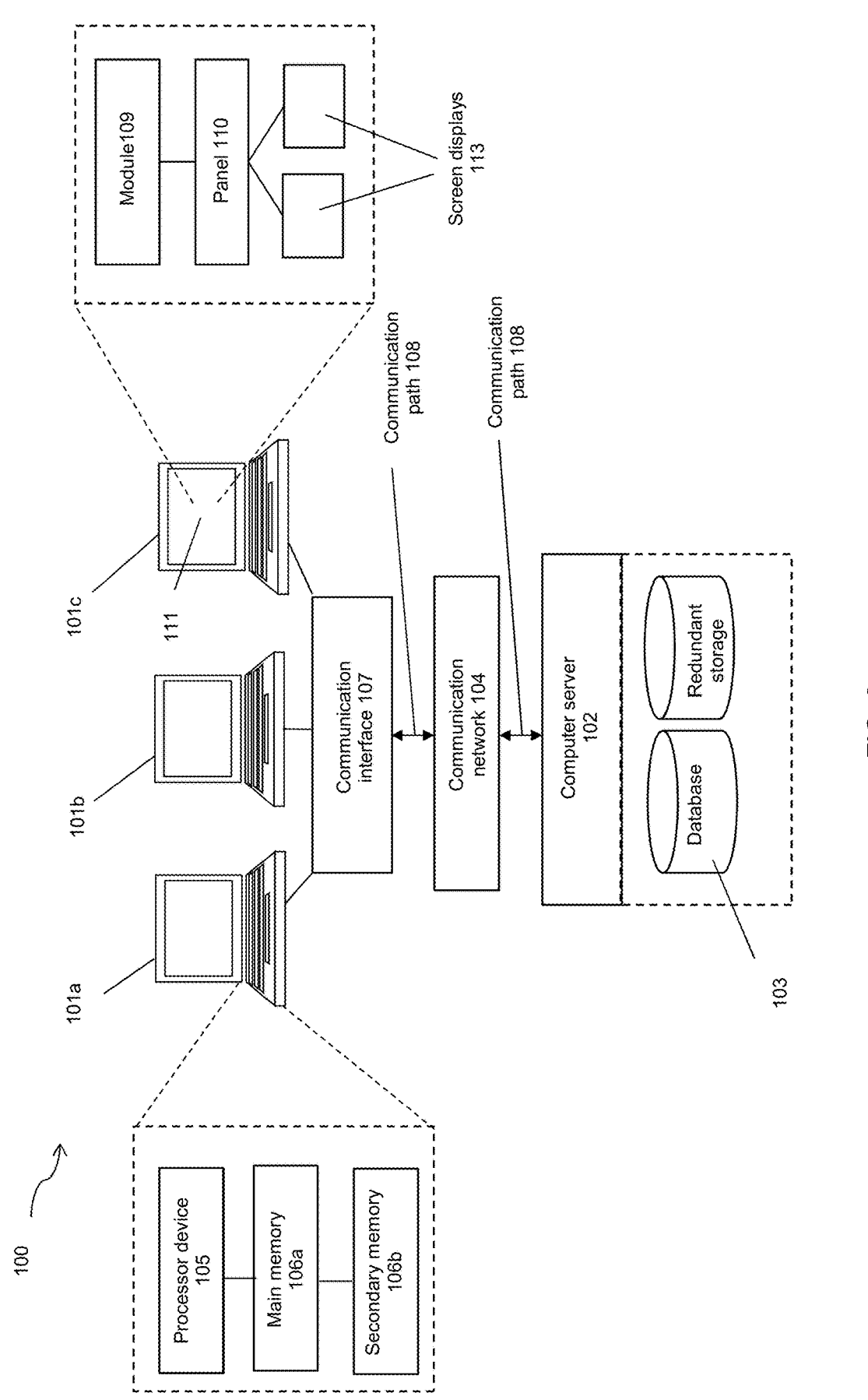
FIG. 3 is an exemplary computer system architecture that may be used for an embodiment of the affordability tool.
Figure 4:
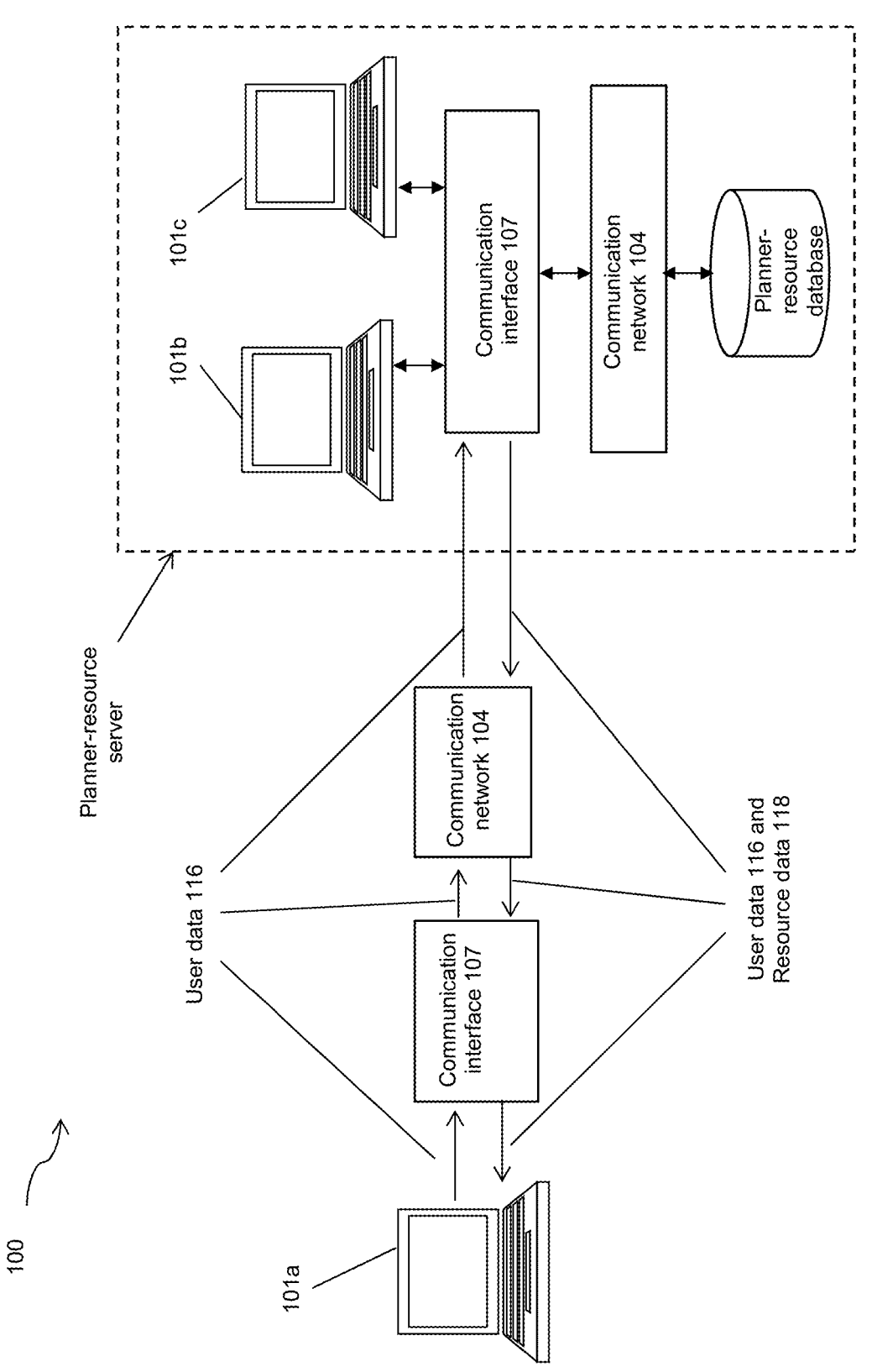
FIG. 4 is an exemplary data flow diagram demonstrating transmission and configuration of data that may occur between various components of an embodiment of the system.

Referring now to FIG. 3-4, exemplary system 100 configurations are disclosed. The system 100 can include at least one computer device 101. For example, the system 100 can include a user computer 101*a*, a planner computer 101*b*, and/or a resource computer 101*c*. A user computer 101*a* may be used by an individual seeking to purchase a home. A planner computer 101*b* may be used by an individual (e.g., administrator, agent, etc.) at an institution (e.g., a financial institution) hosting the system 100. A resource computer 101*c* may be used by an individual at a resource organization (e.g., home listing organization, mortgage rate provider, credit rating provider, etc.). Any of these individuals can be considered a user of the system 100. Any one or combination of computers 101 can be in operative communication with each other. This can be achieved via a computer network 104 of the system 100. Any one or combination of computer devices 101 may be part of a server 102, which can include a database 103 in operative association with the computer

101. In some embodiments, a computer 101 can include a processor 105, a non-transitory memory 106*a*, 106*b*, and/or a display monitor 111. Any one or combination of computers 101 can be in operative communication with the system 100.

Some embodiments can include a user server associated with the user computer 101*a*, a planner server associated with the planner computer 101*b*, and/or a resource server associated with the resource computer 101*c*. Any one or combination of the user server, planner server, and/or resource server can be part of a single server. For example, the planner computer 101*b* and the resource computer 101*c* may be part of a planner-resource server and share a planner-resource database, while the user computer 101*a* can be placed in operative communication with the planner-resource server and planner-resource database. (See FIG. 4). Such a system 100 configuration may generate efficiencies and result in faster processing times. One skilled in the art will appreciate, with the benefit of the present disclosure, that other system configurations may be used.

The computer network of the system 100 may include a plurality of computer devices 101*a*-101*c*, computer servers 102, databases 103, communication networks 104, and/or communication path/connections 108. A user of the system 100 may use at least one processor device 105, memory storage 106*a*, 106*b*, and communications interface 107 to communicate with the system 100 and execute commands. Each computer server 102 may be connected to at least one database 103. Application software executed by any one or combination of computer devices 101*a*-101*c* may carry out functions of storing, coalescing, configuring, and/or transmitting data. Application software may be stored on any type of suitable computer-readable medium or media. This may be a non-transitory computer-readable medium or media, such as a magnetic storage medium, optical storage medium, or the like. Any one or all of the system databases and/or databases connected to the system can include a redundant storage database.

The system 100 may be implemented via a website, which may be done through the Internet. In some embodiments, the system can include a site catalyst 114. This may be used to measure, collect, analyze, and or report Internet traffic data related to the website. (See FIG. 1).

In some embodiments, the computer network may include a processor 105 that can be operatively associated with at least one module 109. The module 109 may be programmed to display panels 110 and/or screen displays 113 on a computer device monitor 111. The processor 105 may be programmed to execute computer-readable instructions included within a module 109. Computer-readable instructions may be in a form of application software stored on a non-transitory computer readable medium operatively associated with a processor 104. Each module 109 may be configured to generate a user interface and/or graphical user interface (GUI) that can facilitate at least one user issuing commands, accessing data stored on a data storage media operatively associated with the processor 105, and/or transmitting data to and from the data storage media. A module 109 may include software, firmware, hardware, or any reasonable combination thereof. For example, a module 109 can be any one of the household profile module 200, the budget builder module 400, the home search module 500, the affordability module 300, and the agent contact module 600.

Figure 5:
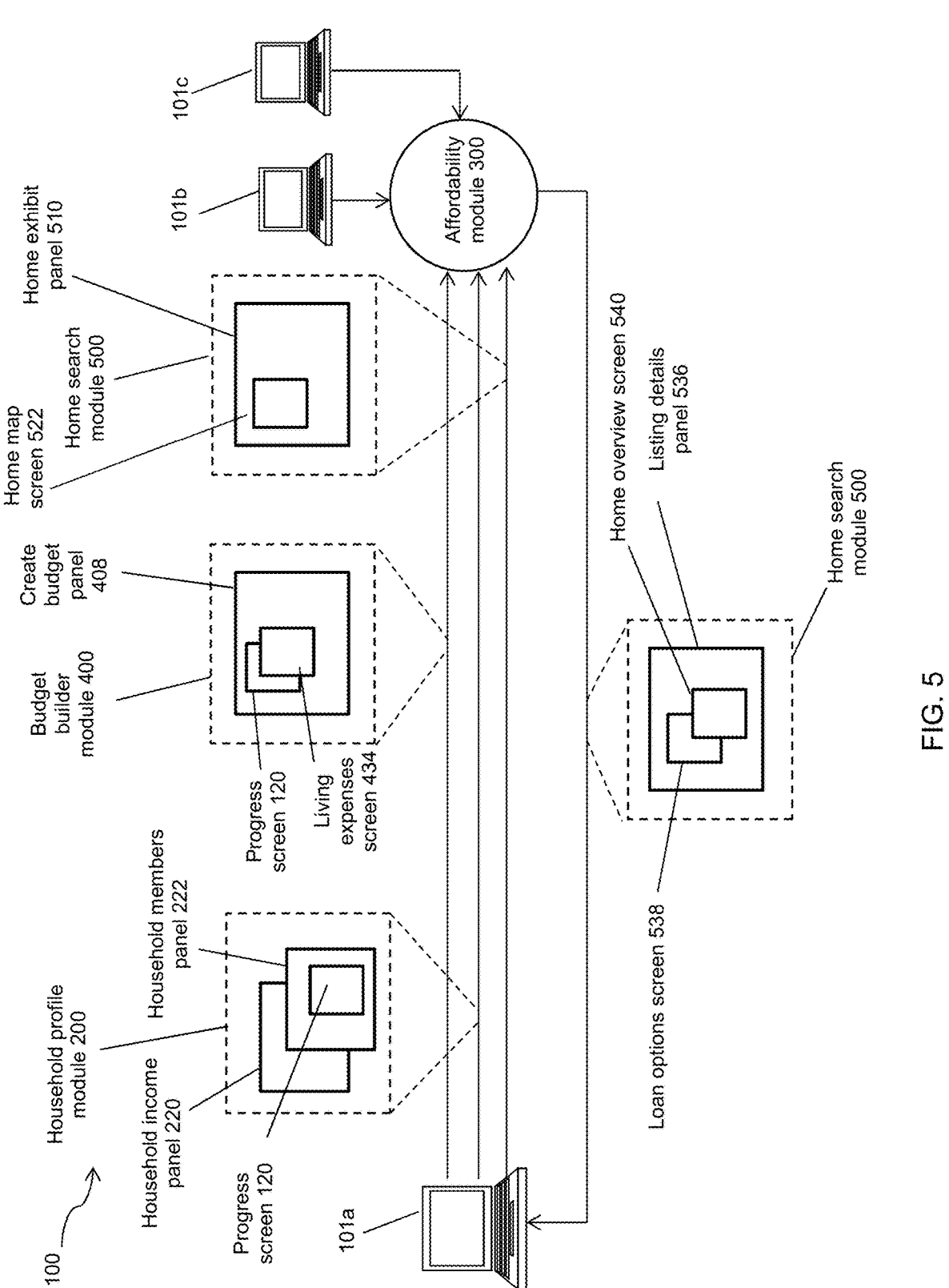
FIG. 5 is an exemplary data flow diagram demonstrating transmission and configuration of data that may occur between various components of an embodiment of the system with the affordability module configured as a hub.

Referring to FIGS. 3 and 5, an embodiment of the system 100 can be configured to dynamically build an affordability assessment based on data inputted by users (user data 116) and/or data pulled from system components (resource data 118) by the system 100. For example, a module 109 may be programmed to display at least one panel 110. A panel 110 may be configured to display information and/or grant access to data related to certain aspects and functionalities of the system 100. A panel 110 may be further configured to display a screen 113.

For example, a module 109 may be a component of the system 100 configured to facilitate generating a household profile. The household profile module 200 may be programmed to generate various panels 110 configured to present and collect data related to a household income panel 220, a household members panel 222, a location/region panel 234, etc. The budget builder module 400 may be programmed to generate various panels 110 configured to present and collect data related to a create a budget panel 408, income & payroll taxes panel 420, etc. The home search module 500 may be programmed to generate various panels 110 configured to present and collect data related to find a home panel 504, home exhibit panel 510, etc. Any one or combination of panels 110 may be programmed to generate various screens 113 configured to present and collect data related to progress screens 120, confirmation screens 130, living expenses screens 434, home map screen 522, etc. The differentiated displays and interactions of the various modules 109, panels 110, and/or and screens 113 may be configured to enable concerted interaction, filtered display of information, and/or secured containment of sensitive information. Through the various modules 109, panels 110, and/or screens 113, the computer network can provide a communication network 104 to orchestrate interaction between a user, the system 100, and the various components of the system 100.

Some embodiments of the system 100 can include a user interface. The user interface can be displayed on a computer device 101 upon accessing the system 100. The user interface can be programmed to display at least one tab. A tab can be programmed to be actuable. In some embodiments, actuating the tab can direct a user to a module.

Possible computer system architectures for the computer network of the system 100 will be discussed later.

Figure 6:
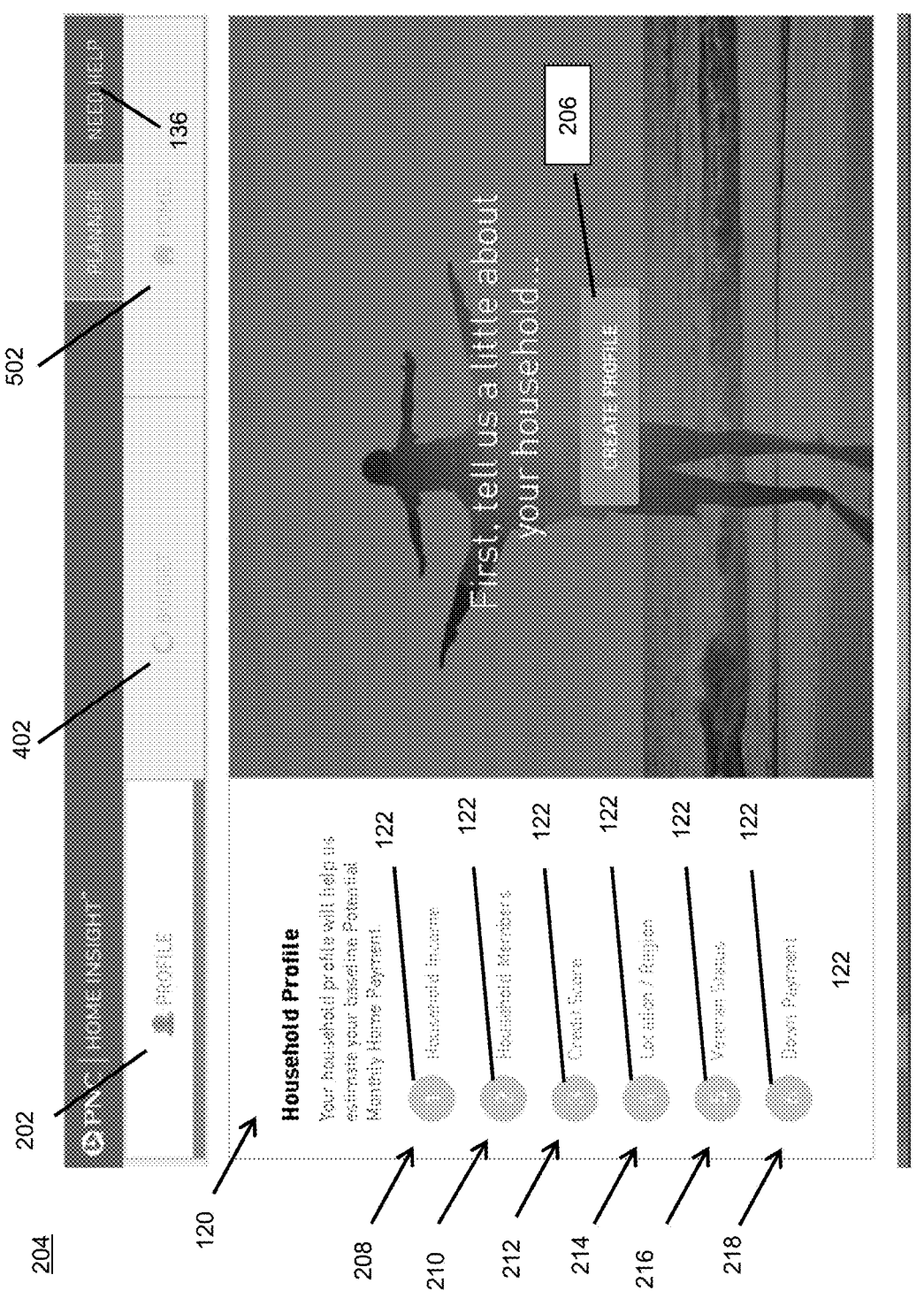
FIG. 6 is an exemplary create a profile panel that may be displayed with an embodiment of the system.

Referring to FIGS. 6-19, an exemplary household profile module 200 is disclosed. FIG. 6 shows the user interface including a create profile tab 202, a budget builder tab 402, and a home search tab 502. FIG. 6 also shows the household profile module 200 due to actuation of the create profile tab 202. In particular, FIG. 6 shows a create profile panel 204. The create profile panel 204 may be programmed to display a create profile button 206. Actuating the create profile button 206 can generate more panels within the household profile module 200. In some embodiments, actuating the create profile button 206 can cause the system 100 to generate and navigate to one of the panels within the household profile module 200.

The create profile panel 204 may be programmed to display a progress screen 120. The progress screen 120 can include at least one icon. Each icon can correspond to a panel within the household profile module 200. For example, the progress screen 120 can include a household income icon 208, a household members icon 210, a credit score icon 212, a location/region icon 214, a veteran status icon 216, and/or a down payment icon 218. Each icon can highlight (e.g., change in font and/or change in color) when the corresponding panel is accessed. In some embodiments, each icon can remain highlighted and/or change again with a different highlighting scheme after a predetermined amount of data has been inputted and/or acquisitioned for that panel. The predetermined amount of data may be data that is sufficient to provide the system 100 the information needed regarding an aspect of the affordability assessment. For example, if enough information has been entered and/or acquisitioned to allow the system 100 to determine a user's household income, the household income icon 208 may highlight by changing from a gray color to a green color. In some embodiments, the predetermined amount of data can include determining that the aspect (e.g., household income) of the affordability assessment is greater than or less than a set value. For instance, if enough information has been entered and/or acquisitioned to allow the system 100 to determine that a user's household income is greater than zero, for example, the household income icon 208 may highlight by changing from a gray color to a green color.

In some embodiments, at least one icon can be actuable. For example, actuating an icon can direct a user to the corresponding panel. In some embodiments, an icon can be associated with a number indicator 122. The number indicator 122 can provide a user with information about the order in which data should be supplied to the system 100. For example, FIG. 6 shows the household income icon 208 associated with the number "1", the household member icon 210 associated with the number "2", etc. This may be done to inform the user that data should be entered and/or acquisitioned for the household income panel 220 before data is entered and/or acquisitioned for the household members panel 222. In some embodiments, the number indicator 122 can be programmed to highlight in a similar manner as that of the corresponding icon.

Figure 7:
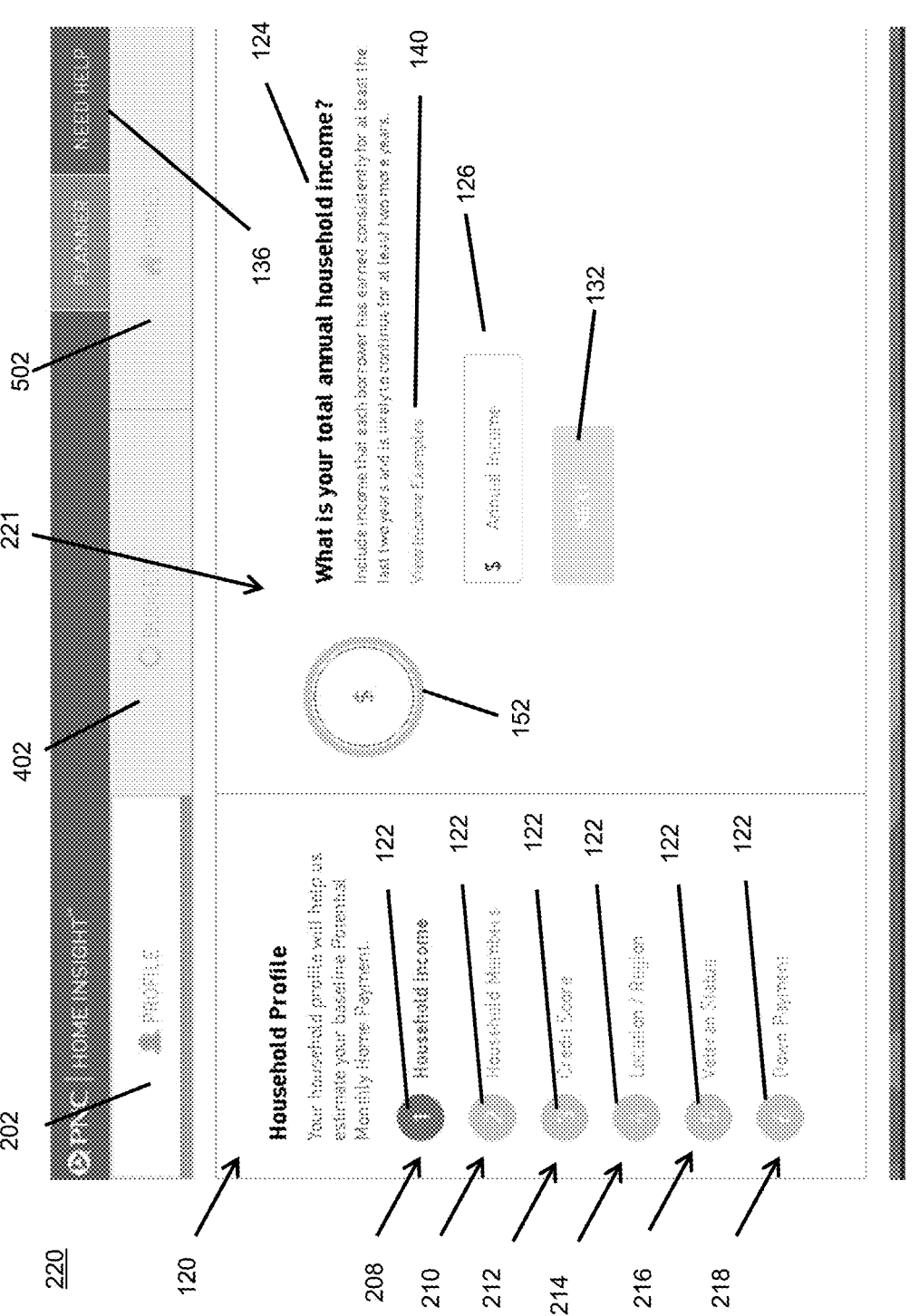
FIG. 7 is an exemplary household income panel that may be displayed with an embodiment of the system.

FIG. 7 shows an embodiment of the household income panel 220. In some embodiments, actuating the create profile button 206 can cause the system 100 to navigate to the household income panel 220. The household income panel 220 can be programmed to display the progress screen 120. The household income panel 220 can be programmed to display a household income screen 221. The household income screen 221 may be displayed adjacent the progress screen 120. The household income screen 221 can be programmed to solicit information about a user's income. For example, a question 124 can be displayed related to income. An input box 126 can be displayed and be associated with the question 124. FIG. 7 shows the system 100 questioning a user about the current annual household income. Upon entering the annual household income, the data can be transmitted to a memory 106a, 106b of a computer device 101 and/or a database 103 of the system 100.

Some embodiments can include a circular graphic 152. The circular graphic 152 can be programmed to display as aspect of the panel through which it is displayed. For example, the circular graphic 152 of the household income panel 220 can be programmed to display the household income of a user. In some embodiments, the circular graphic 152 can include a numerical value of the household income.

Figure 9:
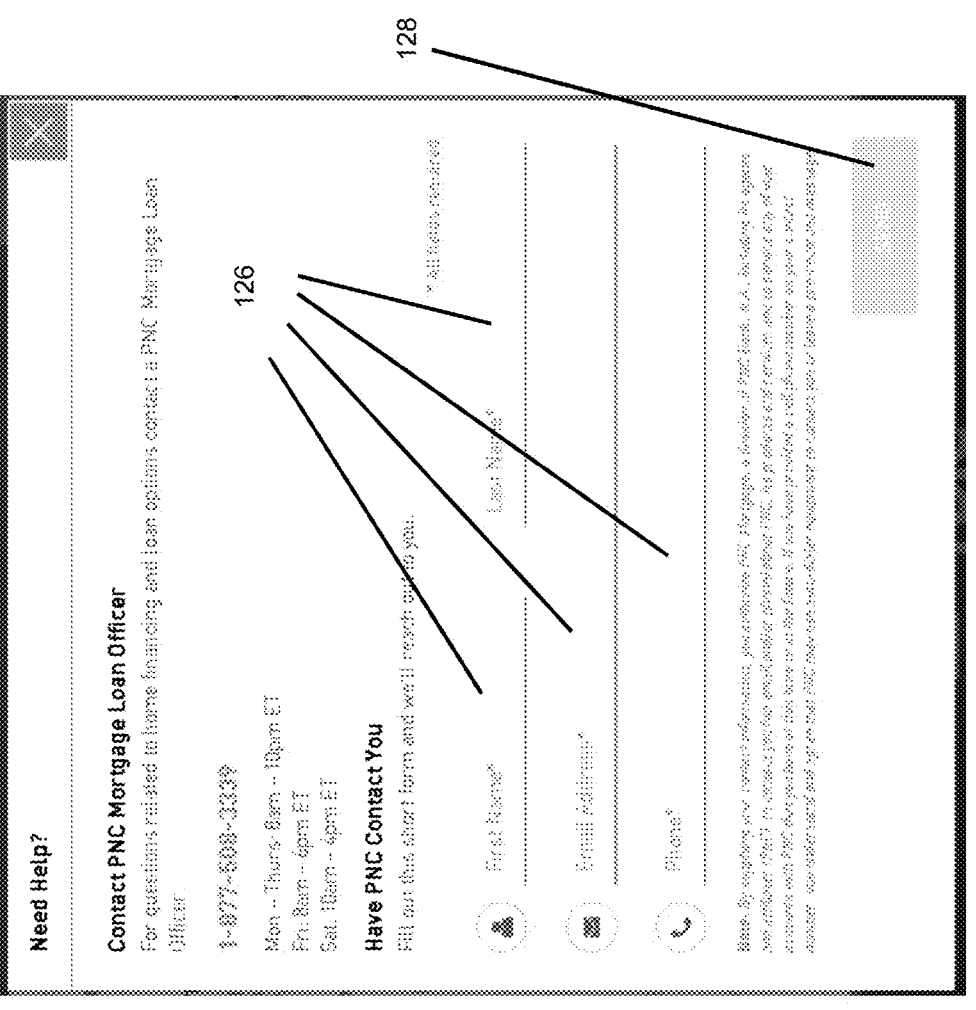
FIG. 9 is another exemplary help screen that may be displayed with an embodiment of the system.

FIG. 8 shows an embodiment of a help screen 134. The help screen 134 may be accessed by actuating the need help tab 136. The need help tab 136 can be accessed through any panel and/or any module. The help screen 134 can be used to provide assistance to a user related to navigating the system 100, entering data into the system 100, which type of data is acceptable and/or preferred, and/or how certain operations and calculations are performed by the system 100. In some embodiments, the help screen 134 displayed may be a specific help screen that corresponds to the module and/or panel of the need help tab 136 through which the help screen 134 was accessed. For example, FIG. 8 shows a help screen 134 that displays a list of income sources that may be used as part of the annual household income. Some income sources can include, but are not limited to, primary employment compensation, retirement income, notes receivable, unemployment benefits, etc. Alternatively, a help screen 134 can be automatically populated at any time the user navigates to a panel. FIG. 9 shows another embodiment of a help screen 134. The help screen 134 shown in FIG. 9 can be configured as a request form that may be transmitted to an agent. For example, a user can request help to gain guidance on how to complete their current task (e.g., how to compute household annual income), how to directly contact an agent, etc. Again, this may be achieved by actuating the need help tab 136. The request form can be formatted to have input boxes 126 corresponding to the user's name, user's contact information, etc. The request form can also include contact information of the agent. Upon completion of the request form, the user may transmit the request form to the system 100 by actuating the send tab 138. The system 100 can save the request form and/or the request form data to a memory 106a, 106b and/or a database 103. The system 100 may further transmit the request form and/or the request form data to another computer device 101. For example, the system 100 may transmit the request form and/or the request form data to a planner computer 101b. In addition, or in the alternative, a help screen 134 can be accessed by actuating a view examples tab 140. (See FIGS. 10-11). In some embodiments, any one or combination of help screens 134 can be configured as pop-up screens.

Figure 10:
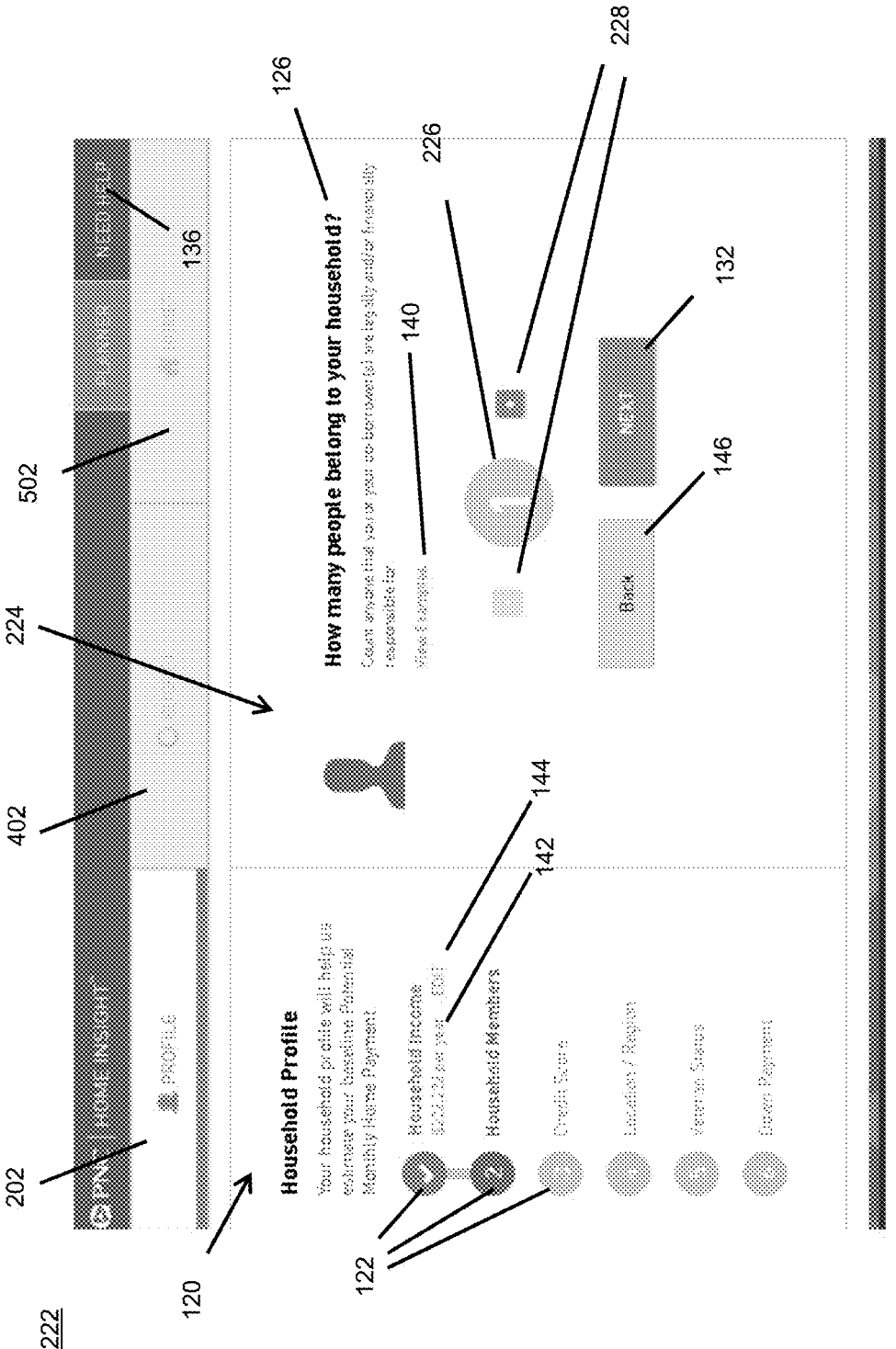
FIG. 10 is an exemplary household members panel that may be displayed with an embodiment of the system.

In some embodiments, the number indicator 122 can be programmed to change from a number to a check mark after a predetermined amount of data has been inputted and/or acquisitioned for that panel. For example, when the household income panel 220 has received enough information to generate an annual income, the number indicator 122 associated with the household income icon 208 may change from "1" to a check mark. This is shown in FIG. 10. The number indicators 122 for other icons in other modules can change in a similar manner upon the system 100 receiving a predetermined amount of data (see FIG. 24, for example). Any one or combination of panels can display the progress screen 120 with the checked number indicators 122 and/or highlighted icons that have been completed (e.g., a predetermined amount of data has been provided) and the unchecked number indicators 122 and/or un-highlighted icons that have not been completed (e.g., less than a predetermined amount of data has been provided). Any one or combination of icons can display summary data 142 adjacent the icon. The summary data 142 can be data that has been entered thus far, data representative of the completed data, etc. For example, FIG. 10 shows summary data 142 of $222,222/year that is the annual income entered via the household income panel 220. Summary data 142 can be displayed for other icons in other modules (see FIG. 30, for example).

Any one or combination of icons can display an edit tab 144. The edit tab 144 can be actuable. Actuating the edit tab 144 can allow a user to access the corresponding panel of the icon the edit tab 144 is associated with. For example, FIG. 10 shows the household income icon 208 displaying an edit tab 144. Actuating the edit tab 144 can cause the system 100 to navigate back to the household income panel 220. Edit tabs 144 can be displayed for other icons in other modules (see FIG. 30, for example).

Any panel can include a next tab 132 and/or a back tab 146. A user may actuate the back tab 146 (or next tab 132) to navigate to the previous panel (or next panel). Actuating the back tab 146 may cause the system 100 to navigate back to the panel that was most recently accessed, or cause the system 100 to access the panel that is indicated by the number indicators 122 to be the preceding panel. Actuating the next tab 132 may cause the system 100 to navigate to the panel that is indicated by the number indicators 122 to be the following panel.

FIG. 10 shows an embodiment of the household members panel 222. In some embodiments, the system 100 can automatically navigate to the household members panel 222 upon completion of the household income panel 220. In some embodiments, the household members panel 222 can be accessed by actuating the next tab 132 of the household income panel 220. The household members panel 222 can be programmed to display the progress screen 120. The household members panel 222 can be programmed to display a household members screen 224. The household members screen 224 may be displayed adjacent the progress screen 120. The household members screen 224 can be programmed to solicit information about the number of household members 226 within a user's current household. For example, FIG. 10 shows the system 100 questioning a user about the number of household members 226. In some embodiments, the household members screen 224 can include an increase/decrease dial 228 to generate the number of household members 226. Upon actuating the increase/decrease dial 228, the number of household members 226 can be displayed within a portion of the household members screen 224. Upon entering the number of household members 226, the data can be transmitted to a memory 106a, 106b of a computer device 101 and/or a database 103 of the system 100. The household members panel 222 can further include a back tab 146 and/or a next tab 132.

Figure 11:
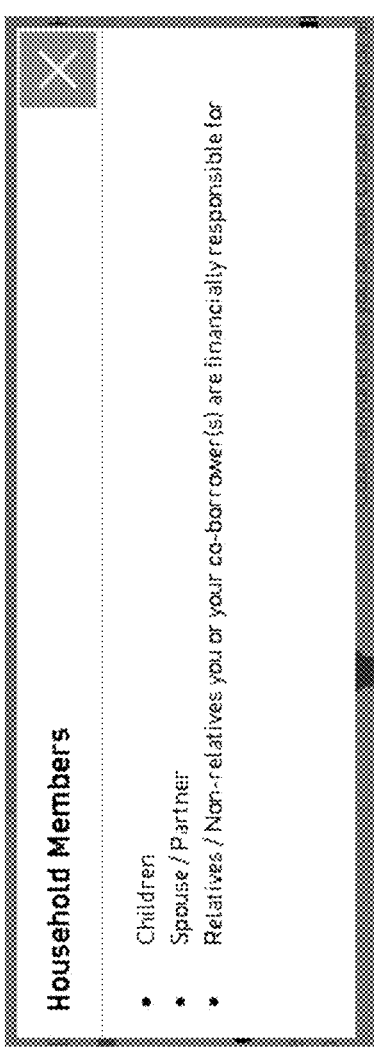
FIG. 11 is a help screen that may relate to the household members panel.

FIG. 11 shows an example of a help screen 134 that may be accessed by the view examples tab 140 of the household members panel 222. Alternatively, or in addition, this help screen 134 can be generated by actuating the need help tab 136 of the household members panel 222. FIG. 11 shows a help screen 134 that displays a list of persons that may be used to include as the number of household members 226. The list may include information to assist a user in determining who can qualify as a household member. For example, a household member can include children, spouse, partner, etc.

Figure 12:
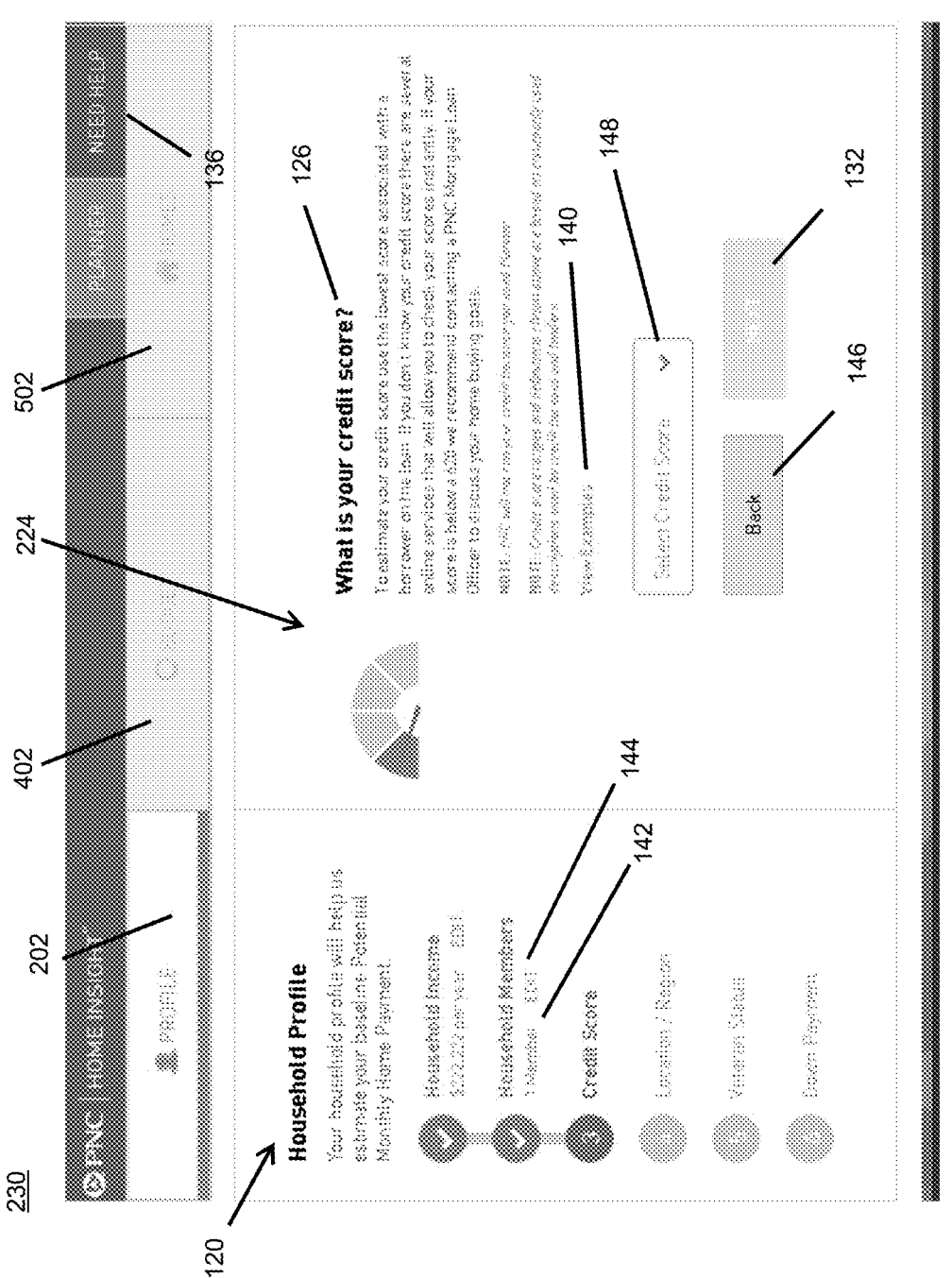
FIG. 12 is an exemplary credit score panel that may be displayed with an embodiment of the system.

FIG. 12 shows an embodiment of the credit score panel 230. In some embodiments, the system 100 can automatically navigate to the credit score panel 230 upon completion of the household members panel 222. In some embodiments, the credit score panel 230 can be accessed by actuating the next tab 132 of the household members panel 222. The credit score panel 230 can be programmed to display the progress screen 120. The credit score panel 230 can be programmed to display a credit score screen 232. The credit score screen 232 may be displayed adjacent the progress screen 120. The credit score screen 232 can be programmed to solicit information about the user's credit score. For example, FIG. 12 shows the system 100 questioning a user about their credit score. In some embodiments, the credit score screen 232 can include a dropdown menu 148 to generate the credit score. Upon actuating the dropdown menu 148, a credit score range may be displayed from which a user can choose. The dropdown menu 148 can include a plurality of credit score ranges. Examples of credit score ranges can include: Fair: 620-659; Good: 660-699; Very Good: 700-749; Excellent: 750+. Upon entering the credit score or credit score range, the data can be transmitted to a memory 106a, 106b of a computer device 101 and/or a database 103 of the system 100. The credit score panel 230 can further include a back tab 146 and/or a next tab 132.

Figure 13:
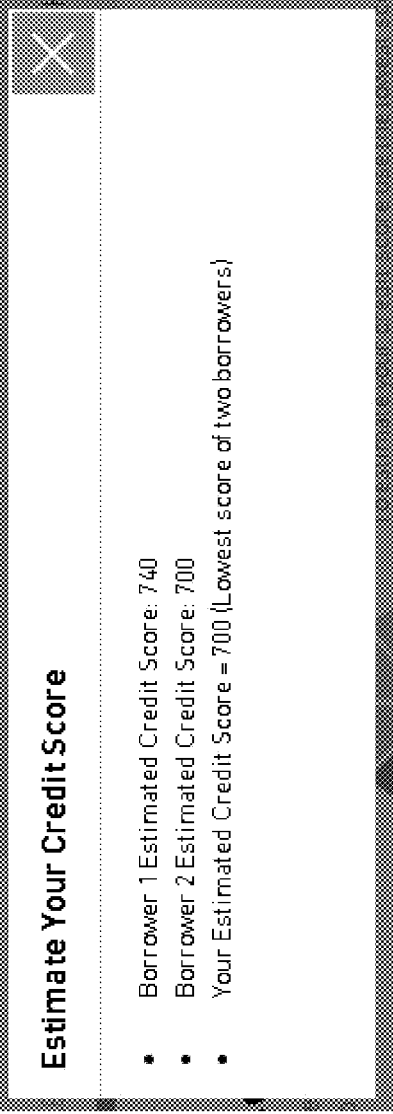
FIG. 13 is a help screen that may relate to the credit score panel.

FIG. 13 shows an example of a help screen 134 that may be accessed by the view examples tab 140 of the credit score panel 230. Alternatively, or in addition, this help screen 134 can be generated by actuating the need help tab 136 of the credit score panel 230. FIG. 13 shows a help screen 134 that displays instructions for estimating the credit score of two persons (e.g., spouse #1 and spouse #2). For example, spouse #1 may have a credit score of 740 and spouse #2 may have a credit score of 700, where the estimated credit score may be the lowest score (e.g., 700) of the two spouses.

Figure 14:
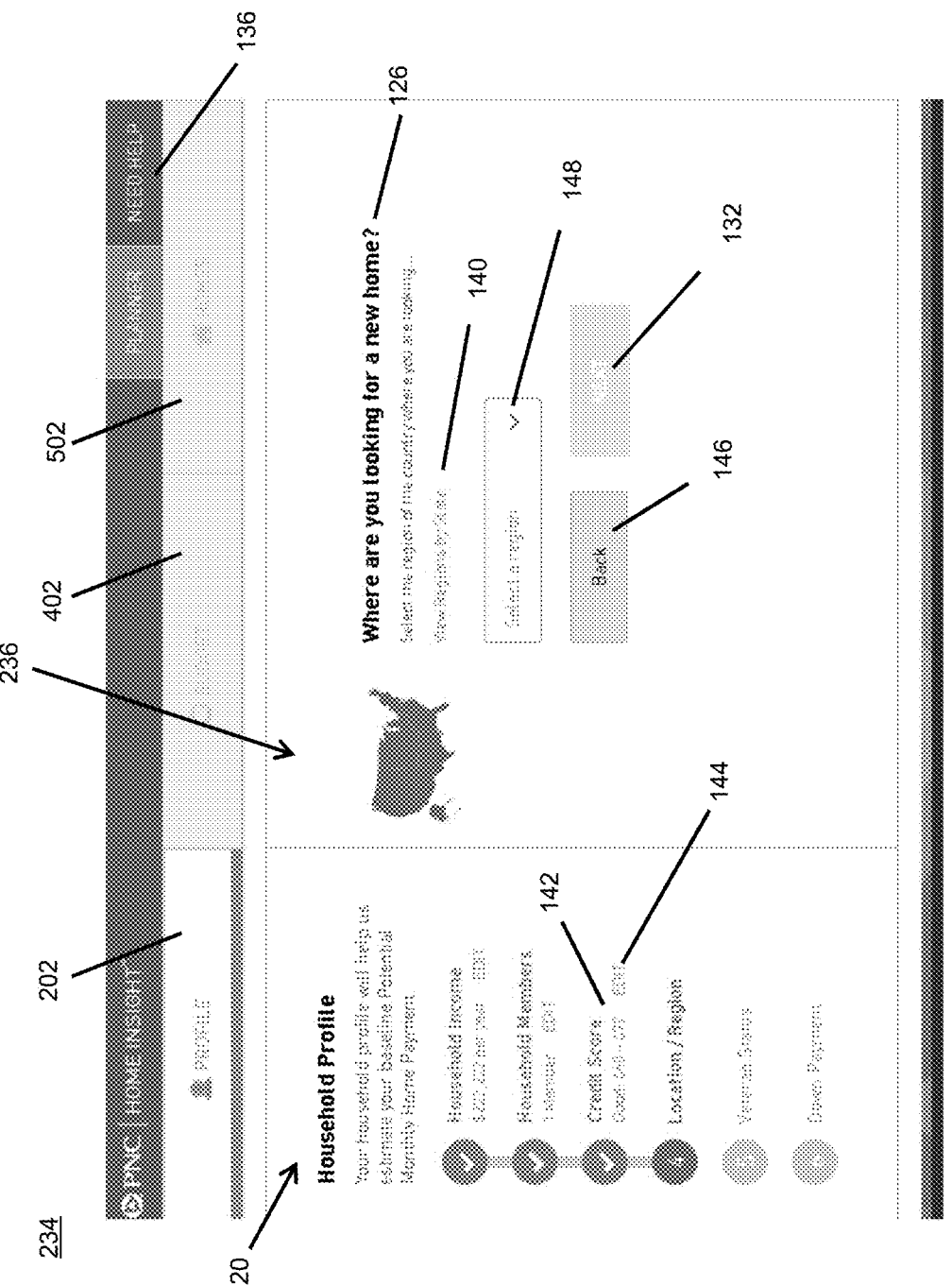
FIG. 14 is an exemplary location/region panel that may be displayed with an embodiment of the system.

FIG. 14 shows an embodiment of the location/region panel 234. In some embodiments, the system 100 can automatically navigate to the location/region panel 234 upon completion of the credit score panel 230. In some embodiments, the location/region panel 234 can be accessed by actuating the next tab 132 of the credit score panel 230. The location/region panel 234 can be programmed to display the progress screen 120. The location/region panel 234 can be programmed to display a location/region screen 236. The location/region screen 236 may be displayed adjacent the progress screen 120. The location/region screen 236 can be programmed to solicit information about the location/region where the user desires to purchase a home. For example, FIG. 14 shows the system 100 questioning a user about the location/region. In some embodiments, the location/region screen 236 can include a dropdown menu 148 to generate a location/region table 238. Upon actuating the dropdown menu 148, the location/region table 238 (see FIGS. 15A-15B) may be displayed. This can assist a user in determining the region(s) the user is interested in. Some regions can include Northeast, Midwest, South, West, etc. Some regions can be segmented into sub-regions. Some sub-regions for Northeast, for example, can include Connecticut, Maine, New Hampshire, etc. In some embodiments, the location/region table 238 can be displayed via the view regions by state tab 140. Upon entering the location/region, the data can be transmitted to a memory 106a, 106b of a computer device 101 and/or a database 103 of the system 100. The location/region panel 234 can further include a back tab 146 and/or a next tab 132.

Figure 16:
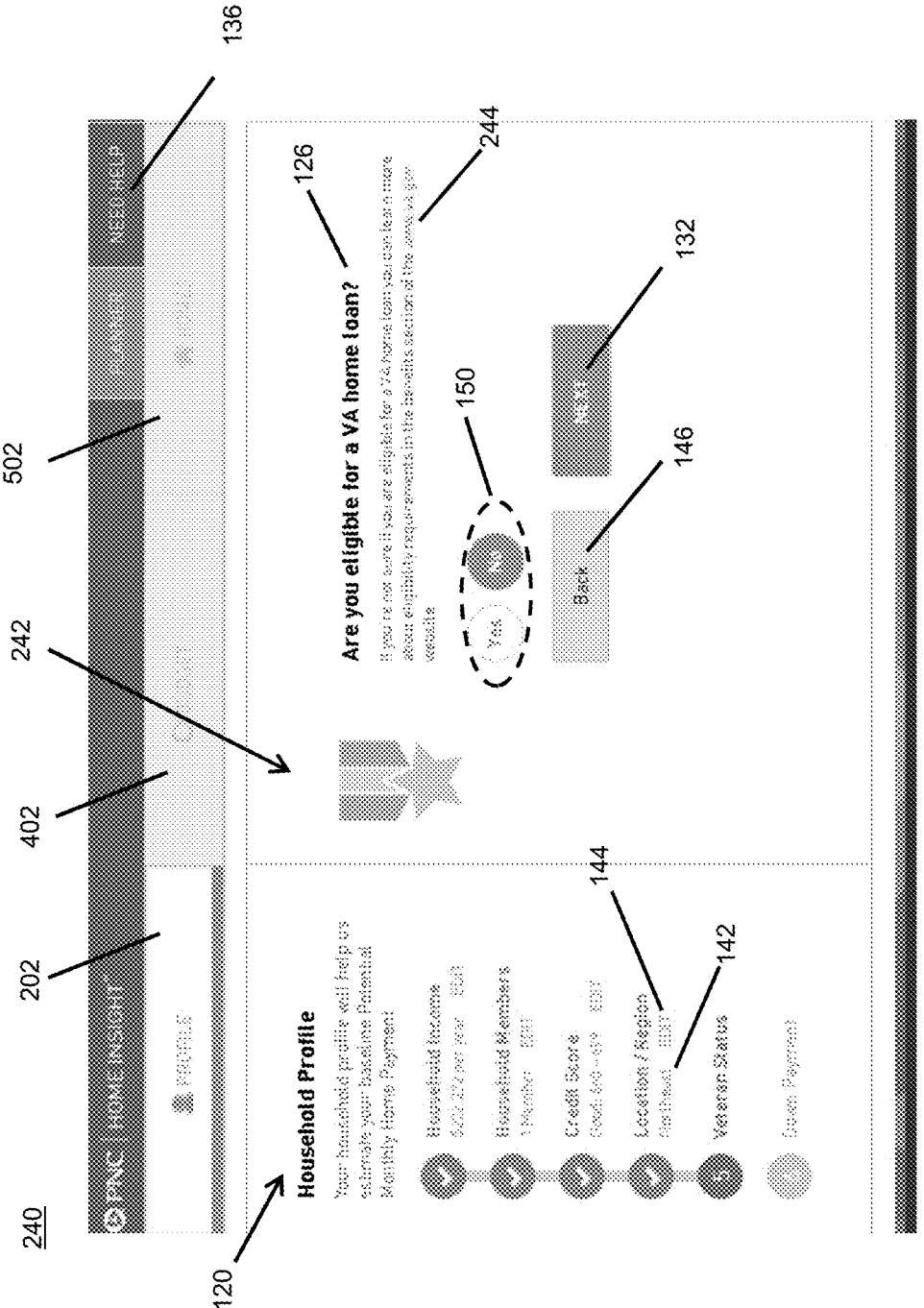
FIG. 16 is an exemplary veteran status panel that may be displayed with an embodiment of the system.

FIG. 16 shows an embodiment of the veteran status panel 240. In some embodiments, the system 100 can automatically navigate to the veteran status panel 240 upon completion of the location/region panel 234. In some embodiments, the veteran status panel 240 can be accessed by actuating the next tab 132 of the location/region panel 234. The veteran status panel 240 can be programmed to display the progress screen 120. The veteran status panel 240 can be programmed to display a veteran status screen 242. The veteran status screen 242 may be displayed adjacent the progress screen 120. The veteran status screen 242 can be programmed to solicit information about the user's veteran status. For example, FIG. 16 shows the system 100 questioning a user about their veteran status. This can include whether a user is eligible for a U.S. Veterans Affairs sponsored loan. In some embodiments, the veteran status screen 242 can include a radio button 150 to indicate the veteran status. For instance, there can be a "Yes" radio button 150 and a "No" radio button 150. Upon actuating the Yes or No radio button 150, the data can be transmitted to a memory 106a, 106b of a computer device 101 and/or a database 103 of the system 100. The veteran status panel 240 can further include a back tab 146 and/or a next tab 132. Some embodiments can include a Veterans Affairs link 244. Actuating the Veterans Affairs link 244 can cause a computer device 101 to navigate to a website sponsored and/or administrated by the U.S. Veterans Affairs. This may be done to allow a user to obtain information about veterans status and/or assist a user in entering data related to veterans status.

Figure 17:
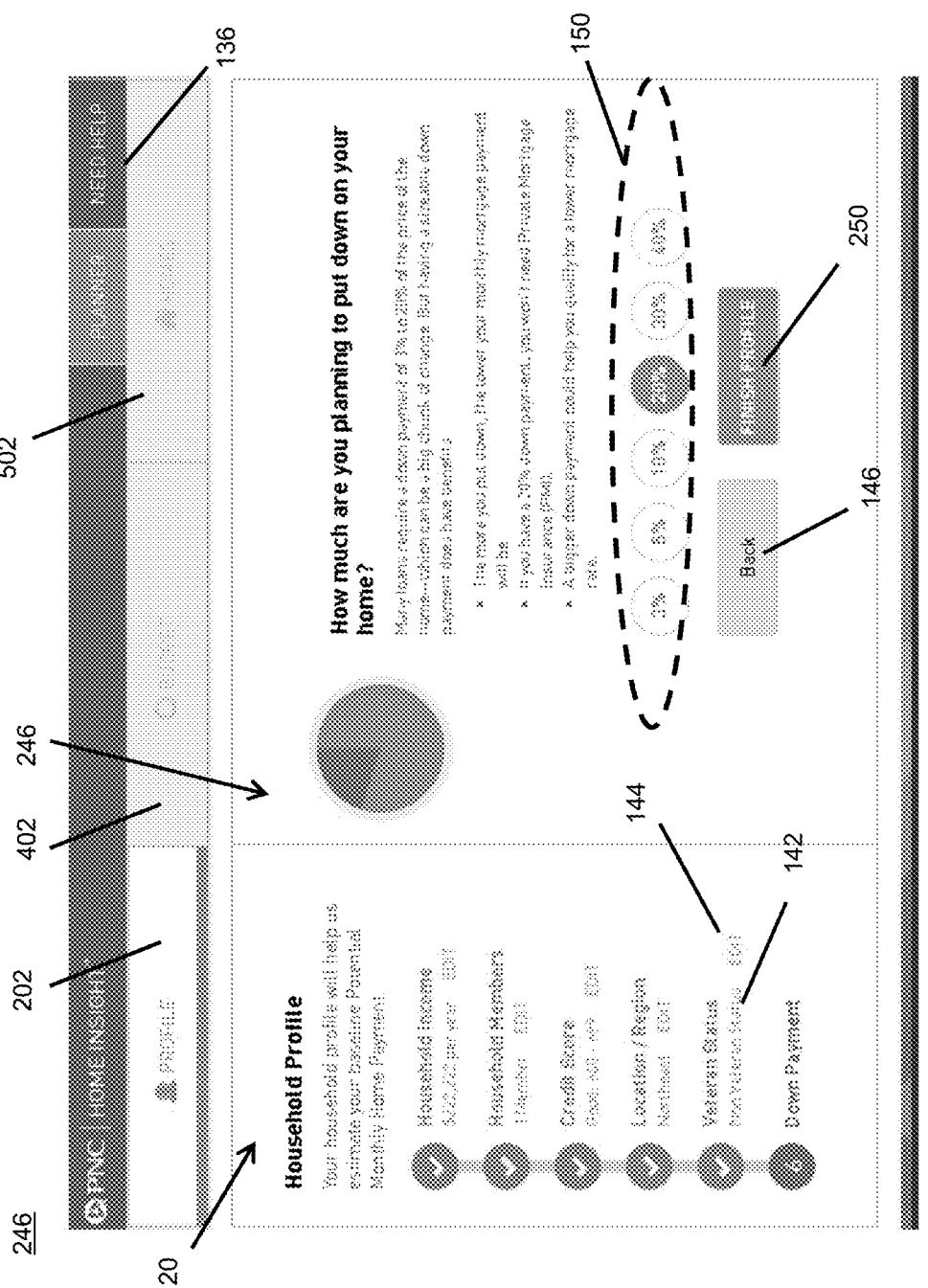
FIG. 17 is an exemplary down payment panel that may be displayed with an embodiment of the system.

FIG. 17 shows an embodiment of the down payment panel 246. In some embodiments, the system 100 can automatically navigate to the down payment panel 246 upon completion of the veterans status panel 240. In some embodiments, the down payment panel 246 can be accessed by actuating the next tab 132 of the veterans status panel 240. The down payment panel 246 can be programmed to display the progress screen 120. The down payment panel 246 can be programmed to display a down payment screen 248. The down payment screen 248 may be displayed adjacent the progress screen 120. The down payment screen 248 can be programmed to solicit information about the user's down payment. For example, FIG. 17 shows the system 100 questioning a user about their down payment. This can include how much a user expects to provide as a down payment for the home. The down payment can be represented as a percentage. The percentage can be the down payment amount as a ratio of the total value of the home, the down payment amount as a ratio of the total amount of a loan for the home, etc. In some embodiments, the down payment screen 248 can include a radio button 150 to indicate the down payment. For instance, there can be a "3%" radio button 150, a 5% radio button 150, a 10% radio button 150, etc. Upon actuating entering the down payment data, the data can be transmitted to a memory 106a, 106b of a computer device 101 and/or a database 103 of the system 100. The down payment panel 246 can further include a back tab 146 and/or a finish profile tab 250. The finish profile tab 250 can be programmed to operate like next tab, but cause the system 100 to navigate to another module instead of another panel within the home profile module 200.

Figure 18:
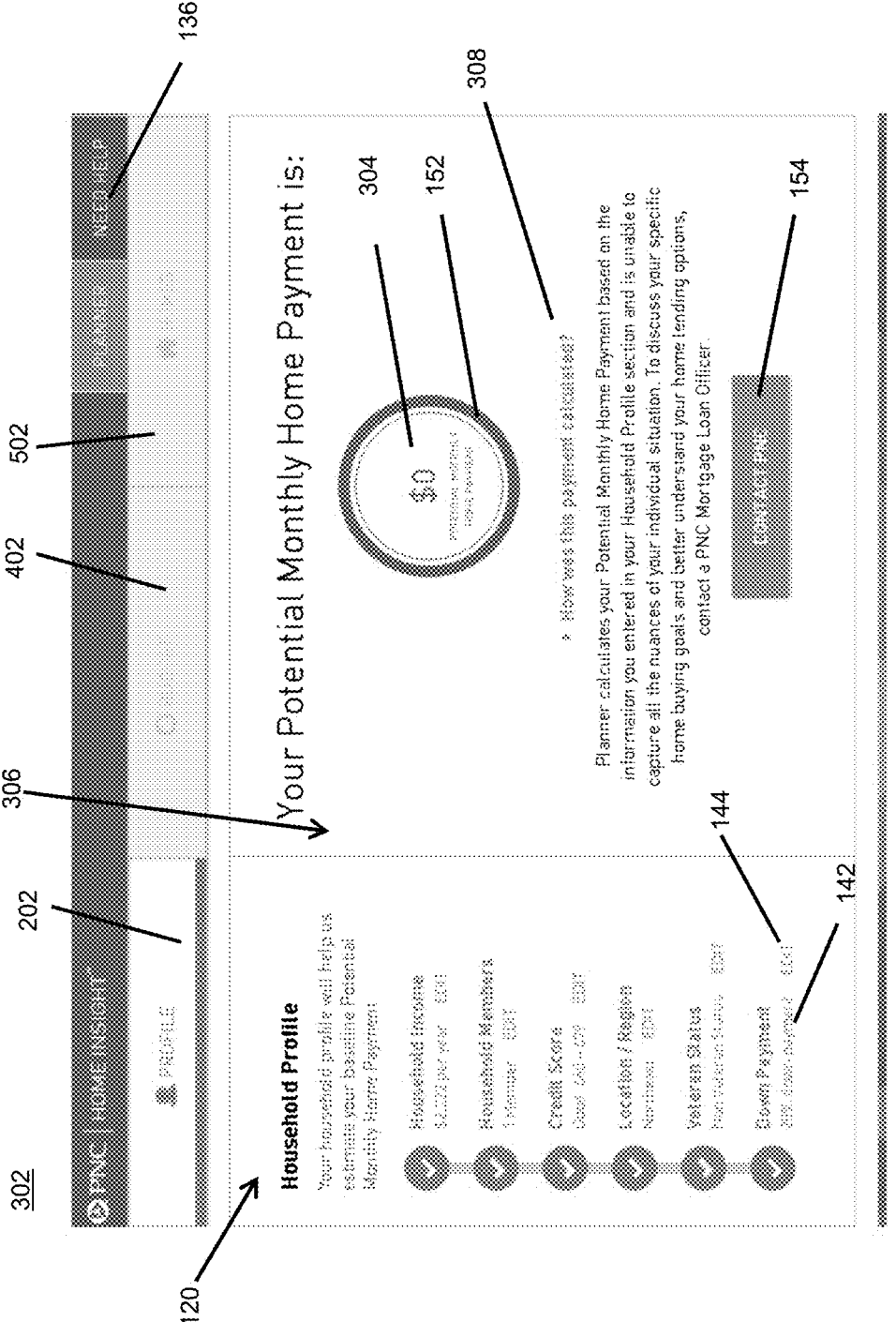
FIG. 18 is an exemplary affordability panel that may be displayed with an embodiment of the system.

FIG. 18 shows an exemplary affordability panel 302 that may be generated from the affordability module 300. In some embodiments, the affordability module 300 is being operated in the background. For example, the affordability module 300 can be programmed to continually, periodically, and/or at predefined times receive user data 116 and/or resource data 118. The data 116, 118 may be used by the affordability module 300 to generate the affordability assessment. The data 116, 118 may also be used to update the affordability assessment on a continuous, periodic, and/or at a predefined times. (See FIG. 5, for example). The affordability assessment can be updated by data obtained from any of the panels and at any time. In some embodiments, the affordability assessment can be based, at least in part, on a potential monthly home payment (PMHP) 304. The calculation of PMHP 304 may be performed in different ways (e.g., at least two different calculations can be used and each calculation may be used as a factor in determining the PMHP 304). In some embodiments, the affordability module 200 can normalize data 116, 118 to make accurate comparisons and/or perform accurate calculations. For example, the affordability module 200 may convert any of the annual data (e.g., annual income) to monthly data (e.g., monthly income).

In at least one embodiment, the system 100 may use three calculations within the affordability module to generate the PMHP 304:

1) PMHP=Debt-to-Income (DTI) Limit=The least of:
    A.) [max front-end ratio]×[monthly income] where [max front-end ratio]=0.28

B.) ([max front-end ratio]×[monthly income])+(([max back-end ratio]–[user's DTI ratio]–[max front-end ratio])×[monthly income]) where:

a. [user's DTI ratio]=[monthly income]/×[user entered debts and obligation in budget section] and b. [max front-end ratio]=0.28 c. [max back-end ratio]=0.43

2) PMHP=[monthly income]–[monthly expenses entered in budget], where [monthly expenses entered in budget]= [income and payroll taxes+debts and obligations+living expenses+job related expenses+savings and retirement] and excludes expenses associated with a home they are selling before they purchase the new home under consideration, if applicable, and expenses associated with the home they are considering.

3) PMHP=residual income limit=[monthly income]–[income and payroll taxes+debts and obligations+job related expenses+X], where X=the minimum residual income taken from the Federal Housing Administration (FHA) and Veterans Affairs (VA) table:

TABLE I

| Minimum Residual Income From FHA and VA: For Loan Amounts <$80,000 | | | | |
|---|---|---|---|---|
| Family Size | Northeast | Midwest | South | West |
| 1 | $390 | $382 | $382 | $ 425 |
| 2 | $654 | $641 | $641 | $ 713 |
| 3 | $788 | $772 | $772 | $ 859 |
| 4 | $888 | $868 | $868 | $ 967 |
| 5 | $921 | $902 | $902 | $1,004 |
| Over 5 | Add $75 for each additional member up to a family of 7 | | | |

Note:
that the Minimum Residual Income table may change from time to time.

Another factor used in the affordability assessment can be Maximum Total Monthly Home Expenses (MTMHE). The MTMHE can be the maximum monthly home expenses a user can support based on the user data 116 and/or the resource data 118. The MTMHE can be calculated by taking the least of calculations 2 and 3 from the PMHP 304. The MTMHE may represent the most a user can afford to spend on a home including the Total Monthly Home Payment and an estimate of the costs of maintenance and utilities.

The system 100 can be programmed to use any one or combination of the PMHP 304 calculations. In some embodiments, the system 100 can be programmed to use the lowest value calculated from the different PMHP calculations as the PMHP 304. Any one or combination of PMHP 304 calculations can be dynamic and may be updated as user data 116 and/or resource data 118 is entered and/or acquisitioned from the system 100. For example, some embodiments can include a budget builder module 400 that can be used to obtain more information (the budget builder module will be explained in detail later). This additional information may be used to update the PMHP 304. As another example, a user can change the home profile data at any time, which can cause the system 100 to update the PMHP 304.

The affordability panel 302 can be displayed at any time and via any module. For example, the affordability panel 302 can be displayed upon a user actuating the finish profile tab 250 and/or the finish budget tab 444 (see FIG. 30A). In some embodiments, the affordability panel 302 can display when the PMHP 304 is determined to be less than a predetermined amount (e.g., zero). In some embodiments, the system 100 can require a user to input additional user data 116 and/or revise user data 116 when the PMHP 304 is less than the predetermined amount. With some embodiments, a help screen 134 may appear when the system determines the PMHP 304 to be less than the predetermined amount. This can include appearing automatically and/or appearing when a user actuates the need help tab 136 of the affordability panel 302. The help screen 134 can be in the form of a suggested list of corrective action (see FIG. 8) and/or a request form (see FIG. 9). Some embodiments can include a contact agent tab 154. The contact agent tab 154 can be a financial professional that may assist a user in entering data related to the PMHP 304.

In at least one embodiment, actuating the contact agent tab 154 can cause the system 100 to display a request form similar to the one of FIG. 9. Some embodiments can require a user to have a PMHP 304 greater than the predetermined amount before advancing to another module. For example, the system 100 can be configured such that a user must complete a household profile before entering user data 116 into another module and/or before the system acquisitions resource data 118 from another module. This may be done to allow the affordability module 300 to determine the PMHP 304 (or at least a baseline PMHP) before a user enters user data 116 within the budget builder module 400, enters user data 116 within the home search module 500, etc.

The affordability panel 302 can be programmed to display the progress screen 120. The affordability panel 302 can be programmed to display an affordability screen 306. The affordability screen 306 may be displayed adjacent the progress screen 120. The affordability screen 306 can be programmed to display information about a user's PMHP 304. For example, FIG. 18 shows the system 100 displaying the calculated PMHP 304. In some embodiments, the PMHP 304 can be displayed as a numerical value. In some embodiments, the PMHP 304 can be displayed as a numerical value within a circular graphic 152. The circular graphic 152 can change in color depending on whether the PMHP 304 is above or below the predetermined value. For example, if the PMHP 304 is calculated to be below the predetermined value, the circular graphic 152 may be illustrated as red. If the PMHP 304 is calculated to be above the predetermined value, the circular graphic 152 may be illustrated as green. Other colors schemes can be used.

Referring to FIG. 19, some embodiments can include a how was my payment calculated tab 308. The how was my payment calculated tab 308 can be actuable. Actuating the how was my payment calculated tab 308 can populate a how was my payment calculated screen 310. The how was my payment calculated screen 310 can be configured as a pop-up screen with information pertaining to the calculation of the PMHP 304.

Referring to FIGS. 20-32, an exemplary budget builder module 400 is disclosed. The budget builder module 400 may be accessed by actuating the budget builder tab 402. In some embodiments, the system 100 can navigate to the budget builder module 400 after a predetermined number of icons of the household profile module 200 have been completed. This can include a user inputting a predetermined amount of user data 116 and/or the system 100 acquisitioning a predetermined amount of resource data 118 to determine the PMHP 304. In some embodiments, this can further include when the system 100 has determined the PMHP 304 to be greater than a predetermined value.

The budget builder module 400 can be used to gather data related to aspects of a user's budget. This can include at least one parameter used within the PMHP 304 calculations. For example, the budget builder module 400 may be used to solicit information related to debts and obligations of a user. This data can then be used by the affordability module 300 to update any one of the PMHP calculations. The system 100 can then again use the lowest value calculated from the different PMHP calculations as the PMHP 304, thereby continuously updating the PMHP 304.

Figure 20:
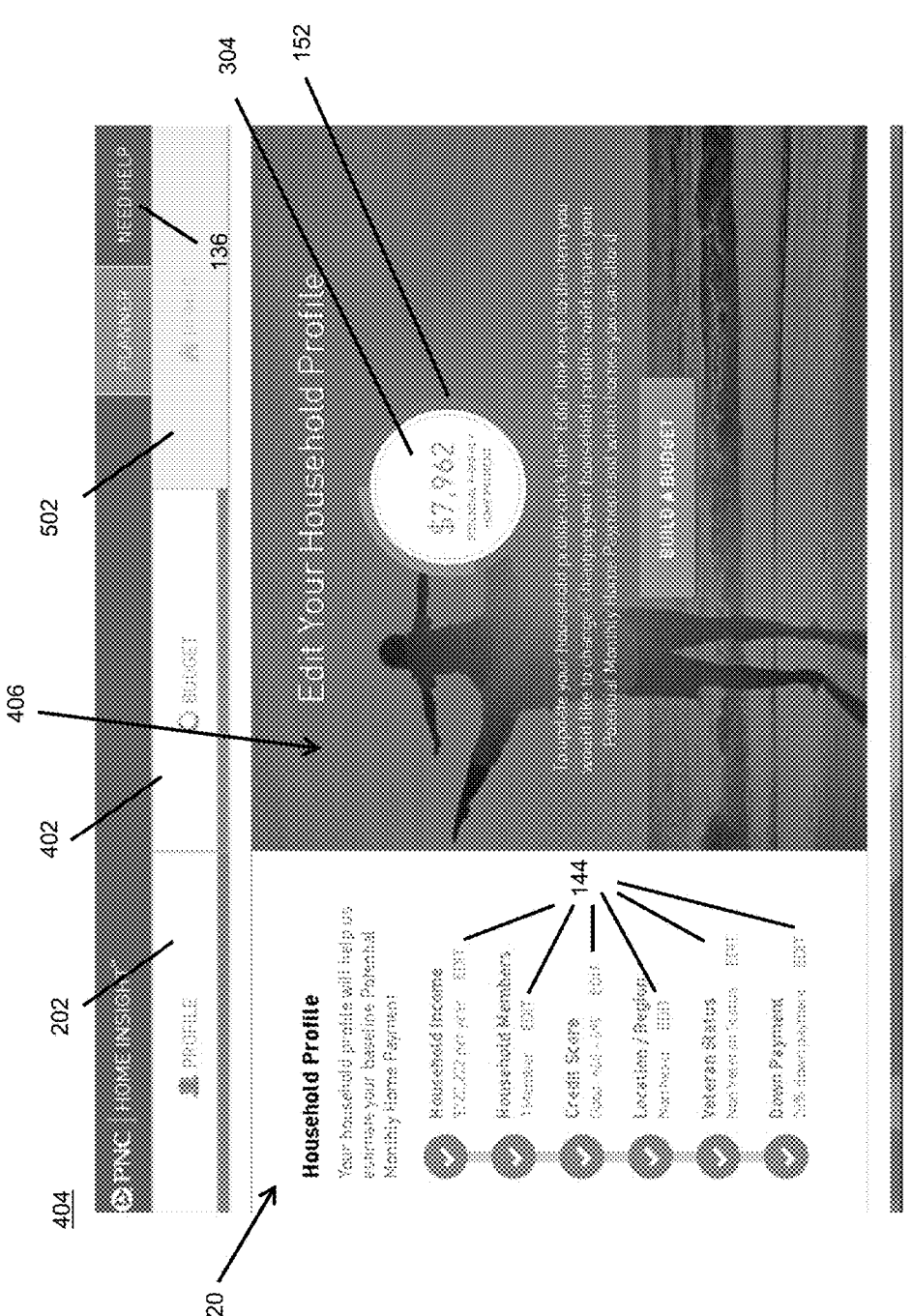
FIG. 20 is an exemplary edit household profile panel that may be displayed with an embodiment of the system.

FIG. 20 shows an edit household profile panel 404. The edit household profile panel 404 can be programmed to display the progress screen 120. The progress screen 120 can include the icons associated with the edit household profile panel 404. At least one of the icons can include the actuable edit tab 144 to facilitate editing user data 116 within the panel associated with the icon. For example, a user can actuate an edit tab 144 of an icon to be navigated to the panel associated with that icon. The edit household profile panel 404 can be programmed to display a PMHP overview screen 406. The PMHP overview screen 406 may be displayed adjacent the progress screen 120. The PMHP 304 can be displayed as a numerical value within a circular graphic 152. The PMHP overview screen 406 can be programmed to display how was my payment calculated tab 308.

Figure 21:
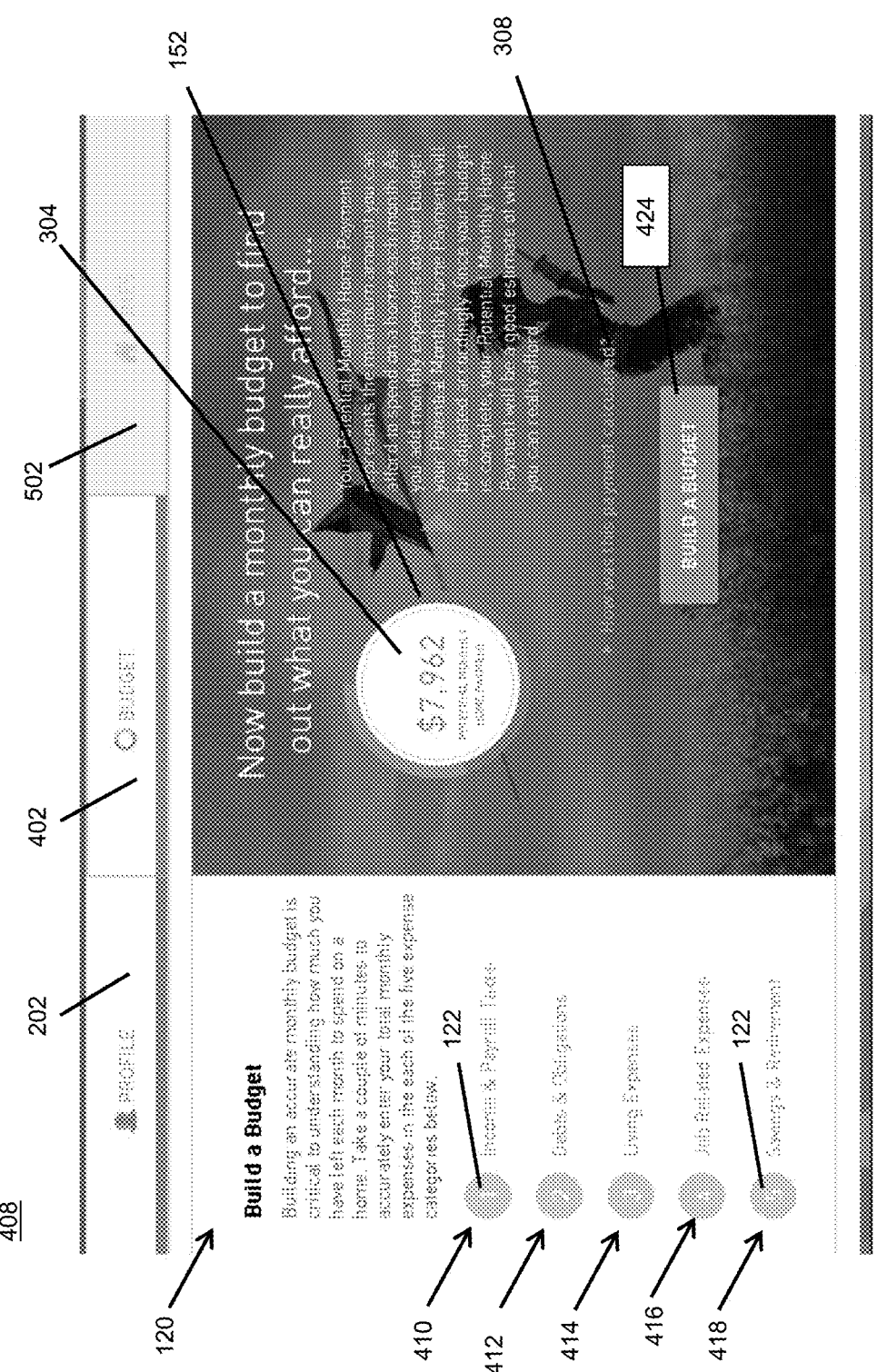
FIG. 21 is an exemplary create budget panel that may be displayed with an embodiment of the system.

FIG. 21 shows a create budget panel 408. The create budget panel 408 may be programmed to display the progress screen 120. The progress screen 120 can include at least one icon. Each icon can correspond to a panel within the budget builder module 400. For example, the progress screen 120 can include an income & payroll taxes icon 410, a debts & obligations icon 412, a living expenses icon 414, a jobs related expenses icon 416, and/or a savings & retirement icon 418. Each icon can highlight when the corresponding panel is accessed. In some embodiments, each icon can remain highlighted and/or change again with a different highlighting scheme after a predetermined amount of data has been inputted and/or acquisitioned for that panel. This may be done in a similar fashion as described above for the create profile panel 204. The predetermined amount of data may be data that is sufficient to provide the system 100 the information needed regarding an aspect to the affordability assessment.

In some embodiments, at least one icon can be actuable. For example, actuating an icon can direct a user to the corresponding panel. In some embodiments, an icon can be associated with a number indicator 122. The number indicator 122 can provide a user with information about the order in which data should be supplied to the system 100. For example, FIG. 21 shows the income & payroll taxes icon 410 associated with the number "1", the debts & obligations icon 412 associated with the number "2", etc. This may be done to inform the user that data should be entered and/or acquisitioned for the income & payroll taxes panel 420 before data is entered and/or acquisitioned for the debts & obligations panel 422. In some embodiments, the number indicator 122 can be programmed to highlight in a similar manner as that of the corresponding icon. This may be done in a similar fashion as described above for the household profile module 200.

Figure 22:
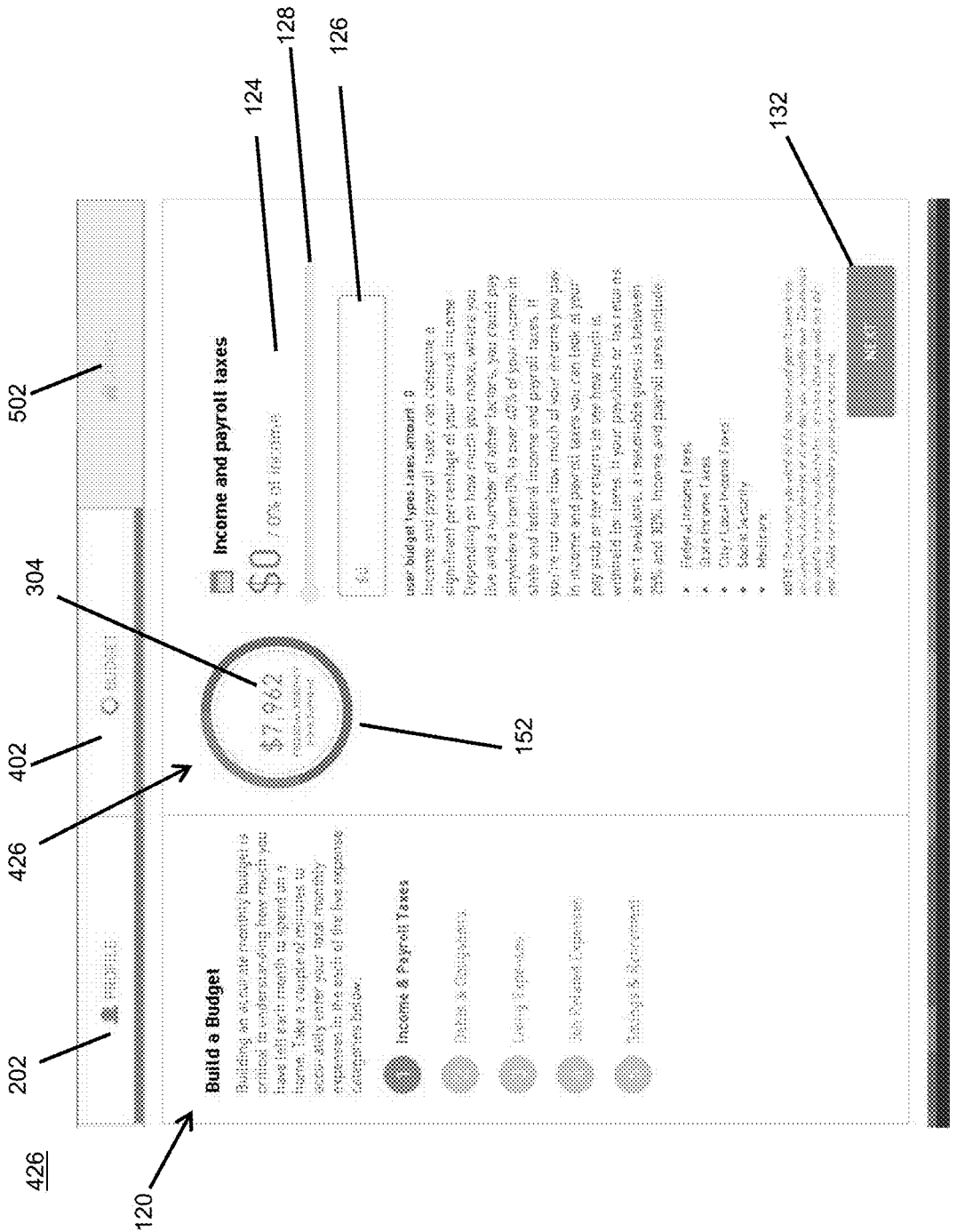
FIG. 22 is an exemplary income & payroll taxes panel that may be displayed with an embodiment of the system.
Figure 23:
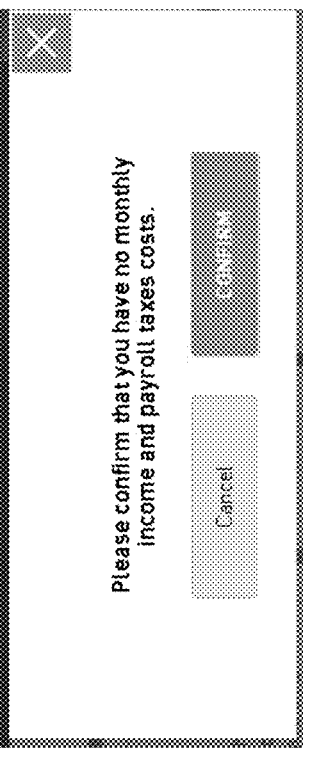
FIG. 23 is an exemplary confirmation screen that may be related to the income & payroll taxes panel.

FIG. 22 shows an embodiment of the income & payroll taxes panel 420. In some embodiments, actuating the build a budget tab 424 can cause the system to navigate to the income & payroll taxes panel 420. The income & payroll taxes panel 420 can be programmed to display the progress screen 120. The income & payroll taxes panel 420 can be programmed to display an income & payroll taxes screen 426. The income & payroll taxes screen 426 may be displayed adjacent the progress screen 120. The income & payroll taxes screen 426 can be programmed to solicit information about a user's income & payroll taxes. For example, a question 124 can be displayed related to income & payroll taxes. An input box 126 can be displayed and be associated with the question 124. FIG. 22 shows the system 100 questioning a user about the income & payroll taxes of the user. This can include the amount and/or percentage (e.g., percent of a user's monthly pay that goes towards taxes) of money a user pays in income taxes. A user can enter an amount in the input box 126 and/or use a slider 128. For example, a numerical value can be entered via the input box 126 and/or the slider 128 can be used to incrementally increase the value displayed that represents the income and payroll taxes. Upon entering the income & payroll taxes, the data can be transmitted to a memory 106a, 106b of a computer device 101 and/or a database 103 of the system 100. In some embodiments, if the income & payroll taxes is equal to zero and/or if no value is entered in the input box 126, a confirmation screen 130 may appear. (See FIG. 23). The confirmation screen 130 can request that a user confirm the user data 116 related to income & payroll taxes. Any of the conformation screens 130 disclosed herein can be configured as a pop-up screen.

Figure 24:
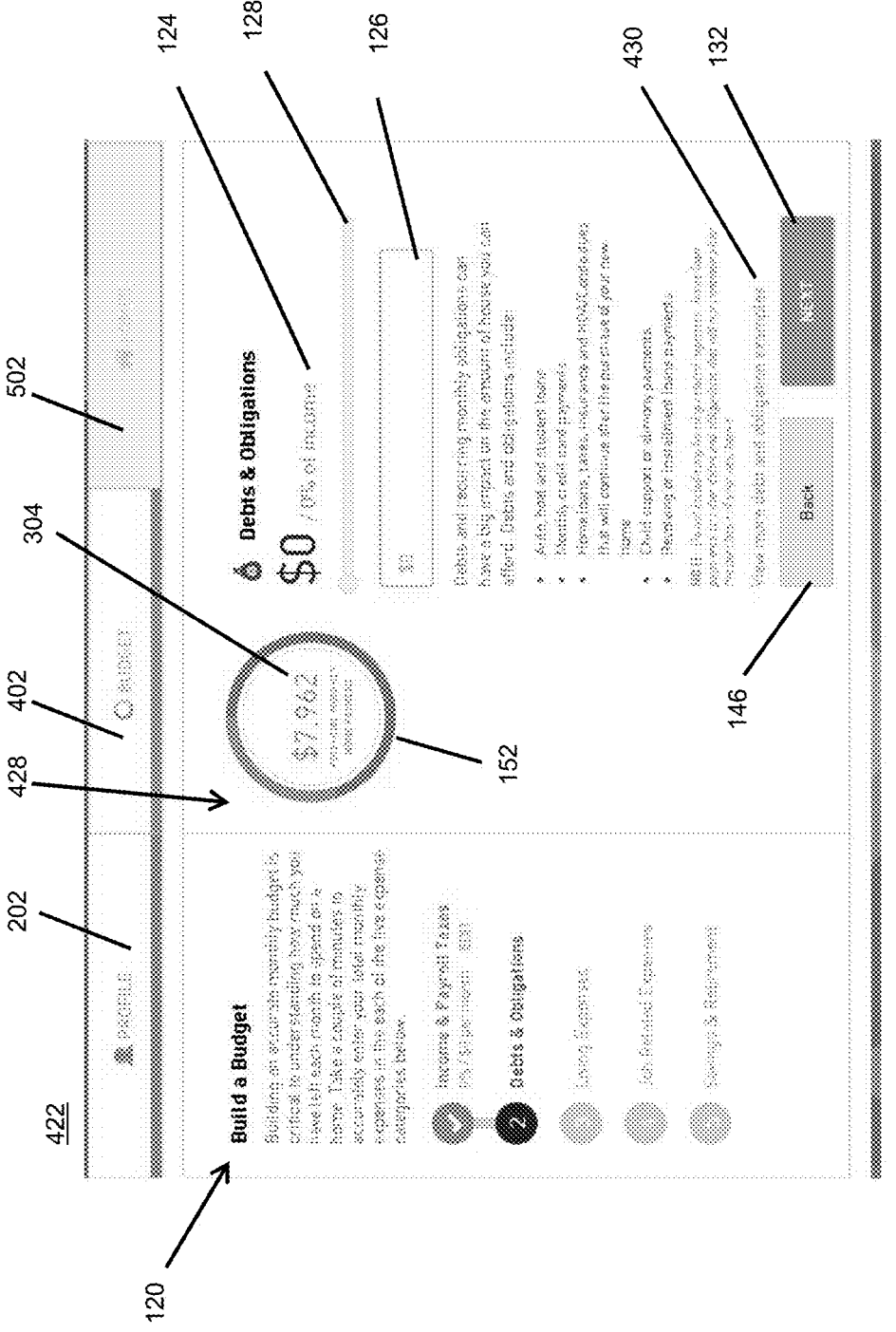
FIG. 24 is an exemplary debts & obligations panel that may that may be displayed with an embodiment of the system.
Figure 25:
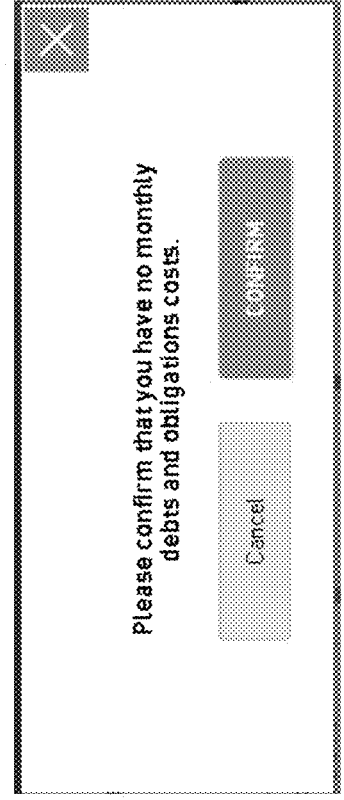
FIG. 25 is an exemplary confirmation screen that may be related to the debts & obligations panel.

FIG. 24 shows an embodiment of the debts & obligations panel 422. In some embodiments, the system 100 can automatically navigate to the debts & obligations panel 422 upon completion of the income & payroll taxes panel 420. In some embodiments, the debts & obligations panel 422 can be accessed by actuating the next tab 132 of the income & payroll taxes panel 420. The debts & obligations panel 422 can be programmed to display the progress screen 120. The debts & obligations panel 422 can be programmed to display debts & obligations screen 428. The debts & obligations screen 428 may be displayed adjacent the progress screen 120. The debts & obligations screen 428 can be programmed to solicit information about a user's debts & obligations. For example, a question 124 can be displayed related to debts & obligations. An input box 126 can be displayed and be associated with the question 124. FIG. 24 shows the system 100 questioning a user about the debts & obligations of the user. This can include the amount and/or percentage (e.g., percent of a user's monthly pay that goes towards debts and obligations) of money a user pays towards debts and obligations. A user can enter an amount in the input box 126 and/or use a slider 128. Upon entering the debts & obligations, the data can be transmitted to a memory 106a, 106b of a computer device 101 and/or a database 103 of the system 100. The debts & obligations panel 422 can further include a back tab 146 and/or a next tab 132. Some embodiments can include a view more debts and obligations examples tab 430. This may provide a user with a list of exemplary and/or preferred debts and obligations to be entered and/or used as part of the debts and obligations. In some embodiments, if the debts & obligations is equal to zero and/or if no value is entered in the input box 126, a confirmation screen 130 may appear. (See FIG. 25). The confirmation screen 130 can request that a user confirm the user data 116 related to debts & obligations.

Figure 26:
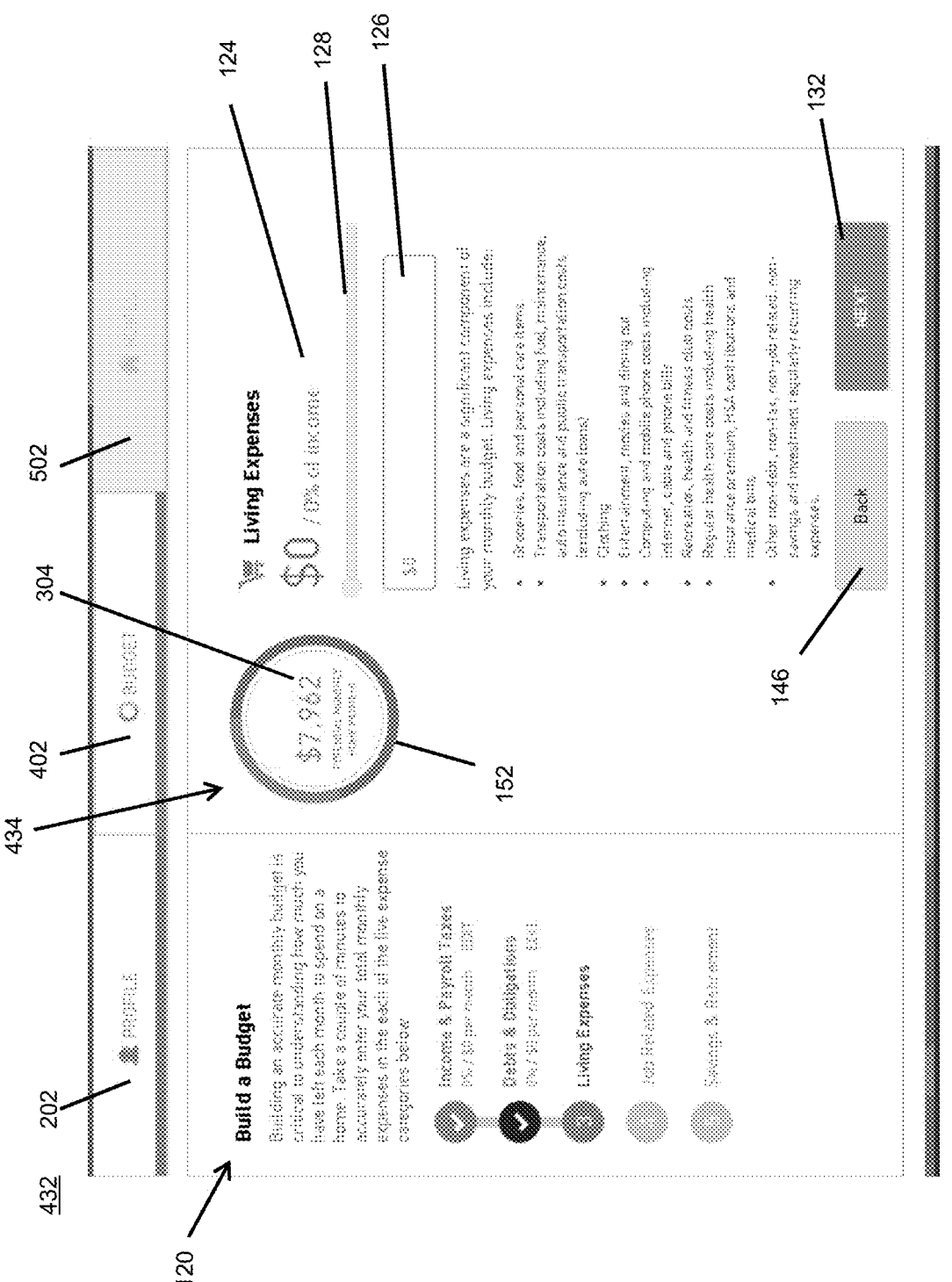
FIG. 26 is an exemplary living expenses panel that may be displayed with an embodiment of the system.
Figure 27:
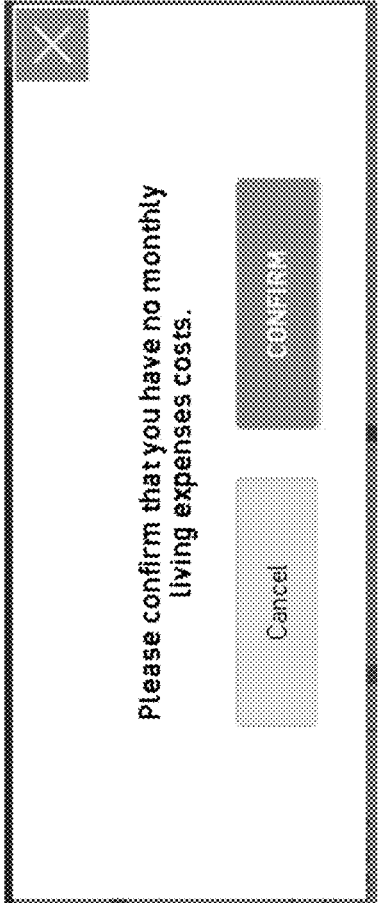
FIG. 27 is an exemplary confirmation screen that may be related to the living expenses panel.

FIG. 26 shows an embodiment of the living expenses panel 432. In some embodiments, the system 100 can automatically navigate to the living expenses panel 432 upon completion of the debts & obligations panel 422. In some embodiments, the living expenses panel 432 can be accessed by actuating the next tab 132 of the debts & obligations panel 422. The living expenses panel 432 can be programmed to display the progress screen 120. The living expenses panel 432 can be programmed to display a living expenses screen 434. The living expenses screen 434 may be displayed adjacent the progress screen 120. The living expenses screen 434 can be programmed to solicit information about a user's living expenses. For example, a question 124 can be displayed related to living expenses. An input box 126 can be displayed and be associated with the question 124. FIG. 26 shows the system 100 questioning a user about the living expenses of the user. This can include the amount and/or percentage (e.g., percent of a user's monthly pay that goes towards living expenses) of money a user pays towards living expenses. A user can enter an amount in the input box 126 and/or use a slider 128. Upon entering the living expenses, the data can be transmitted to a memory 106a, 106b of a computer device 101 and/or a database 103 of the system 100. The living expenses panel 432 can further include a back tab 146 and/or a next tab 132. In some embodiments, if the living expenses is equal to zero and/or if no value is entered in the input box 126, a confirmation screen 130 may appear. (See FIG. 27). The confirmation screen 130 can request that a user confirm the user data 116 related to living expenses.

Figure 28:
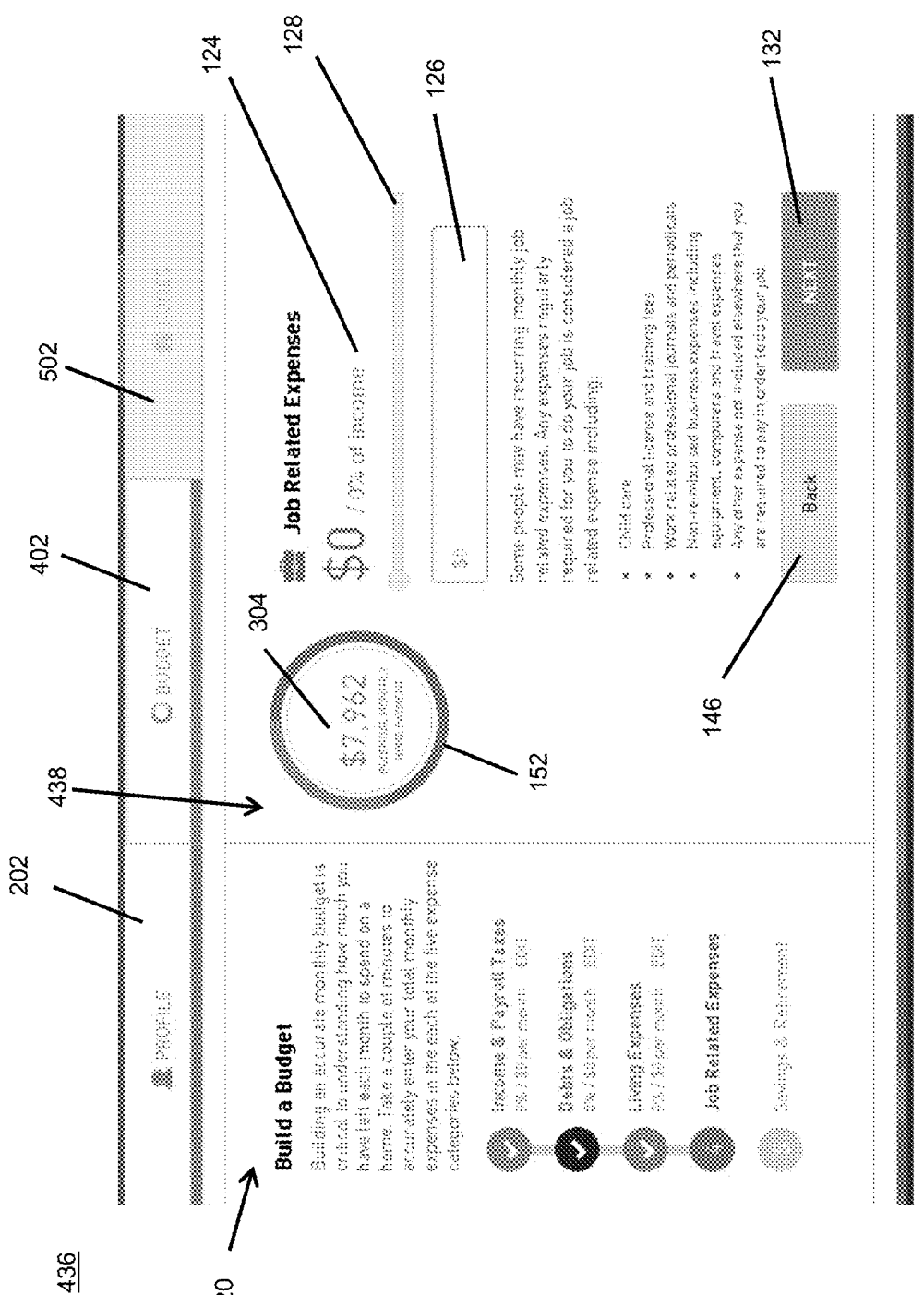
FIG. 28 is an exemplary job related expenses panel that may be displayed with an embodiment of the system.
Figure 29:
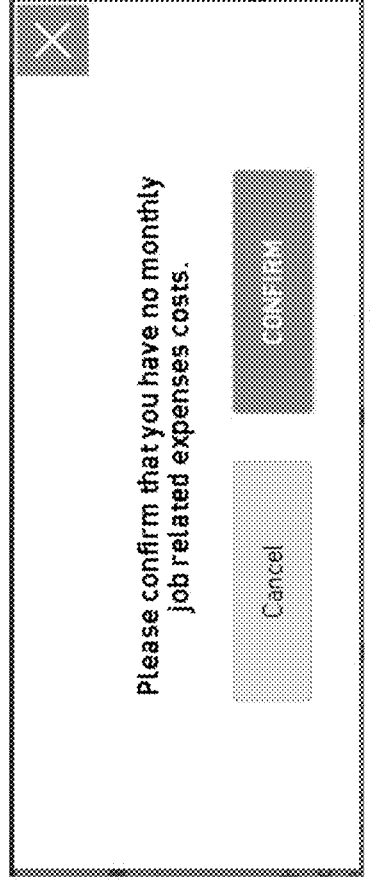
FIG. 29 is an exemplary confirmation screen that may be related to the living expenses panel.

FIG. 28 shows an embodiment of the job related expenses panel 436. In some embodiments, the system 100 can automatically navigate to the job related expenses panel 436 upon completion of the living expenses panel 432. In some embodiments, the job related expenses panel 436 can be accessed by actuating the next tab 132 of the living expenses panel 432. The job related expenses panel 436 can be programmed to display the progress screen 120. The job related expenses panel 436 can be programmed to display a job related expenses screen 438. The job related expenses screen 438 may be displayed adjacent the progress screen 120. The job related expenses screen 438 can be programmed to solicit information about a user's job related expenses. For example, a question 124 can be displayed related to job related expenses. An input box 126 can be displayed and be associated with the question 124. FIG. 28 shows the system 100 questioning a user about the job related expenses of the user. This can include the amount and/or percentage (e.g., percent of a user's monthly pay that goes towards job related expenses) of money a user pays towards job related expenses. A user can enter an amount in the input box 126 and/or use a slider 128. A user can enter an amount in the input box 126 and/or use a slider 128. Upon entering the job related expenses, the data can be transmitted to a memory 106a, 106b of a computer device 101 and/or a database 103 of the system 100. The job related expenses panel 436 can further include a back tab 146 and/or a next tab 132. In some embodiments, if the job related expenses is equal to zero and/or if no value is entered in the input box 126, a confirmation screen 130 may appear. (See FIG. 29). The confirmation screen 130 can request that a user confirm the user data 116 related to job related expenses.

Figure 30A:
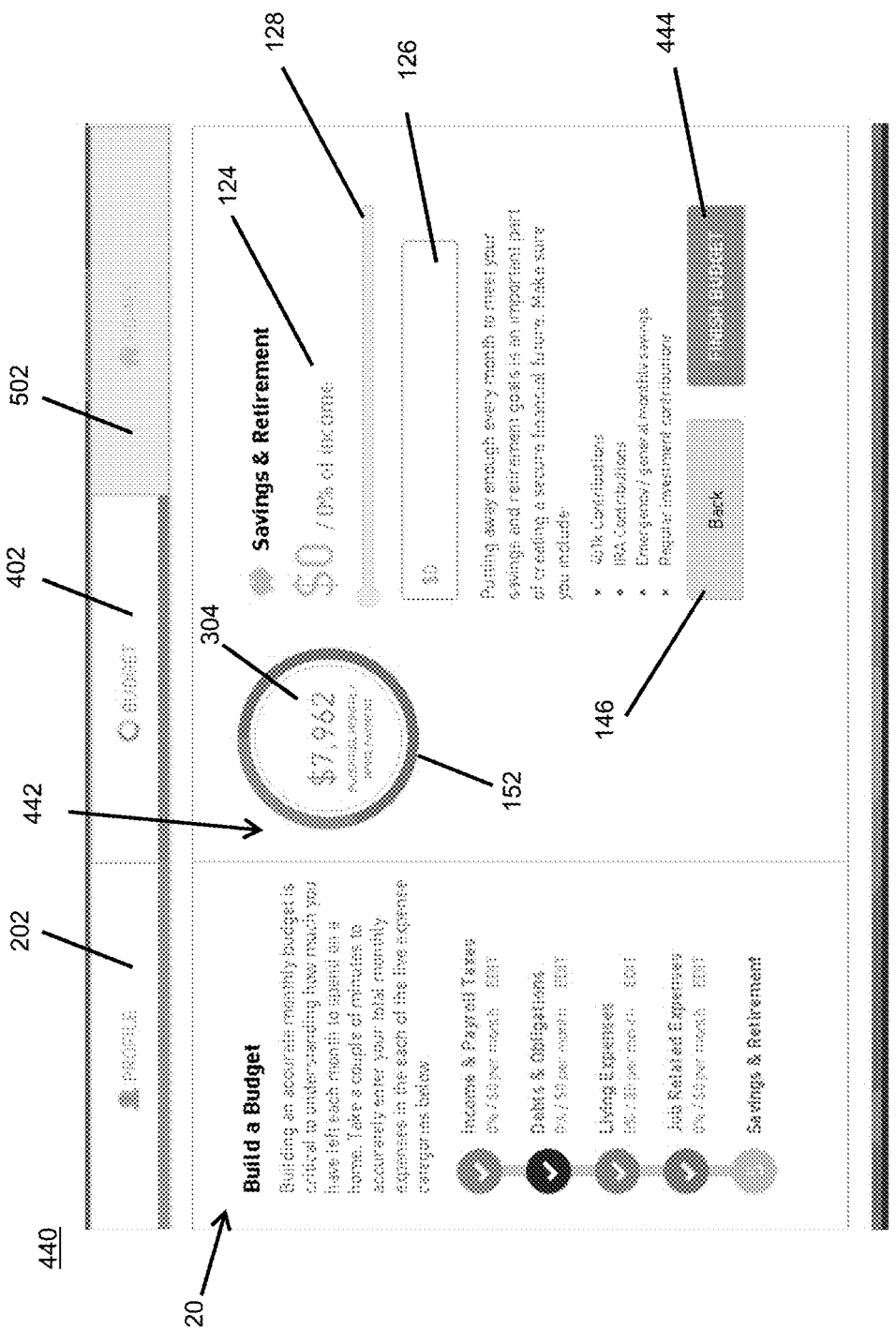
FIG. 30A is an exemplary savings and retirement panel that may be displayed with an embodiment of the system.

FIG. 30A shows an embodiment of the savings & retirement panel 440. In some embodiments, the system 100 can automatically navigate to the savings & retirement panel 440 upon completion of the job related expenses panel 436. In some embodiments, the savings & retirement panel 440 can be accessed by actuating the next tab 132 of the job related expenses panel 436. The savings & retirement panel 440 can be programmed to display the progress screen 120. The savings & retirement panel 440 can be programmed to display a savings & retirement screen 442. The savings & retirement screen 442 may be displayed adjacent the progress screen 120. The savings & retirement screen 442 can be programmed to solicit information about a user's savings & retirement. For example, a question 124 can be displayed related to savings & retirement. A user can enter an amount in the input box 126 and/or use a slider 128. An input box

126 can be displayed and be associated with the question 124. FIG. 30 shows the system 100 questioning a user about the savings & retirement of the user. This can include the amount and/or percentage (e.g., percent of a user's monthly pay that goes towards savings and retirement) of money a user pays towards savings and retirement. A user can enter an amount in the input box 126 and/or use a slider 128. Upon entering the savings & retirement, the data can be transmitted to a memory 106a, 106b of a computer device 101 and/or a database 103 of the system 100. The savings & retirement panel 440 can further include a back tab 146 and/or a next tab 132. In some embodiments, if the savings & retirement is equal to zero and/or if no value is entered in the input box 126, a confirmation screen 130 may appear. (See FIG. 31). The confirmation screen 130 can request that a user confirm the user data 116 related to savings & retirement.

In some embodiments, the system 100 can allow a user to skip a question 124 (e.g., omit user data 116). The system 100 may be configured to use an entry of zero or may use a predefined standard value for such a skipped question 124. In some embodiments, the system 100 can populate a confirmation screen 130 if any question is skipped requesting a user to confirm that the question is being skipped and/or informing a user that the default value is being used.

Figure 30B:
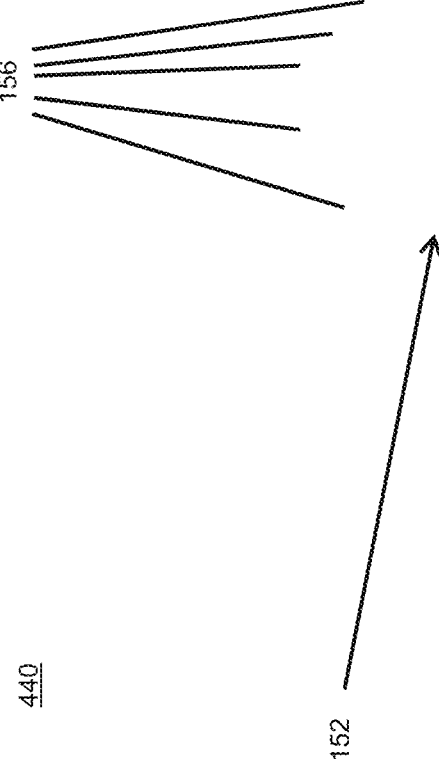
FIG. 30B is another exemplary savings and retirement panel that may be displayed with an embodiment of the system.
Figure 31:
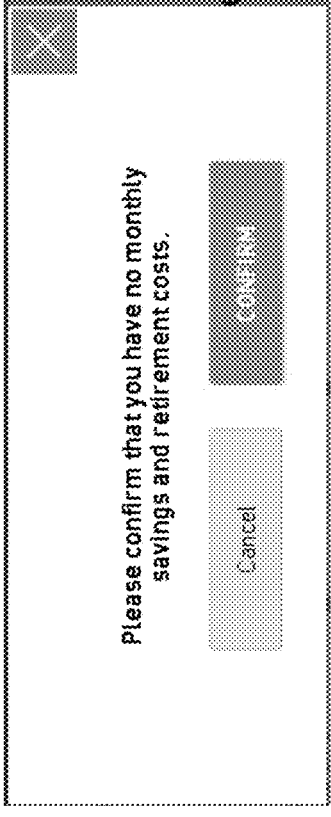
FIG. 31 is an exemplary confirmation screen that may be related to the savings and retirement panel.

Referring to FIG. 30B, some embodiments of the system 100 can include a dynamic circular graphic 152. The dynamic circular graphic 152 can include sectants 156 that may represent portions of a user's budget. For example, sectant 1 can represent the budget (illustrated as orange) as a percentage of the PMHP 304 (illustrated as green) in FIG. 30A. PMHP can be sectant 2, for example. As shown in FIG. 30B, sectant 3 can represent income & payroll taxes (illustrated as blue) as a percentage of the PMHP 304 (illustrated as green), sectant 4 can represent debts & obligations (illustrated as black), secant 5 can represent living expenses (illustrated as purple), sectant 6 can represent job related expenses (illustrated as light blue), and sectant 7 can represent savings & retirement (illustrated as yellow). In addition, or in the alternative, to color schemes, the sectants 156 can have a length that is proportional to the amount of the PMHP 304. For example, is income & payroll taxes are 10% of PMHP 304 then the length of sectant 3 can be 10% of the length of the sectant 2. While an exemplary dynamic circular graphic 152 is shown in FIG. 30B as it relates to the savings & retirement panel 440, it should be noted that the dynamic circular graphic 152 can be displayed in any panel and/or module.

Figure 32:
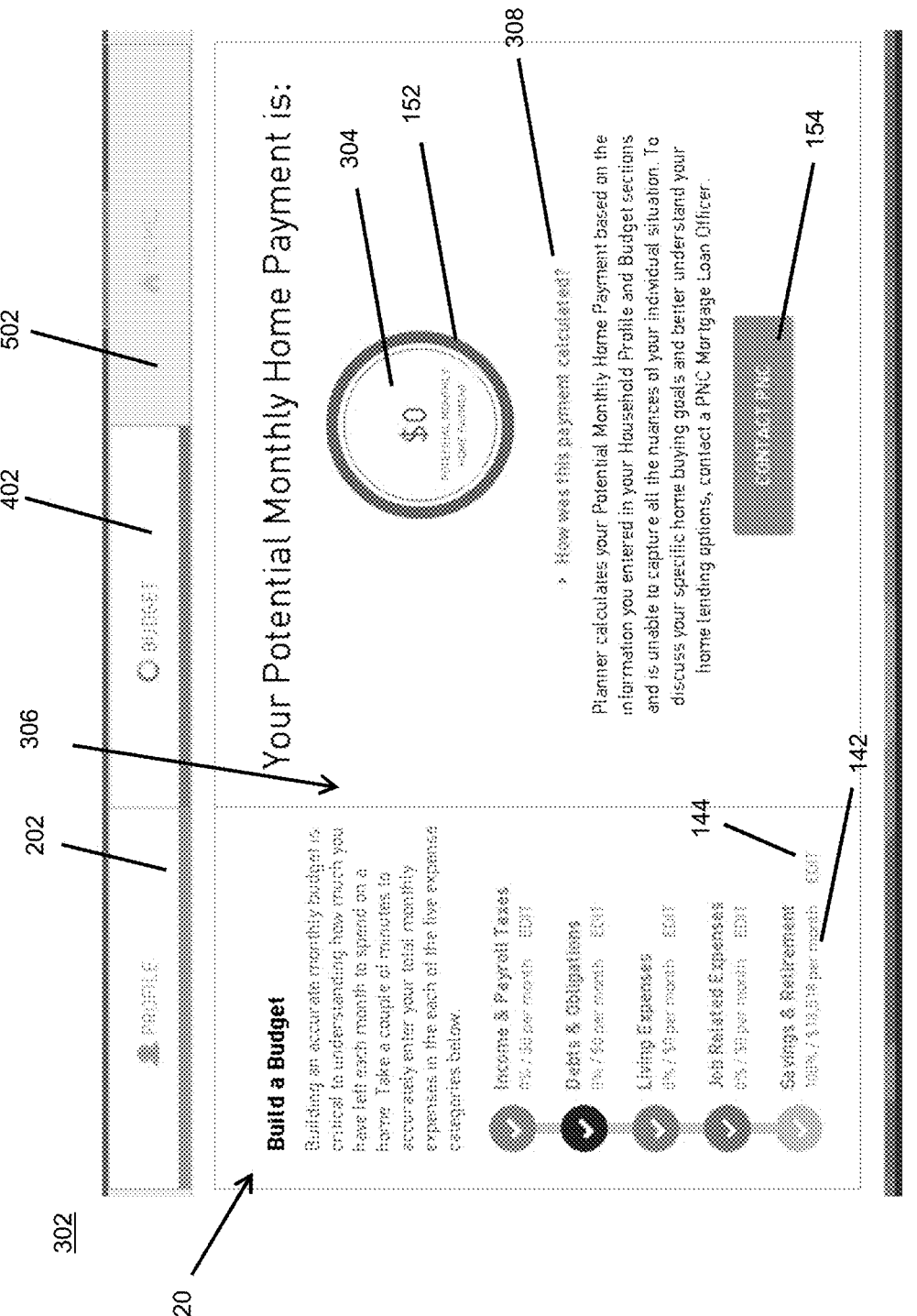
FIG. 32 is another exemplary affordability panel that may be displayed with an embodiment of the system.

The system 100 can use the user data 116 from the household profile module 200 and the budget builder module 400 to update the affordability assessment. For example, FIG. 32 shows an updated affordability panel 302 based on the user data 116 from the household profile module 200 and the budget builder module 400. This can include an updated PMHP 304. Again, some embodiments can require a user to input additional user data 116 and/or revise user data 116 when the PMHP 304 is less than the predetermined amount. For example, FIG. 32 shows the affordability panel 302 informing a user that the recalculated PMHP 304 is less than the predetermined amount.

Referring to FIGS. 33-45, an exemplary home search module 500 is disclosed. The home search module 500 may be accessed by actuating the home search tab 502. In some embodiments, the system 100 can navigate to the home search module 500 after a predetermined number of icons of the budget builder module 400 have been completed. This can include a user inputting a predetermined amount of user data 116 and/or the system 100 acquisitioning a predetermined amount of resource data 118 to determine the PMHP 304. In some embodiments, this can further include when the system 100 has determined the PMHP 304 to be greater than a predetermined value.

Figure 33:
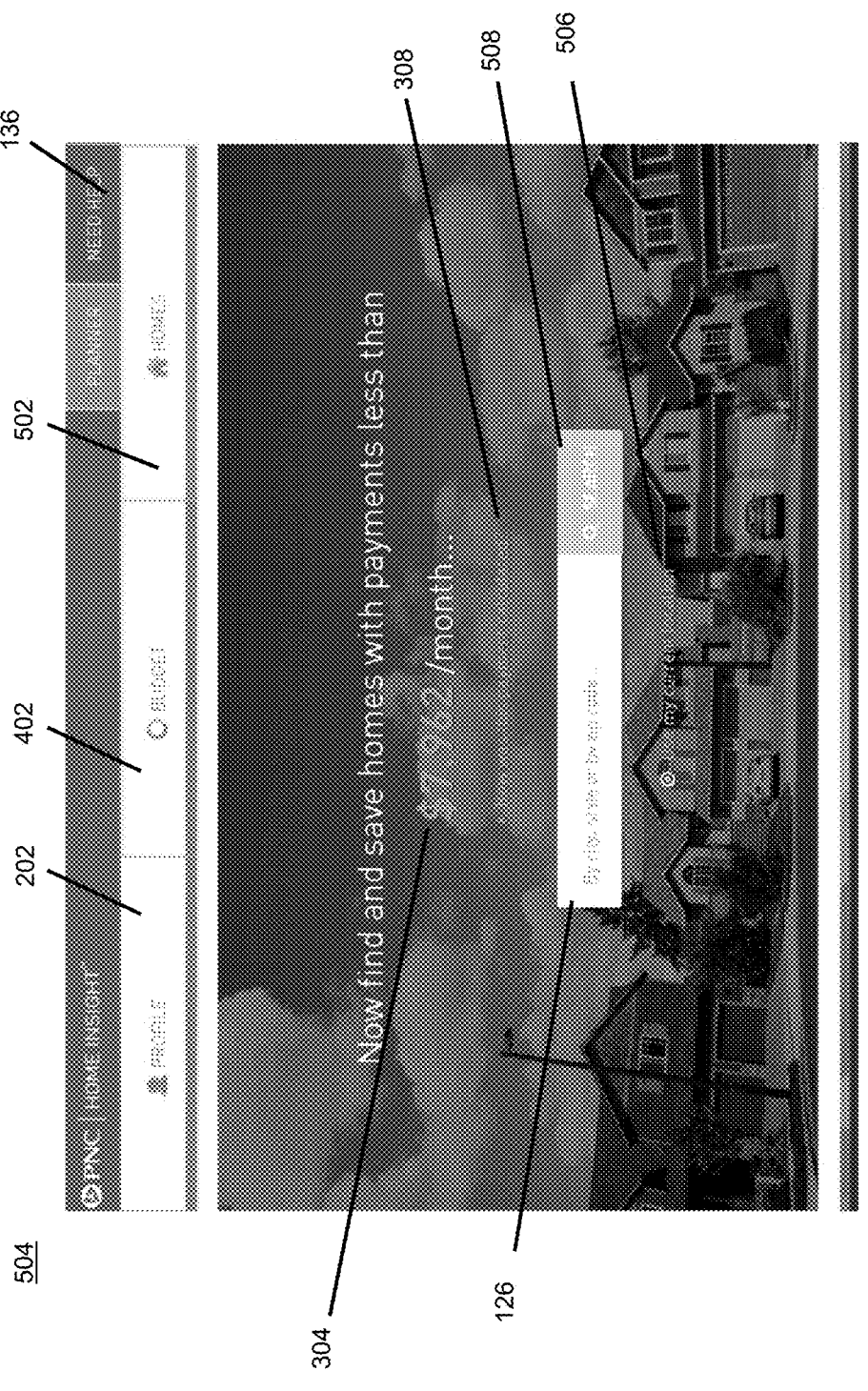
FIG. 33 is an exemplary find home panel that may be displayed with an embodiment of the system.

FIG. 33 shows a find home panel 504. The find home panel 504 may be programmed to display the PMHP 304. This can include the how was my payment calculated tab 308. The find home panel 504 may be programmed to solicit information about where a user wants to search for a home. For example, the find home panel 504 may be programmed to display an input box 126. The input box 126 can receive information about a geographic location (e.g., city, state, zip code, etc.). The find home panel 504 can be further programmed to include a use my current location tab 506. Selecting the use my current location tab 506 can cause the system 100 to use geo-location techniques to determine the geographic location of the user computer 101a. Thus, the geographic location information can be user data 116 supplied by a user and/or resource data 118 acquisitioned by the system 100. The position of the user can be based on an Internet Protocol address of the computer 101 or some other transmitting and/or identification device associated with the computer 101. For example, the geo-location techniques can include use of global positioning systems, radio frequency location methods, wireless cell tower triangulation methods, etc.

Upon obtaining the geographic location information, the data can be transmitted to a memory 106a, 106b of a computer device 101 and/or a database 103 of the system 100. A user may then select a search tab 508. Selecting the search tab 508 can cause system 100 to search for homes within certain parameters of a user's affordability assessment. For example, the system 100 can cause any of the user computer 101a, planner computer 101b, and/or resource computer 101c to supply and/or acquisition data that may be necessary to generate a listing of homes that fall within certain parameters of the affordability assessment. In some embodiments, the listing of homes can be within a predetermined variance of the parameters of the affordability assessment. For example, a home on the listing of homes may be below the PMHP 304, a home on the listing of homes may be below the PMHP 304 by a certain amount, a home on the listing of homes may be above the PMHP 304 by a certain amount, etc.

In some embodiments, application program interface (API) software may be used to facilitate some interactions between system components. For example, API may be used to facilitate a planner computer 101b interacting with a resource computer 101c. For instance, upon obtaining the geographic location information, the planner computer 101b may cause at least one resource computer 101c (e.g., Google Maps® server, ListHub® server, etc.) to generate data and/or transmit the data to the system 100. This data may be used by the system 100 to generate a home exhibit panel 510. (See FIG. 34).

Figure 34:
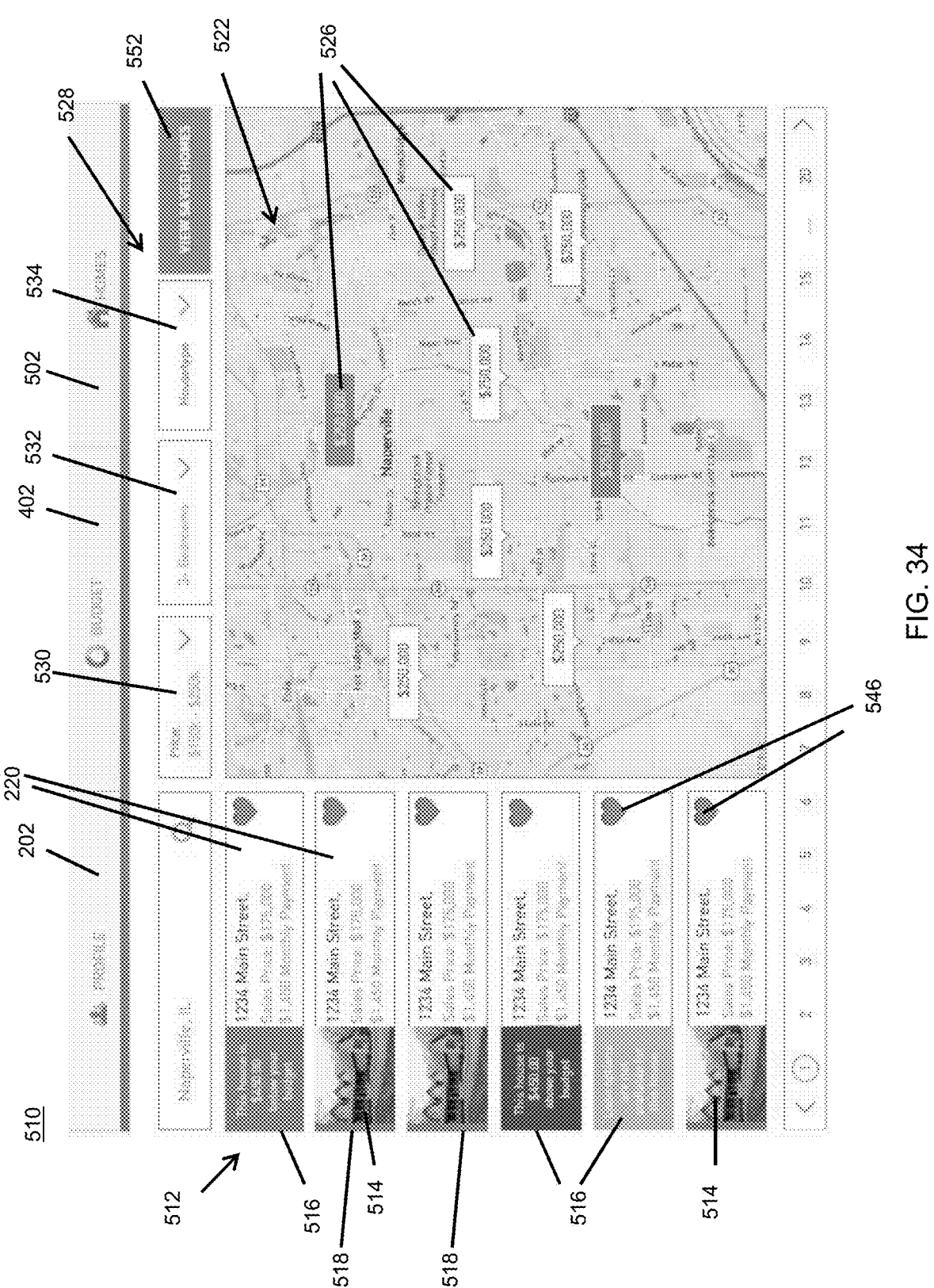
FIG. 34 is an exemplary home exhibit panel that may be displayed with an embodiment of the system.

FIG. 34 shows an exemplary home exhibit panel 510. The home exhibit panel 510 can be programmed to display a listing of homes screen 512. The listing of homes screen 512 can include an icon associated with a home within the listing of homes. The icon can include an image block 514. The image block 514 can display an image of the home if image data of the home is obtained from the resource computer 101c. If image data of the home is not obtained, the image block 514 can be programmed to display budget comparator information 516. The budget comparator information 516 can include the sale price of the home relative to one of the user's affordability parameters (e.g., a user's budget). A user's budget can be determined by the household profile information and the budget information provided by the user. For example, the budget comparator information 516 can inform a user the amount and/or percent the sale price of the home is above and/or below an affordability parameter. In some embodiments, the budget comparator information 516 can be represented as a monthly payment that would be required to purchase the home relative to the affordability parameter on a monthly scale.

As noted above, a home may be listed on the listing of homes based on an affordability parameter. Some parameters can include any one or combination of following.

1. PMPH
   PMPH was defined above
2. Estimated Monthly Home Payment (EMHP)
   EMHP=property taxes+home owner's insurance+mortgage payment based on an estimated mortgage rate, Home Owner's Association (HOA) fees, etc. (see FIG. 38)
   The property taxes can be estimated property taxes acquisitioned from a resource computer 101c. For example, the estimated property taxes may be equal to 2% of the listing price of the home, where the listing price can be taken from ListHub®, for example.
   The property insurance can be estimated property insurance premiums acquisitioned from a resource computer 101c. For example, the estimated property insurance may be equal to 0.4% of the listing price of the home, where the listing price can be taken from ListHub®, for example.
   The mortgage principal, interest, and mortgage insurance can be based on from rates acquisitioned from a resource computer 101c. For example, the estimated rates can be taken from Marksman Mortech®, for example.
3. Estimated Total Home Expenses (ETHE)
   ETHE=[$0.14/square foot of the home]+[Estimated Monthly Home Payment]
   Note this value can be determined the U.S Department of Housing and Urban Development (HUD). This value can change from time to time.

Any one or any combination of the parameters and/or calculations can be further determined by the inputted credit score of the user, the geographic location selected by the user, the loan type, the home type, veterans status, etc.

The image block 514 can include a background 518. The background 518 can be programmed to highlight (e.g., change color) based on the monthly payment in relation to a parameter of the affordability assessment. For example, the background 518 may be illustrated as green if EMHP>=PMHP. The background 518 may be illustrated as red is ETHE<=MTMHE. The background 518 may be illustrated as yellow if EMHP<=PMHP and ETHE>=MTMHE. The background 518 may be configured to be wider than the image. This may be done so that when the image is displayed, the background 518 can still be viewable by the user.

The icon can further include a home summary block 520. The home summary block 520 may be adjacent the image block 514. The home summary block 520 may be programmed to display summary information about the home with which the icon is associated. This may include an address, a sale price, monthly payment, etc.

The home exhibit panel 510 can be programmed to display a home map screen 522. The home map screen 522 may be displayed adjacent the listing of homes screen 512.

The home map screen 522 can be programmed to display a street map 524 representative of the geographic location the user selected for searching. The street map 524 can include at least one home flag 526. At least one home flag 526 can be associated with a home within the listing of homes. In some embodiments, the home flag 526 can be positioned on the street map 524 at a location where the home it is associated with is located. In some embodiments, the home flag 526 can be programmed to be highlighted. The highlighting scheme of the home flag 526 can be the same as the highlighting scheme of the icons within the listing of homes screen 512. For example, if a first icon within the listing of homes is green, the home flag 526 associated with that first icon can also be green.

The home exhibit panel 510 can be programmed to display a filter bar 528. The filter bar 528 can be displayed adjacent the home map screen 522. The filter bar 528 can be configured as at least one tab and/or an input box. For example, the filter bar 528 can include a sales price tab 530, a number of bedrooms tab 532, a home type tab 534, geographic box 559, etc. Any one or combination of the tabs of the filter bar 528 can be configured as a dropdown menu 148. For example, actuating the sales price tab 530 can provide a list of price ranges from which a user can select from to set as a filter parameter. Actuating the number of bedrooms tab 532 can provide a list of bedrooms of a home from which a user can select from to set as a filter parameter. Actuating the house type tab 534 can provide a list of home types (e.g., condominium, townhouse, etc.) to set as a filter parameter. A user can enter a geographic region (e.g., region, state, zip code, etc.) into the geographic box 559 to limit the list of homes to a specified geographic location. Any one or combination of filter parameters can be set. Upon selecting a filter parameter, the system 100 can cause a computer device 101 to acquisition user data 116 stored in the memory 106a, 106b and/or acquisition resource data 118 from a resource computer 101c to update the home exhibit panel 510. For example, if a filter parameter of home sale price between $200K and $300K is set, the home exhibit panel 510 can be updated by displaying only the homes that fall within that price range.

Figure 35:
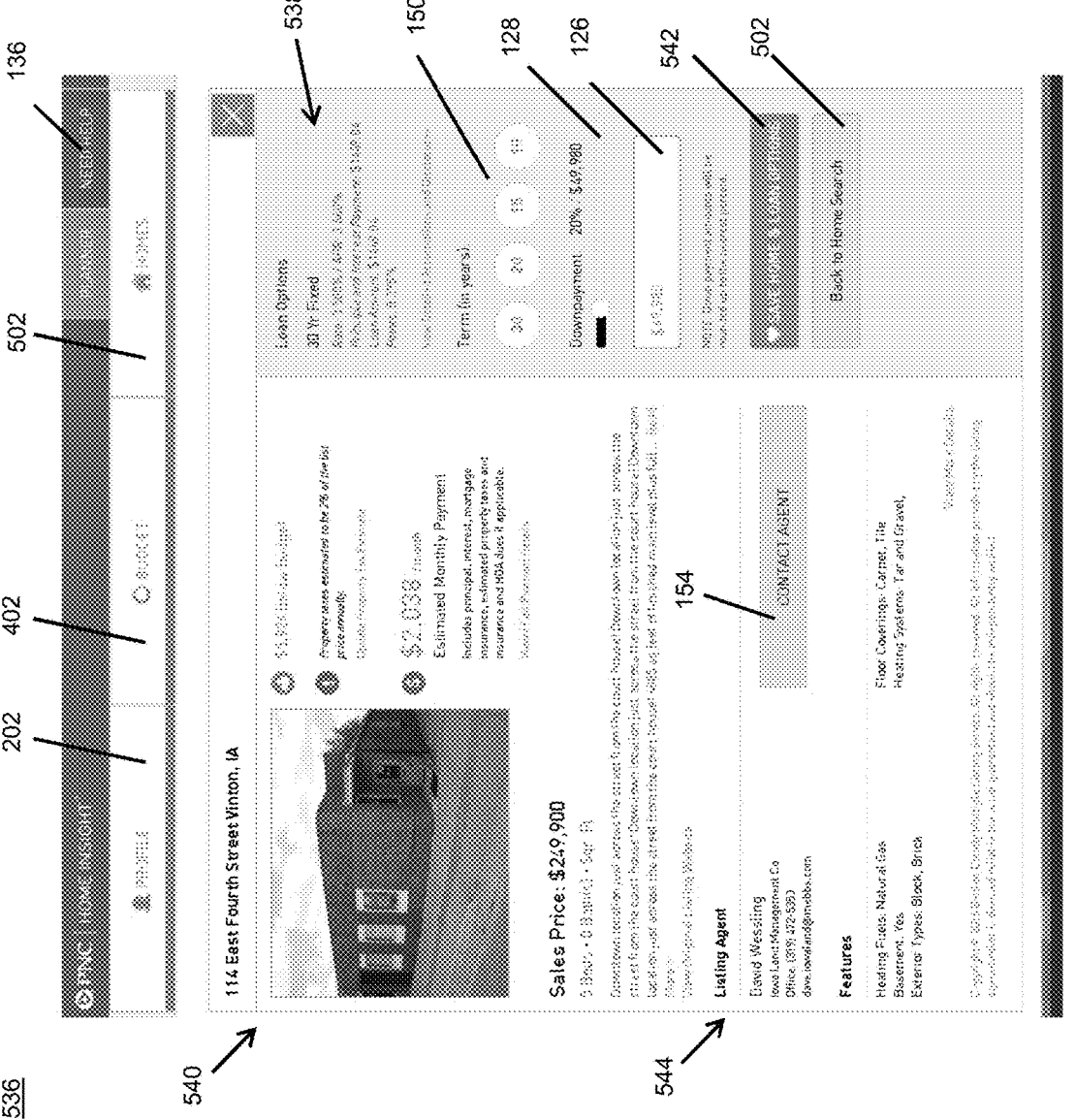
FIG. 35 is an exemplary listing details panel that may be displayed with an embodiment of the system.

In some embodiments, the icon of the listing of homes screen 512 and/or the home flag 526 can be actuable. Actuating the icon and/or the home flag 526 can generate a listing details panel 536. FIG. 35 shows an exemplary embodiment of the listing details panel 536. The listing details panel 536 can be programmed to display a home overview screen 540. This can include an image of the home, the amount the home is over or under a user's budget, the estimated monthly payment for the home, the sale price for the home, home features (type of heating, if it has a basement, if the flooring is carpeted, etc.), etc.

The listing details panel 536 can be programmed to display loan options screen 538. The loan options screen 538 can be displayed adjacent the home overview screen 540. The loan options screen 538 can include the type of loan (15 year, 20, year, 30 year, etc.), the percent and/or amount down payment, etc. A user can adjust at least one parameter by selecting the radio buttons 150, enter data in the input box 126, and/or adjusting the slider 128. For example, a user can adjust any one or combination of loan parameters. Upon adjusting the data, the data can be transmitted to a memory 106a, 106b of a computer device 101 and/or a database 103 of the system 100. This can cause the system 100 to update the affordability panel 302 and/or any parameter of the affordability module 300. The loan parameters may default to the user data 116 inputs entered earlier, but a user can adjust them for any one or combination of homes via the listing details panel 536. The loan options screen 538 can further include a save home and loan options tab 542. The save home and loan options tab 542 can cause the system 100 to transmit the data associated with the home and the loan options to a memory 106a, 106b of a computer device 101 and/or a database 103 of the system 100. This data can be used to generate a report 560. Details of the report 560 will be discussed later. The loan options screen 538 can further include a back to home search tab 502. Actuating the back to home search tab 502 can cause the system to navigate back to the find home panel 504 and/or the home exhibit panel 510.

The system 100 can be configured such that any time a user selects a home flag 526 and/or makes adjustments to any of the parameters, the system can acquisition additional and/or new resource data 118. For example, upon selection of a home flag 526 and/or making adjustments to any of the loan parameters, the system 100 can automatically obtain updated data from Marksman Mortech®, ListHub®, etc. This information can be used to recalculate any parameter of the affordability module 300.

The listing details panel 536 can be programmed to display an agent overview screen 544. The agent overview screen 544 can be displayed adjacent the home overview screen 540. The agent overview screen 544 can include contact information and other information about an agent (e.g., a realtor). The agent overview screen 544 can include a contact agent tab 154.

Figure 36:
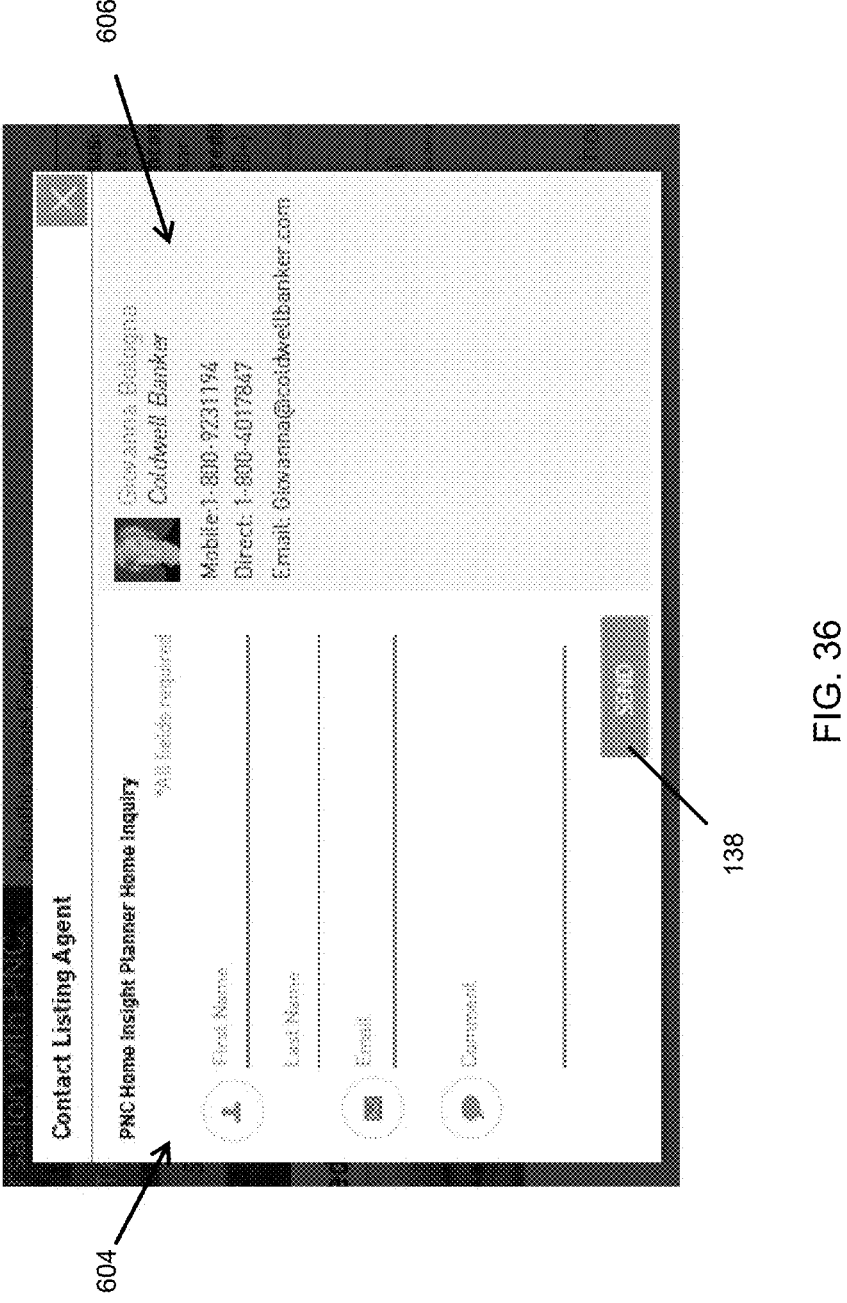
FIG. 36 is an exemplary agent contact panel that may be displayed with an embodiment of the system.

Referring to FIGS. 36-37, an exemplary agent contact module 600 is disclosed. Actuating the contact agent tab 154 of the agent overview screen 544 can cause the system to navigate to the agent contact module 600. FIG. 36 shows an exemplary agent contact panel 602. The agent contact panel 602 can be programmed to display a comment screen 604. The comment screen 604 can be programmed to solicit information about a user. This can include name, contact information, commentary, etc. A user may enter commentary about contacting an agent and/or buying a home. The agent contact panel 602 can be programmed to display an agent screen 606. The agent screen 606 can be displayed adjacent the comment screen 604. The agent screen 606 can include information about the agent (e.g., realtor) that may be assigned to selling the home. For example, actuating the contact agent tab 154 of the listing details panel 536 can cause the system 100 to acquisition data from the resource computer 101c to determine which agent is assigned to the home that was selected within the listing details panel 536. After entering user data 116 into the comment screen 604, a user may actuate the send tab 138 to cause a communication transmission to occur from the user computer 101a to a computer of the agent. This may be in a form of an email, for example.

Figure 37A:
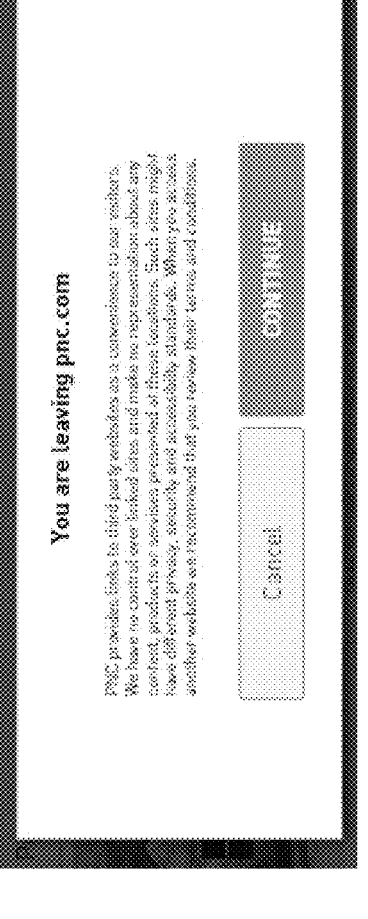
FIGS. 37A-37B show screens informing a user that he or she is being navigate to an agent-sponsored website and an agent-sponsored home summary page, respectively.
Figure 37B:
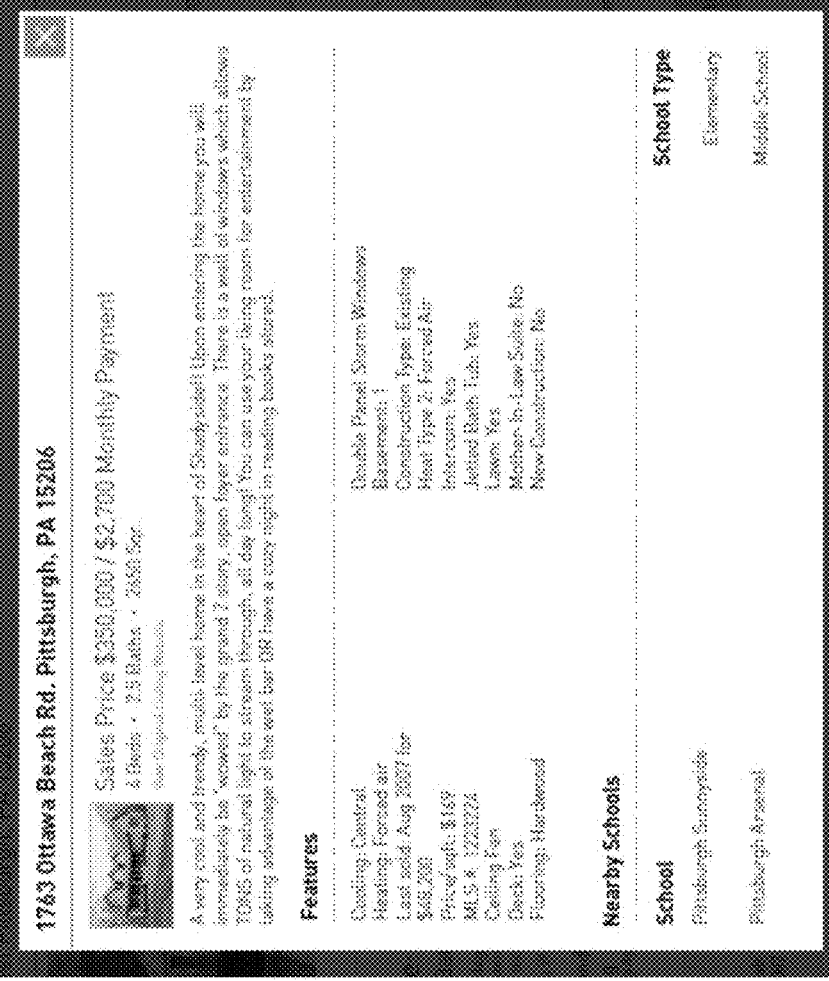
Figure 38:
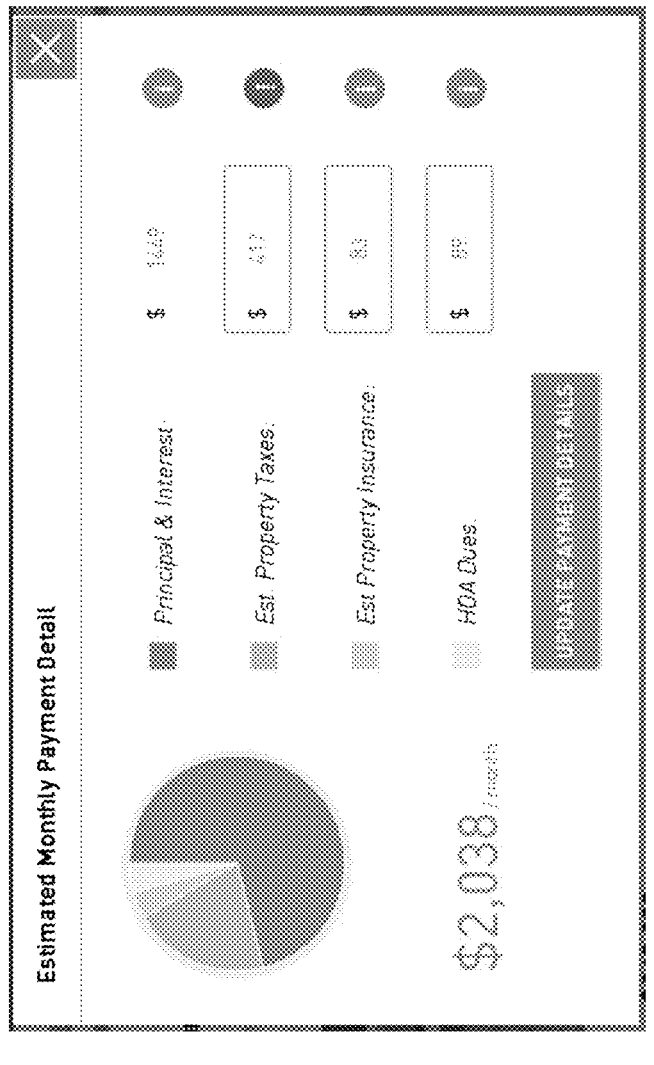
FIG. 38 shows an exemplary display screen that may be used to demonstrate how an Estimated Monthly Home Payment can be calculated.

Some embodiments can provide a link to allow a user to obtain more detailed information about the home from an agent-sponsored website. FIGS. 37A-37B show screens informing a user that he or she is being navigate to an agent-sponsored website and an agent-sponsored summary of the home, respectively, upon actuating the link.

Referring back to FIGS. 34-35, a user can actuate a favorite marker 546 of the home summary block 520 and/or actuate the save home and loan options tab 542 of the loan options screen 538 to generate a saved-home catalog 548. The saved-home catalog 548 can include a list of homes selected to be saved by the user. Some embodiments can limit the number of homes saved to the saved-home catalog 548. For example, the system 100 may be configured to limit the number of homes to nine. (See FIG. 39). If a home is saved by actuating the save home and loan options tab 542, the home and the corresponding loan option settings (e.g., loan term, down payment, etc.) for that home can also be saved as part of the saved-home catalog 548. If a home is saved, the corresponding favorite marker 546 of the home summary block 520 can highlight. For example, the favorite marker 546 can change from gray to orange when a home is selected to be saved via the favorite marker 546. In some embodiments, a user can remove a home from the saved-home catalog 548. (See FIG. 40). This can be achieved by actuating the favorite marker 546 of the home summary block 520 corresponding to the saved home. Upon actuation of the favorite marker 546, the favorite marker 546 can highlight again. For example, the favorite marker 546 can change from orange to gray. Thus, in some embodiments, the favorite marker 546 being highlighted as gray can indicate that the corresponding home is not saved, while the favorite marker 546 being highlighted as orange can indicate that the corresponding home is saved. Saving a home via the save home and loan options tab 542 and/or the favorite marker 546 can cause the system 100 to transmit the data associated with the home and/or the loan options to a memory 106*a*, 106*b* of a computer device 101 and/or a database 103 of the system 100. This data can be used to generate a report 560. Details of the report 560 will be discussed later.

Figure 39:
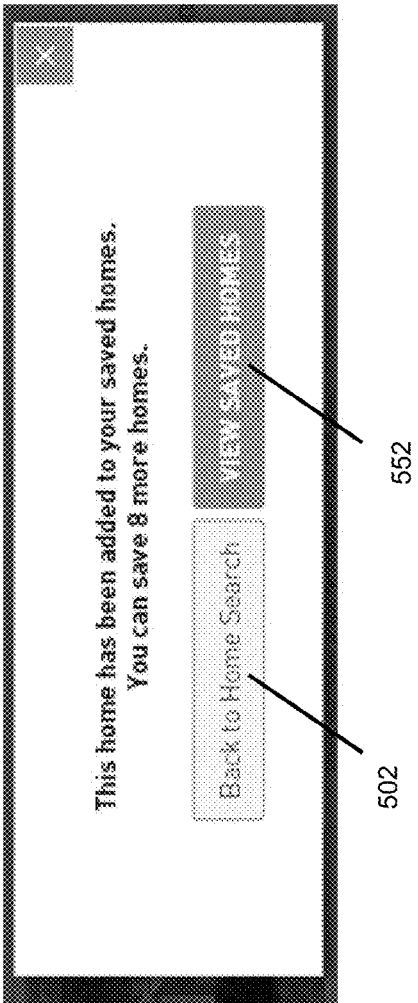
FIG. 39 shows an exemplary add home review screen that may be used to inform a user how may homes have been saved to the saved-home catalog.
Figure 40:
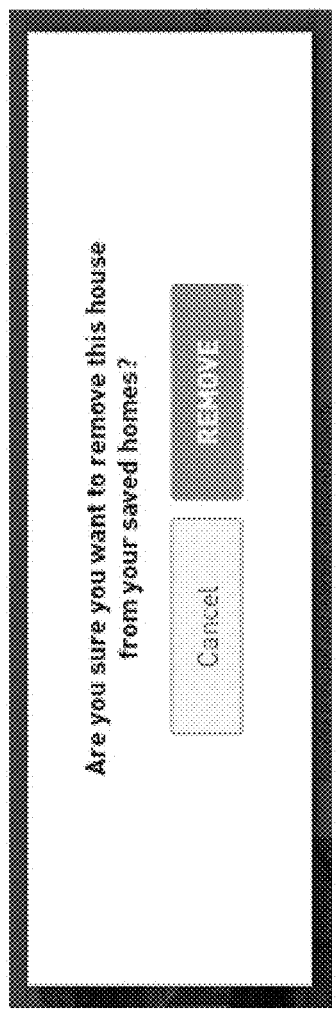
FIG. 40 shows an exemplary display screen that may be used to confirm if a user wants to remove a home from the saved-home catalog.

FIG. 39 shows an exemplary add home review screen 550. The add home review screen 550 can include a back to home search tab 502 and/or view saved homes tab 552. Upon actuation the view saved homes tab 552 can cause the system 100 to navigate to an affordability and home results panel 554 (see FIG. 41). It should be noted that the home exhibit panel 510 (see FIG. 34) can also have a view saved homes tab 552. The system 10 may display a remove home confirmation screen 130 when a user selects a home for removal from the saved-home catalog 548, as shown in FIG. 40.

Figure 41:
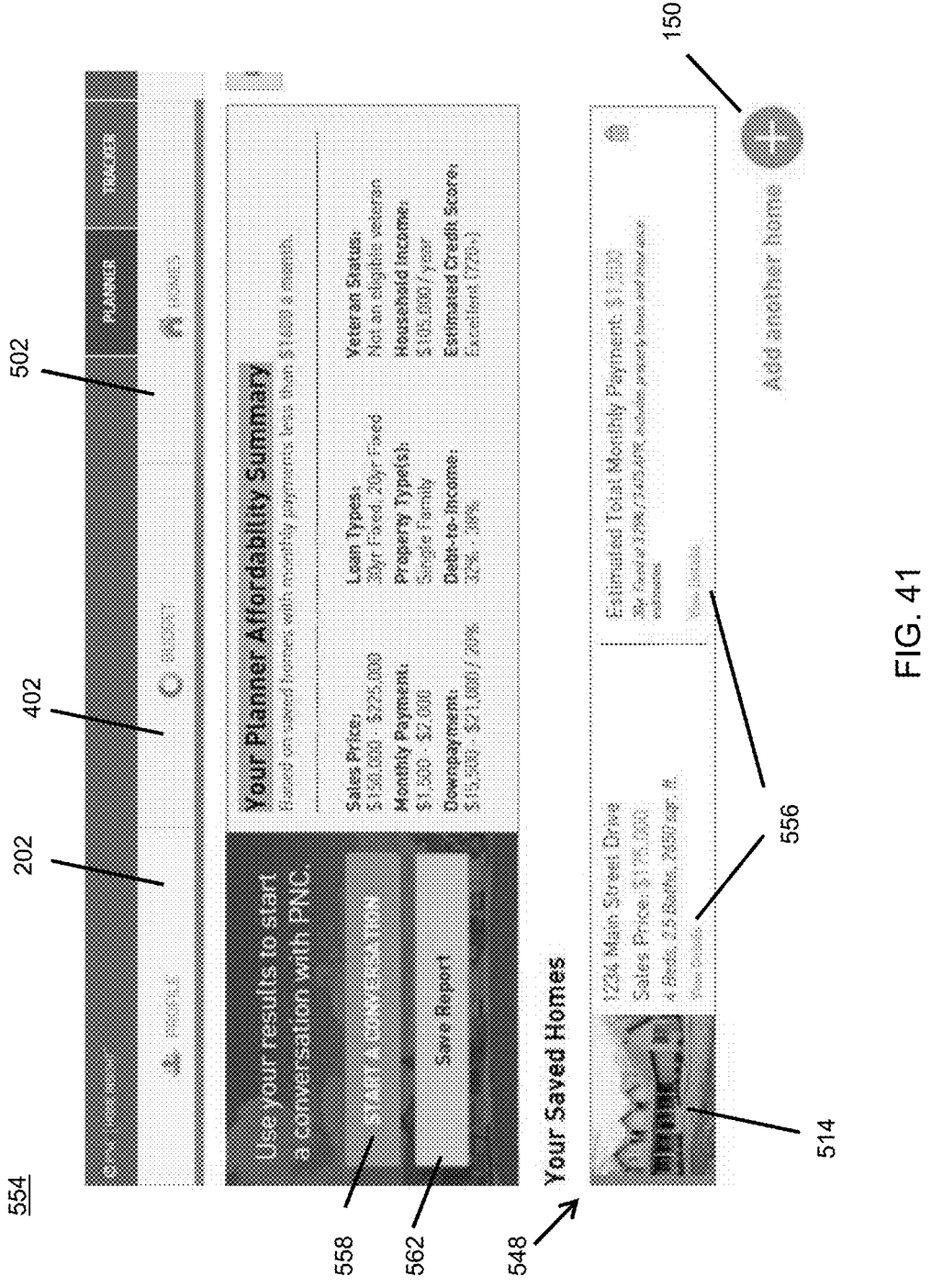
FIG. 41 is an exemplary affordability and home results panel that may be displayed with an embodiment of the system.
Figure 42:
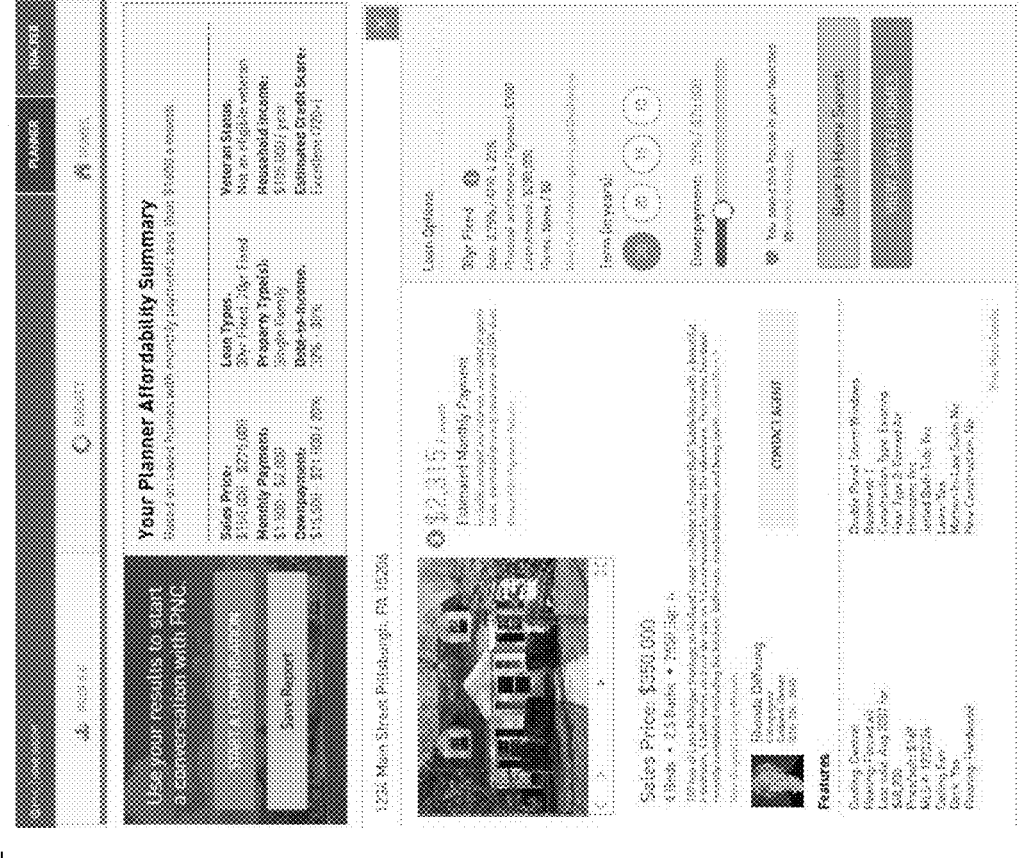
FIG. 42 is an exemplary listing details panel that may be displayed with an embodiment of the affordability and home results panel.

FIG. 41 shows an exemplary embodiment of the affordability and home results panel 554. The affordability and home results panel 554 can be programmed to display user data 116 from the household profile module 200, the budget builder module 400, the affordability module 300, and/or the home search module 500. For example, the affordability and home results panel 554 can display sale price data, loan type data, veterans status data, debt-to-income ratio data, down payment data, household income data, etc. The affordability and home results panel 554 can be further programmed to allow a user to add another home to the saved-home catalog 548 by actuating the add homes radio button 150.

The affordability and home results panel 554 can include any one or combination of homes within the saved-home catalog 548. The saved-home catalog 548 can include the image block 514 and/or other information for each home within the saved-home catalog 548. Each home within the saved-home catalog 548 can include a view details tab 556. Actuating the view details tab 556 can cause the system to display the listing details panel 536 associated with that home. (See FIG. 42). The listing details panel 536 can be displayed adjacent (e.g., underneath) the home results panel 554. In some embodiments, the listing details panel 536 can be configured as an expansion panel that expands for the home it is associated with when a user actuated the view details tab 556.

Figure 43:
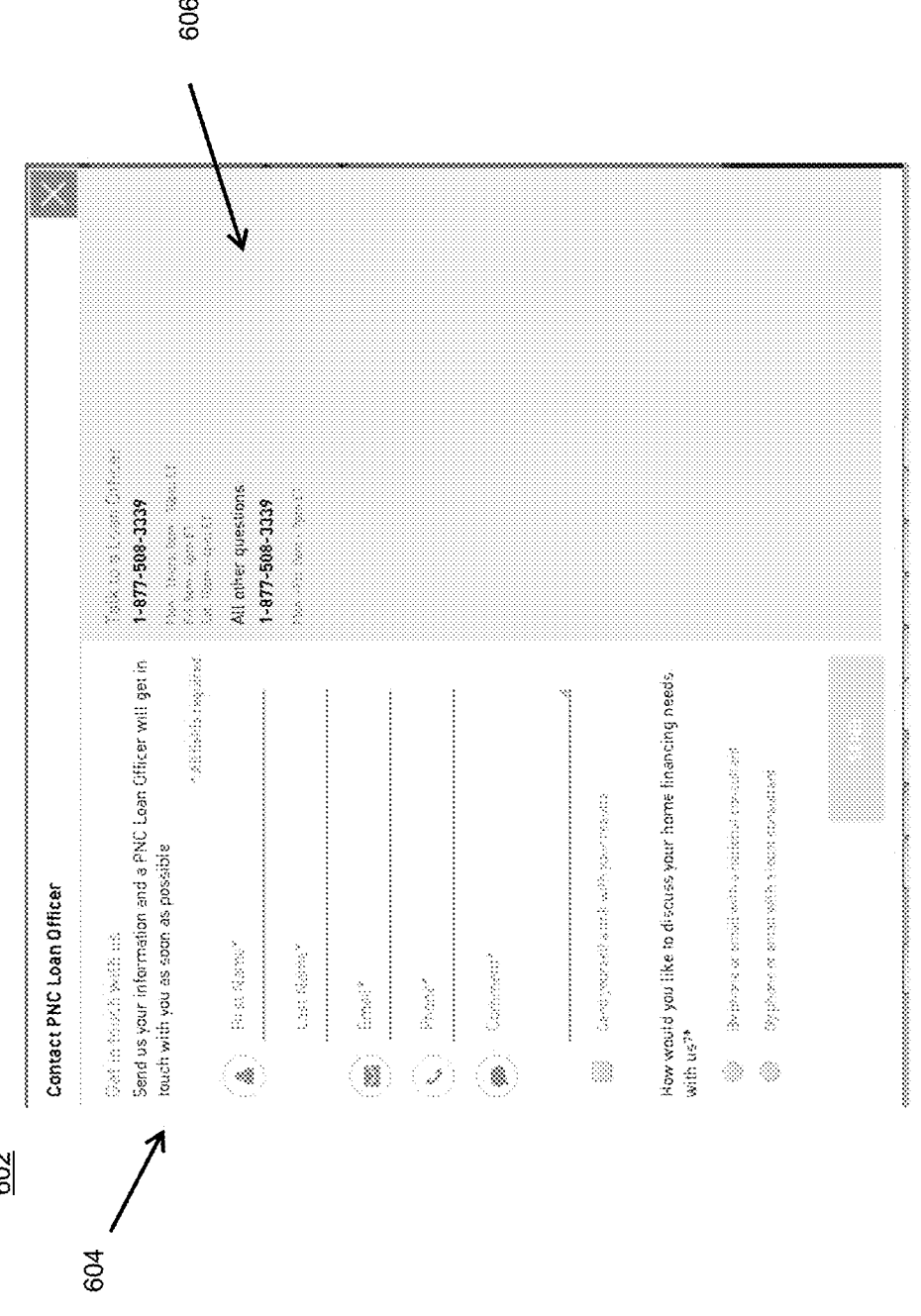
FIG. 43 is an exemplary agent contact panel that may be displayed with an embodiment of the system.
Figure 44:
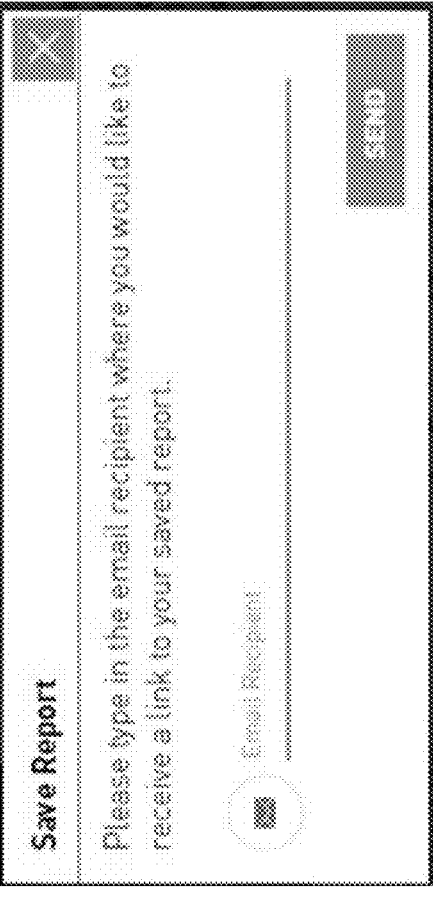
FIG. 44 is an exemplary save and send report screen that may be displayed with an embodiment of the system.
Figure 45:
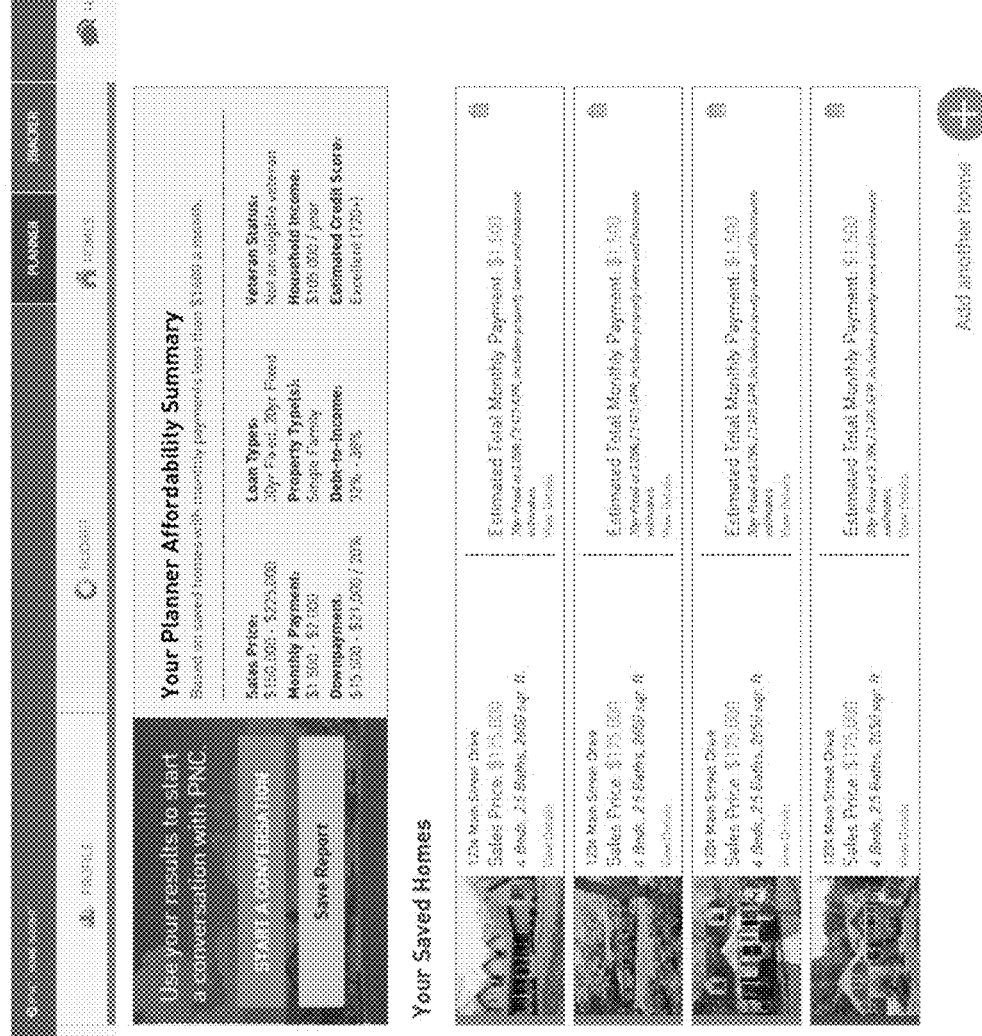
FIG. 45 shows an exemplary report that may be generated by the system 100.

Actuating the start conversation tab 558 of the affordability and home results panel 554 can cause the system 100 to generate the agent contact panel 602. The agent contact panel 602 can be configured for a realtor agent and/or a loan agent. The agent contact panel 602 of FIG. 36 is for a realtor agent. FIG. 43 shows an agent contact panel 602 for a loan agent. In some embodiments, the agent contact panel 602 can provide an option for a user to select a national or a local agent. In some embodiments, the system 100 can acquisition resource data 118 regarding the performance results and/or ratings of the agent. The system 100 may be programmed to provide a user an option to receive, via the user computer 101*a*, communication (e.g., an email) that includes the agent's performance results and/or ratings. The system 100 may be further programmed to search for agents that are affiliated with the administrator of the system 100. For example, the system 100 may be administered by a bank that offers home mortgage loans. The bank may have agents that are loan officers ("LO's"). The system 100 can search for bank branches and/or loan officer's that are within a predetermined radius of the home. For example, the system 100 can acquisition data from the planner computer 101*b* that includes at least one loan officer that is within 25 miles of the home a user is interested in. This may be used to populate the agent information within the agent contact panel 602.

In some embodiments, a user can generate and save a report 560. This can be achieved by actuating the save report tab 562 of the affordability and home results panel 554. The report 560 can include a summary of home and affordability data for at least one home within the saved-home catalog 548. The report 560 can be converted to a link, a pdf, Word document, etc. The report 560 can be transmitted (e.g., via email) to a user's email address, to an agent computer 101, etc. (see FIG. 44). The report 560 (see FIG. 45) can include any one or combination of the following.

i. Profile data
    1. Annual income
    2. Credit Score ID
    3. Down Payment
    4. Selected Loan Term
    5. Household size
    6. Veteran Eligibility
    7. Region ID
  ii. Budget data
    1. Income & Payroll Taxes Amount
    2. Debts & Obligations Amount
    3. Living Expenses Amount
    4. Job Expenses Amount
    5. Savings & Retirement Amount
  iii. Property data
    1. An identifier to identify individual property from List Hub, for example.

The system 100 can be further configured to transmit (e.g., email) data included into the report 560 to a user's email address. A user can then, at a later time, access the system 100 to review and/or update data, conduct new or more home searches, etc.

Figure 46:
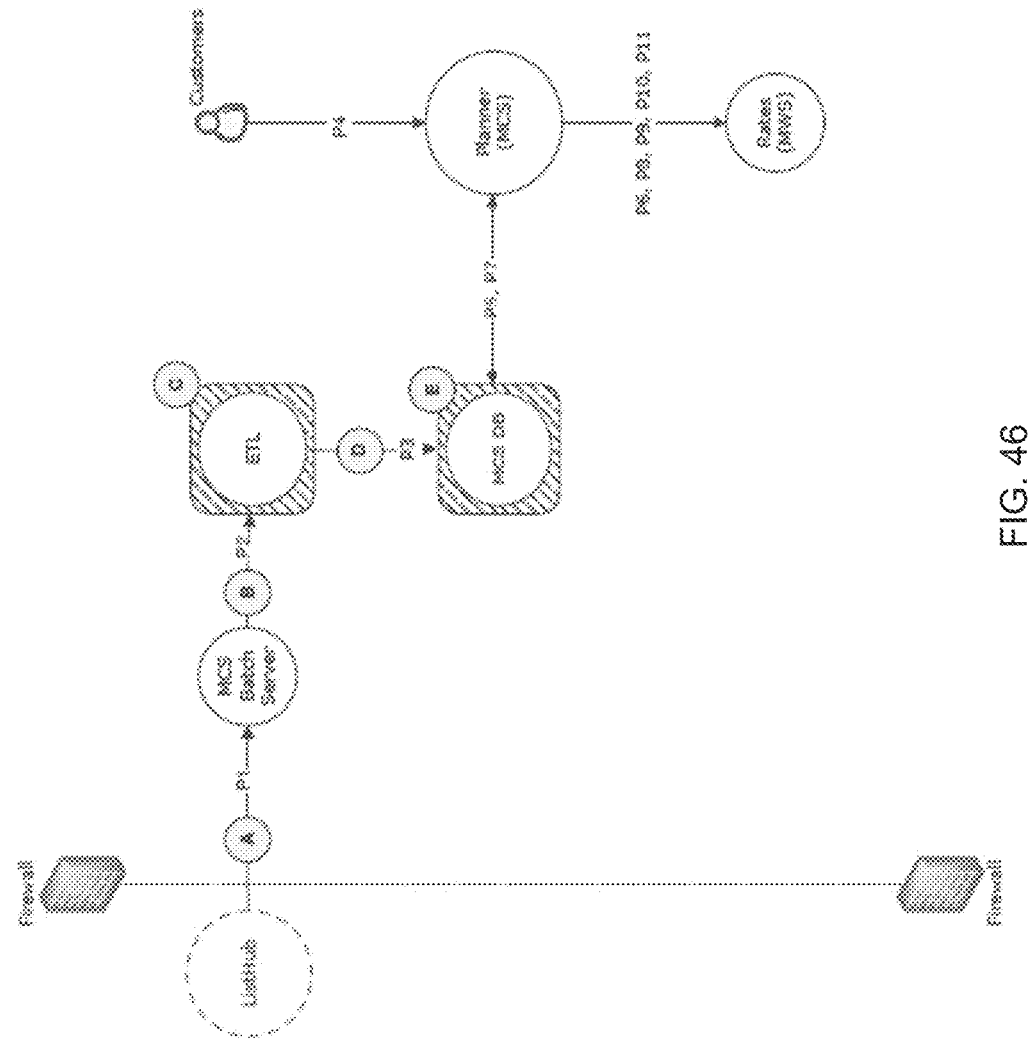
FIG. 46 shows an exemplary schematic of data transfer between system component and a resource computer (e.g., ListHub) that may be used by the system 100.

FIG. 46 illustrates an exemplary schematic of data transfer between the system 100 and a resource computer (e.g., ListHub®) that may be used by the system 100. Node "A" represents an http WGET file download. Node "B" represents an NDM process. Node "C" represents an information ETL. Node D represents a CA7 process. Node "E" represents an Oracle database. At P1 ListHub® files can be retrieved via HTTP GET via WGET file download utility. This can occur daily. This may occur during non-business hours (e.g., at night). The ListHub® files can be stored on an eTech server. The ListHub® files can be further transferred over to an ETL Server. This can be achieved via a NDM process. At P2, the NDM process can transfer the ListHub® files from a MCS Batch server to the ETL server. At P3, the ETL process can load Location data into a MCS DB MWS_Listhub_Listing table. A CA7 scheduler can schedule this daily (e.g., every night). At P4, a user can enter user data. Angular JS may collect information. The system 100 can perform calculations. The system 100 can further generate rate information requests. At P5, a user can search for a home. This can be achieved by inputting geographic location data. A database call can be made to retrieve location details. At P6, a MWS Rates webservice call can be made to retrieve rates information. This information can be display along with a calculated amount to the user. At P7, First time, Image(s) can be retrieved from a ListHub url and displayed to a user along with location details from the database. Images can be stored on a server location. A server path URL for image(s) can also be stored in the database for a Listing Key that may be referenced during future use. For example, for a second time use, an image path can be retrieved from the database and a related image may be retrieved from the server. At P8, a MWS ContactFollowUp-Service call can be made for submitting a start a conversation information. At P9, a MWS NeedAHelp call can be made. At P10, a MWS SaveAReport call can be made for sending an email to a user with their information. At P11, a MWS ContactFollowUpService call can be made to submit information to HLC from the user.

In some embodiments, the listings data can be provided to the system via an XML feed. This may be posted to a secure HTTPS directory approximately every 12 hours, for example. If ListHub® is not able to produce a fully updated feed, ListHub® can continue to provide the last full feed until the next successful run is complete. The system 100 can update the feed every 24 hours. MWS may remove all listings that were in the previous feed but are not in the current feed. Stale listings can be removed within three days or less. ListHub® can map all core fields that may be displayed in the various modules. ListHub® can provide all photos, videos and tours that are available through the MLS or source. Each media item may be provided as an individual URL, in order of importance. A MediaModificationTime-stamp field for each photo may provide the approximate date time at which ListHub® last downloaded the photo from the MLS or source. Each listing can have a unique key based on a combination of the MLS or data source acronym, the listing number, and/or a ListHub® identifier. These unique keys may be completely unique across ListHub®. The system 100 may be configured to download each photo of a home just once in order to avoid additional charges from ListHub® due to excessive access to photos. MWS can cache photos on-demand as requested by the user, or use another method to download photos from ListHub® just once per unique photo URL. All listings included within the ListHub® content can be configured to display, at a minimum, the following content fields.

Broker name
Property address
Listing price
Number of bedrooms
Number of bathrooms
Square footage
Property description
Office phone number
List agent name
List agent email
Google® Maps may be able to support the home search requirements. For example Google® Maps may provide a map interface to display for sale homes.

Possible Computer System Architectures

Referring back to FIGS. 3-4, exemplary computer networks that may be used with the system 100, are disclosed. Wherever a user is referenced in this disclosure, it is understood that this reference includes the associated computer device(s) 101, computer server(s) 102, database(s) 103, and/or uses thereof. Distributed communication networks 104 may be used to facilitate connection and communication between each computer device 101. Any one or combination of computer devices 101 may communicate in whole, or in part, via web-sites through a communication network 104, which may include a web-server.

Interactions between users, the various computer devices 101, and the computer network may be implemented using hardware, software, firmware, non-transitory computer readable media having instructions stored thereon, or a combination thereof, and may be implemented in a single or multiple of computer systems or other processing systems. Hardware, software, or any combination thereof may embody modules and components used to execute functions of the system.

If programmable logic is used, such logic may execute on a commercially available processing platform or a special purpose device. A person having ordinary skill in the art will appreciate, with the benefit of the present disclosure, that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device 105 and a memory 106a, 106b may be used to implement the herein described embodiments.

A processor device 105, as discussed herein, may be a single processor, a plurality of processors, or combinations thereof. Processor devices 105 may have one or more processor cores. The terms computer program medium, non-transitory computer readable medium, and computer usable medium, as discussed herein, are used to generally refer to tangible media, such as, for example, a removable storage unit and a hard disk installed in a hard disk drive.

A processor device 105 may be a special purpose or a general purpose processor device. A processor device 105 may be connected to a communication infrastructure. A communication infrastructure may include, but is not limited to, a bus, message queue, network, multi-core message-passing scheme, etc. The network may include a main memory 106a. A main memory 106a may include, but is not limited to, a random access memory, a read-only memory, etc. The network may include a secondary memory 106b. A secondary memory 106b may include, but is not limited to, a hard disk drive, a removable storage drive, a floppy disk drive, a magnetic tape drive, an optical disk drive, a flash memory, etc. A memory 106a, 106b may be a non-volatile memory.

A removable storage drive may read from and/or write to a removable storage unit in a well-known manner. A removable storage unit may include a removable storage media that may be read by, and written to, a removable storage drive. For example, if a removable storage drive is a floppy disk drive, a removable storage unit may be a floppy disk. In some embodiments, a removable storage unit may be non-transitory computer readable recording media.

In some embodiments, a secondary memory 106b may include alternative means for allowing computer programs or other instructions to be loaded into the network. This may be, for example, a removable storage unit and/or an interface. Examples of such means may include, but are not limited to, a program cartridge and cartridge interface (e.g., as found in video game systems), a removable memory chip (e.g., programmable read-only memory (PROM), electrically erasable programmable read-only memory (EEPROM), etc.) and associated socket, and/or other removable storage units and interfaces, as will be apparent, with the benefit of the present disclosure, to persons having skill in the relevant art.

The network may include a communications interface 107. A communications interface 107 may be configured to allow software and data to be transferred between the network 100 and external devices. Communications interfaces 107 may include, but are not limited to, a modem, a network interface (e.g., an Ethernet card), a communications port, a Personal Computer Memory Card International Association (PCMCIA) slot and card, etc. Software and data transferred via a communications interface may be in a form of signals, which may be electronic, electromagnetic, optical, or other signals as will be apparent, with the benefit of the present disclosure, to persons having skill in the relevant art. Signals may travel via a communications path 108, which may be configured to carry signals and may be implemented using wire, cable, fiber optics, a phone line, a cellular phone link, a radio frequency link, etc.

Computer program medium and computer usable medium may refer to memories, such as a main memory 106a and a secondary memory 106b, which may be memory semiconductors (e.g., dynamic random access memory (DRAM)). These computer program products may be means for providing software to the network. In some embodiments, computer programs (e.g., computer control logic) may be stored in a main memory 106a and/or a secondary memory 106b. Computer programs may also be received via a communications interface 107. Such computer programs, when executed by a processor device 105, may enable the network to execute commands and act upon the various components of the system 100. Accordingly, such computer programs may represent controllers of an embodiment of a disclosed network. Where the present disclosure is implemented using software, the software may be stored in a computer program product and loaded into the network using a removable storage drive, an interface, a hard disk drive, and/or a communications interface 107.

A computer device 101 may be a processor, a microprocessor, minicomputer, server, mainframe, laptop, personal data assistant, wireless email device, cellular phone, smartphone, or any other programmable device configured to enable transmission and/or reception of data, which may be over a network. A computer device 101 may include a peripheral device, such as an input/output device. A peripheral device may include, but is not limited to, a keyboard, a mouse, a screen display, a touch screen, a pen, a monitor, a printer, a hard disk drive, a floppy disk drive, a joystick, an image scanner, etc.

One or more electronic computer networks may be utilized by the network to promote communication among different components, transfer data, and/or share resource information. Such computer networks may be embodied as, but not limited to, at least one of Ethernet, wireless LAN, MAN, WAN, VPN, SAN, GAN, HomePNA, etc.

Any of the computer devices 101 can be configured as a desktop or mobile computer device.

Various embodiments of the present disclosure are described in terms of this example computer network. It will become apparent, with the benefit of the present disclosure, to a person skilled in the relevant art how to implement the system 100 using other embodiments of the computer network, along with other embodiments of computer architectures. Although operations may be described as a sequential process, some of the operations may be performed in parallel, concurrently, and/or in a distributed environment, and with program code stored locally or remotely for access by single or multi-processor machines. In some embodiments, the order of operations may be rearranged without departing from the spirit of the disclosed subject matter.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. An affordability tool, comprising:

a computer device and a computer system, the computer device in operative communication with a computer system;

a plurality of operating modules configured to cause a user to advance through user interfaces displayed on the computer device to provide an assessment related to purchase of an asset;

the plurality of operating modules comprising:

an affordability module programmed to cause the computer device and the computer system to receive, transmit, and display user data and resource data, user data comprising data entered via the computer device, resource data comprising data acquisitioned from a resource computer by the computer system;

a home search module, the home search module programmed to cause the computer device to request the user data, the user data comprising a home selected to be saved to a saved-home catalog; and an agent contact module, the agent contact module programmed to cause the computer device to request the user data, the user data comprising comments related to contacting an agent;

wherein:

the affordability module causes the computer system to acquisition resource data based on user data, and generate a normalized data set of the resource and user data;

the affordability module calculates a plurality of potential monthly home payment (PMHP) values based on the normalized data, each PMHP value being calculated from a separate PMHP formula;

the affordability module causes the computer device to prevent advancement to another operating module and request additional user data when the lowest PMHP value is below a predetermined value;

the affordability module is configured as a hub for the plurality of modules such that the affordability module drives each of the other modules of the plurality of modules, coordinates activities between the plurality of modules, coordinates activities between components of the computer system, and sets parameters related to acquisition and display of data;

the affordability module is configured to tailor searching, data acquisitioning, and an assessment generation technique based on geographic location information, wherein the geographic location information is determined based on an Internet Protocol address of the user's computer device and/or Global Positioning System information;

the assessment generation technique involves generating an affordability assessment including an assessment of PMPH, Estimated Monthly Home Payment (EMHP), Estimated Total Home Expenses (ETHE), and Maximum Total Monthly Home Expenses (MTMHE); and the home search module is configured to display an image of a home in an image block, wherein a background of the image block has a color that depends on a comparison between one or more of PMPH, EMHP, ETHE, and MTMHE.

2. The affordability tool recited in claim 1, wherein the plurality of operating modules further comprises a home profile module, the home profile module programmed to cause the computer device to request the user data, the user data comprising a user's income.

3. The affordability tool recited in claim 1, wherein the plurality of operating modules further comprises a builder budget module, the builder budget module programmed to cause the computer device to request the user data, the user data comprising a user's income and payroll taxes.

4. The affordability tool recited in claim 1, wherein the plurality of operating modules further comprises:
a home profile module, the home profile module programmed to cause the computer device to request the user data, the user data comprising a user's income; and
a builder budget module, the builder budget module programmed to cause the computer device to request the user data, the user data comprising a user's income and payroll taxes.

5. The affordability tool recited in claim 1, wherein the resource data comprises a current home listing, a current home sale price, and a current loan rate.

6. The affordability tool recited in claim 5, wherein the current loan rate is determined for each home.

7. The affordability tool recited in claim 1, wherein:
the affordability module is further programmed to generate an affordability assessment, the affordability assessment comprising at least one affordability parameter;
the affordability module is further programmed to cause the computer system to transmit home data to the computer device; and,
the home search module is further programmed to cause the computer device to display the home data.

8. The affordability tool recited in claim 7, wherein the affordability module is further programmed to indicate how the home displayed compares to the at least one affordability parameter.

9. An affordability tool, comprising:
a first computer device, a computer system, and a second computer device, each in operative communication with each other;
a plurality of operating modules configured to cause a user to advance through user interfaces displayed on the first computer device to provide an assessment related to purchase of an asset;
the plurality of operating modules comprising:
an affordability module programmed to cause the computer system to receive, transmit, and display user data and resource data, user data comprising data entered via the first computer device, resource data comprising data acquisitioned from the second computer device;
a home search module, the home search module programmed to cause the first computer device to request the user data, the user data comprising a home selected to be saved to a saved-home catalog; and
an agent contact module, the agent contact module programmed to cause the first computer device to request the user data, the user data comprising comments related to contacting an agent;
wherein:
the affordability module causes the computer system to acquisition resource data based on user data, and generate a normalized data set of the resource and user data;
the affordability module calculates a plurality of potential monthly home payment (PMHP) values based on the normalized data, each PMHP value being calculated from a separate PMHP formula;
the affordability module causes the first computer device to prevent advancement to another operating module and request additional user data when the lowest PMHP value is below a predetermine value;
the affordability module is configured to tailor searching, data acquisitioning, and an assessment generation technique based on geographic location information, wherein the geographic location information is determined based on an Internet Protocol address of the user's computer device and/or Global Positioning System information;
the assessment generation technique involves generating an affordability assessment including an assessment of PMPH, Estimated Monthly Home Payment (EMHP), Estimated Total Home Expenses (ETHE), and Maximum Total Monthly Home Expenses (MTMHE); and
the home search module is configured to display an image of a home in an image block, wherein a background of the image block has a color that depends on a comparison between one or more of PMPH, EMHP, ETHE, and MTMHE.

10. The affordability tool recited in claim 9, wherein the plurality of operating modules further comprises:
a home profile module, the home profile module programmed to cause the first computer device to request the user data, the user data comprising a user's income; and
a builder budget module, the builder budget module programmed to cause the first computer device to request the user data, the user data comprising a user's income and payroll taxes.

11. A method for generating an affordability assessment, the comprising:
causing a first computer device, a computer system, and a second computer device to be in operative communication with each other;
generating a plurality of operating modules configured to cause a user to advance through user interfaces displayed on the first computer device to provide an assessment related to purchase of an asset;
generating an affordability module as part of the plurality of operating modules, the affordability module programmed to cause the computer system to receive, transmit, and display user data and resource data, user data comprising data entered via the first computer device, resource data comprising data acquisitioned from the second computer device;

generating a home search module, the home search module programmed to cause the first computer device to request the user data, the user data comprising a home selected to be saved to a saved-home catalog; and generating an agent contact module, the agent contact module programmed to cause the first computer device to request the user data, the user data comprising comments related to contacting an agent;

wherein:

the affordability module causes the computer system to acquisition resource data based on user data, and generate a normalized data set of the resource and user data;

the affordability module calculates a plurality of potential monthly home payment (PMHP) values) based on the normalized data, each PMHP value being calculated from a separate PMHP formula;

the affordability module causes the first computer device to prevent advancement to another operating module and request additional user data when the lowest PMHP value is below a predetermine value;

the home search module causes the first computer device to generate a report in an Extensible Markup Language (XML) feed format, the report comprising at least one home within the saved-home catalog;

the affordability module is configured to tailor searching, data acquisitioning, and an assessment generation technique based on geographic location information, wherein the geographic location information is determined based on an Internet Protocol address of the user's computer device and/or Global Positioning System information;

the assessment generation technique involves generating an affordability assessment including an assessment of PMPH, Estimated Monthly Home Payment EMHP), Estimated Total Home Expenses (ETHE), and Maximum Total Monthly Home Expenses (MTMHE); and the home search module is configured to display an image of a home in an image block, wherein a background of the image block has a color that depends on a comparison between one or more of PMPH, EMHP, ETHE, and MTMHE.

12. The method recited in claim 11, further comprising generating as part of the plurality of operating modules:

a home profile module, the home profile module programmed to cause the first computer device to request the user data, the user data comprising a user's income;

a builder budget module, the builder budget module programmed to cause the first computer device to request the user data, the user data comprising a user's income and payroll taxes.

*     *     *     *     *